June 4, 1963 L. M. SCHMIDT 3,092,810

HIGH SPEED TAPE MEMORY SYSTEM

Filed May 26, 1958 15 Sheets-Sheet 1

INVENTOR.
LOTHAR M. SCHMIDT

BY

ATTORNEY

HIGH SPEED TAPE MEMORY SYSTEM

Filed May 26, 1958 15 Sheets-Sheet 2

HIGH SPEED TAPE MEMORY SYSTEM

Filed May 26, 1958 15 Sheets-Sheet 6

BY

HIGH SPEED TAPE MEMORY SYSTEM

June 4, 1963 L. M. SCHMIDT 3,092,810

HIGH SPEED TAPE MEMORY SYSTEM

Filed May 26, 1958 15 Sheets-Sheet 8

June 4, 1963 L. M. SCHMIDT 3,092,810

HIGH SPEED TAPE MEMORY SYSTEM

Filed May 26, 1958 15 Sheets-Sheet 9

June 4, 1963 L. M. SCHMIDT 3,092,810

HIGH SPEED TAPE MEMORY SYSTEM

Filed May 26, 1958 15 Sheets-Sheet 11

HIGH SPEED TAPE MEMORY SYSTEM

Filed May 26, 1958

15 Sheets-Sheet 12

June 4, 1963 L. M. SCHMIDT 3,092,810

HIGH SPEED TAPE MEMORY SYSTEM

Filed May 26, 1958 15 Sheets-Sheet 13

June 4, 1963 L. M. SCHMIDT 3,092,810

HIGH SPEED TAPE MEMORY SYSTEM

Filed May 26, 1958 15 Sheets-Sheet 15

United States Patent Office 3,092,810
Patented June 4, 1963

3,092,810
HIGH SPEED TAPE MEMORY SYSTEM
Lothar M. Schmidt, Glendale, Calif., assignor to General Precision, Inc., a corporation of Delaware
Filed May 26, 1958, Ser. No. 737,862
16 Claims. (Cl. 340—172.5)

The present invention relates to magnetic storage or memory systems and apparatus, and it relates more particularly to an improved system in which data is recorded and stored on a movable magnetic tape.

Computers and data processing systems which are predicated on digital binary principles have been used for solving complex mathematical problems and for simplifying and speeding up complex business routines. The use of these systems and apparatus has become more and more prevalent in recent years. Present day computers are capable of solving in relatively short time complex mathematical problems which otherwise would require many months of mental labor. Data processing systems are in operation in many business establishments for handling accounting procedures and other organizational matters. These data processing systems are capable of receiving, assimilating and storing information relating to many complex operations carried on in such businesses and for making such information readily available.

The apparatus and system of the present invention is intended for use with known types of digital computers and data processors, and the invention functions as a memory or storage for such systems. In the apparatus of the invention, digital data representative of any particular phase of a business organization is stored in binary or other appropriate form on a magnetic tape. As a particular example, this data may pertain to the payroll of an industrial plant or other business organization. The data, for example, is recorded on the magnetic tape in the form of a series of characters with each character being made up of a predetermined number of binary bits. The characters themselves are grouped into words, and the words are grouped into blocks. Each block of data on the magnetic tape represents in binary form all the information pertinent to a given employee to a given item, or additional program storage to carry out subsequent operations. In a constructed embodiment of the invention each character recorded on the magnetic tape was made up of seven binary bits, each word comprised twelve characters, and each block of data comprised eight words.

In accordance with the invention, the blocks of data are recorded on the tape in a numerical sequence, and each block is preceded by an identifying "address" portion. For purposes of convenience, the address portion of any given block is placed immediately preceding the next preceding block. This provides a sufficient time lag between the reading of a particular address and the corresponding engagement of the identified block with the reading heads. The resulting time delay permits the necessary controls and conditions to be set up in the system to enable the desired block of data to be read by the reading heads and stored in the system for subsequent feeding to an associated data processor. The address may be a sequential address (e.g. 001 followed by 002, 003, etc.), or a completely arbitrary type of address where each has no arithmetical relation to the others (e.g. azure, magenta, etc.).

The system of the invention is so constructed that any block of data recorded on the magnetic tape may be rapidly selected and fed into the associated data processor. The data processor utilizes the data in any known manner, either to derive information concerning a particular block of data on the tape, or to "up-date" any given block and record new data with respect to it. The up-dated data from the data processor corresponding to the particular block is then fed back to the apparatus and system of the invention to be recorded at its proper position on the magnetic tape.

The invention is capable of feeding the data pertaining to a selected block in serial form into an associated data processor. The apparatus is also capable of receiving data from the data processor in serial form. The invention, therefore, can be used in conjunction with many known types of data processors, such as the type presently being manufactured by Librascope, Incorporated, and designated by it as model LGP–30.

The apparatus and system of the invention utilizes an input buffer and an output buffer in conjunction with the magnetic storage tape described above. These buffers are in the described embodiment in the form of magnetic matrices and they are controllable to store the selected block of data from the tape or from the data processor until conditions are appropriate to feed that block either to the data processor or to the tape.

The input and output buffers referred to in the preceding paragraph may be of the type incorporating a magnetic matrix using an array of magnetic cores. These magnetic cores preferably have a high coercive force and a substantially rectangular hysteresis loop. When all the cores of the matrix are initially magnetically saturated in the same direction (e.g. position), a selected core may be reversed or "turned over" by the application of a control pulse( reversing magnetomotive force) of negative polarity and amplitude sufficient to produce a magnetomotive force of sufficient strength to drive the core to saturation in the reverse (e.g. negative) direction. The turned-over core will remain in this state until a restoring pulse of sufficient amplitude and of the proper (positive) polarity is applied so as to return the core to its original direction of saturation.

The magnetic cores are arranged in the buffers to store binary data as indicated by a "P" or "N" saturated condition of the various cores. A "P" saturated condition may represent, for example, a binary 1; and an "N" saturated condition may represent a binary 0. An output coil is magnetically coupled to each core in the matrix described above, and as a particular core is driven from one saturation polarity to the other, a voltage is induced in the output coil.

Magnetic matrices similar to the magnetic buffers described above are described in detail in the Institute of Radio Engineers Proceedings for April 1952 (pages 475–478), and in the Radio Corporation of America Review for June 1952 (pages 183–201). Other articles on this type of magnetic core matrices may be found in the Journal of Applied Physics, volume 22, pages 44–48, January 1951; and in the Institute of Radio Engineers Proceedings for October 1953 (pages 1407–1421).

In a particular embodiment of the system of the present invention which will be described, the magnetic core buffers are under the control of magnetic switches. These switches also comprise a plurality of magnetic cores connected into a magnetic matrix, the core having a relatively high coercive force and a substantially rectangular hysteresis loop. Each core has a plurality of coils associated with it, and the coils are interconnected in such a manner that successive pulses applied to the matrix cause the cores to turn over successively in a particular predetermined succession. Each core upon being turned over produces an output pulse in an independent output circuit, and the resulting independent output pulses from the magnetic switch are used to perform a switching function in the magnetic buffers referred to above.

A feature of the present invention is the provision of an improved and unique construction for the magnetic core buffers and for the magnetic core switches. Another feature is the provision of a novel interconnecting circuit for the elements so as to permit one magnetic switch to furnish a loading function for its associated buffer when data is to be read into the core buffer and to perform an unloading function for its buffer when data is to be read out of the buffer.

Suitable driving circuits are provided for the magnetic switches to permit a relatively large number of switching operations to be carried out in a short time interval and without producing excessive loading requirements on the system. In the embodiment of the invention which will be described in detail, a magnetic row switch comprising 14 positions in a typical embodiment and a magnetic column switch comprising typically 45 positions are used for each core buffer. In order that these switches may be driven at a high rate of speed and by commercially practical circuitry, a phase inverter is provided for driving the row magnetic switch. This phase inverter permits seven cores of the row magnetic switch to be controlled by the introduced pulses and seven of these cores to be controlled by inverted pulses corresponding to the introduced pulses. In like manner, a ring counter is provided for the column magnetic switch and each control pulse causes the counter to provide three output pulses. Each of the three output pulses corresponding to each control pulse is used to control a different group of fifteen magnetic cores in the column magnetic switch.

Data from the input buffer, when certain control conditions have been met, is fed through an amplifier-control circuit to the writing heads associated with the magnetic storage tape of the apparatus of the invention. This amplifier in the embodiment of the invention to be described has a unique construction, and it responds to clock pulses derived from the storage tape permitting registration and synchronization of prewritten tape clock pulses. Whenever a binary 1 is to be recorded on the tape, the corresponding pulse from the input buffer is translated through a first path to present a recording signal of a particular phase to the associated writing head. The pulse from the input buffer also gates out the corresponding clock pulse from the tape. However, when a binary 0 is to be recorded, the corresponding clock pulse is passed through another path to present a recording signal of opposite phase to the associated writing head. This permits magnetic areas of one polarity to be produced on the tape corresponding to a binary 1, and it permits magnetic areas of the opposite polarity to be produced which correspond to the binary 0. In this manner registration and synchronization is assured.

Further, in accordance with the invention and when it is desired to select a particular block of data from the tape to feed that block to the associated data processor, a magnetic core register similar in some respects to the magnetic core buffers mentioned above is provided. This core register receives data from the wiring heads as the tape is moved past these heads, and it is controlled to feed the address portion of each block of data to a current address register. The address of the desired block of data is set up in a desired address register, by programming, or some other suitable means, and the output of the current address register is compared with that of the desired address register. The current and desired address is continually compared. Given an identity between desired and current addresses a control change occurs so that the desired block of data on the tape is read by the reading heads loading an output core buffer automatically with the data of that block. Then, and when certain conditions have been fulfilled, the desired block in the output buffer is fed to the data processor.

The output buffer in the embodiment of the invention to be described is controlled by magnetic switches similar to the control of the input buffer. By the application of a unique technique and circuitry, the row magnetic switch controlling the output core buffer is used also to control the block address core register mentioned in the preceding paragraph.

As will be described in detail subsequently, (the data utilized in the system and apparatus of the invention is stored on a magnetic tape by means of a plurality of write heads. These write heads record the data in binary form in a plurality of separate channels extending along the tape. The tape itself may be composed of known magnetic material of high coercive force. For example, magnetic material coated on a polyester designated "Mylar" by the E. I. du Pont de Nemours Company, has been used successfully as magnetic storage tapes. Magnetic oxide coated 35 mm. cellulose tapes have also been used successfully.

The tape used in the constructed embodiment of the invention is provided with sixteen channels, and the data is written onto the tape and is read from the tape by a plurality of write heads and by an associated plurality of read heads.

Figure 1:
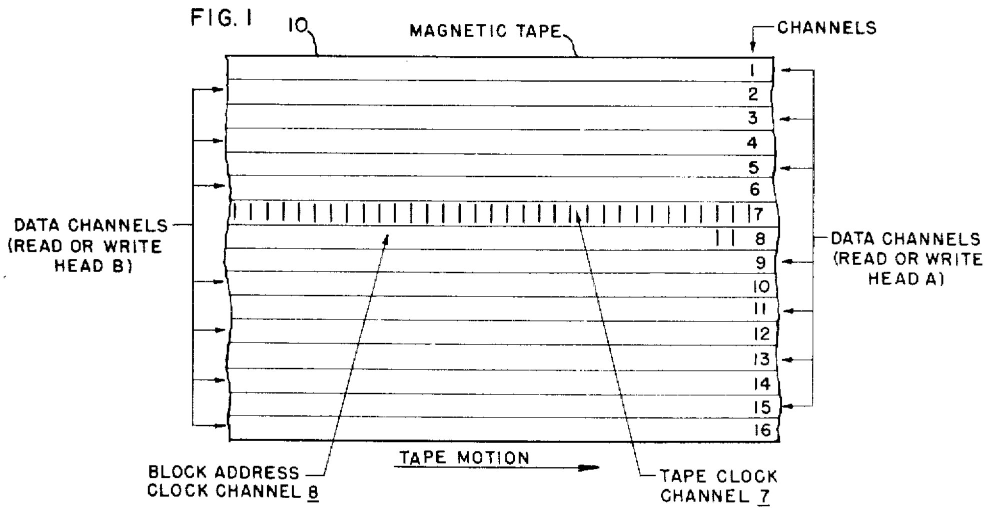
FIGURES 1–3 are fragmentary schematic representations of the storage tape of the present invention, and these representations indicate the manner in which the data is grouped and organized in separate channels on the tape.
Figure 2:
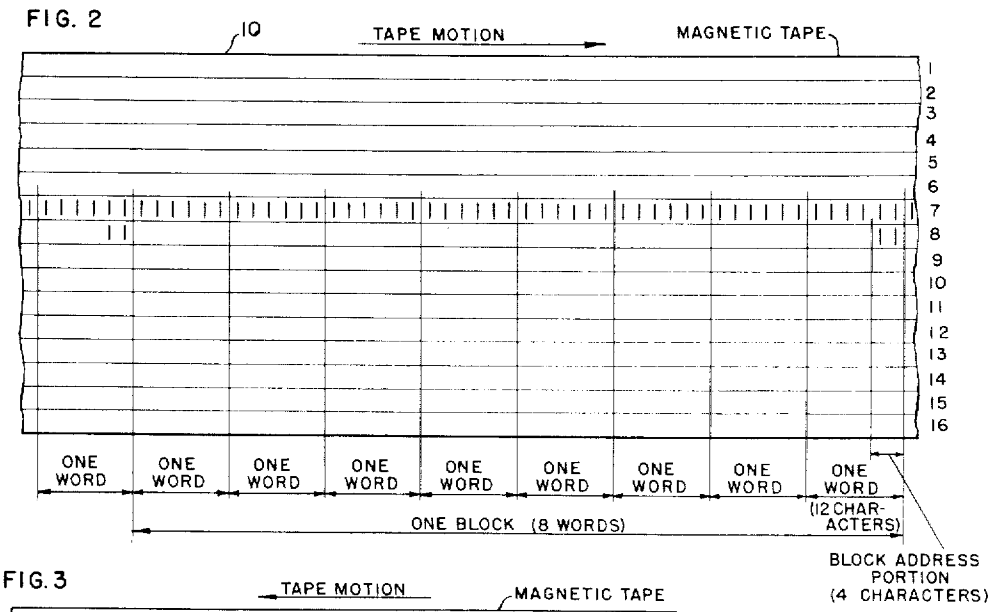
Figure 22:
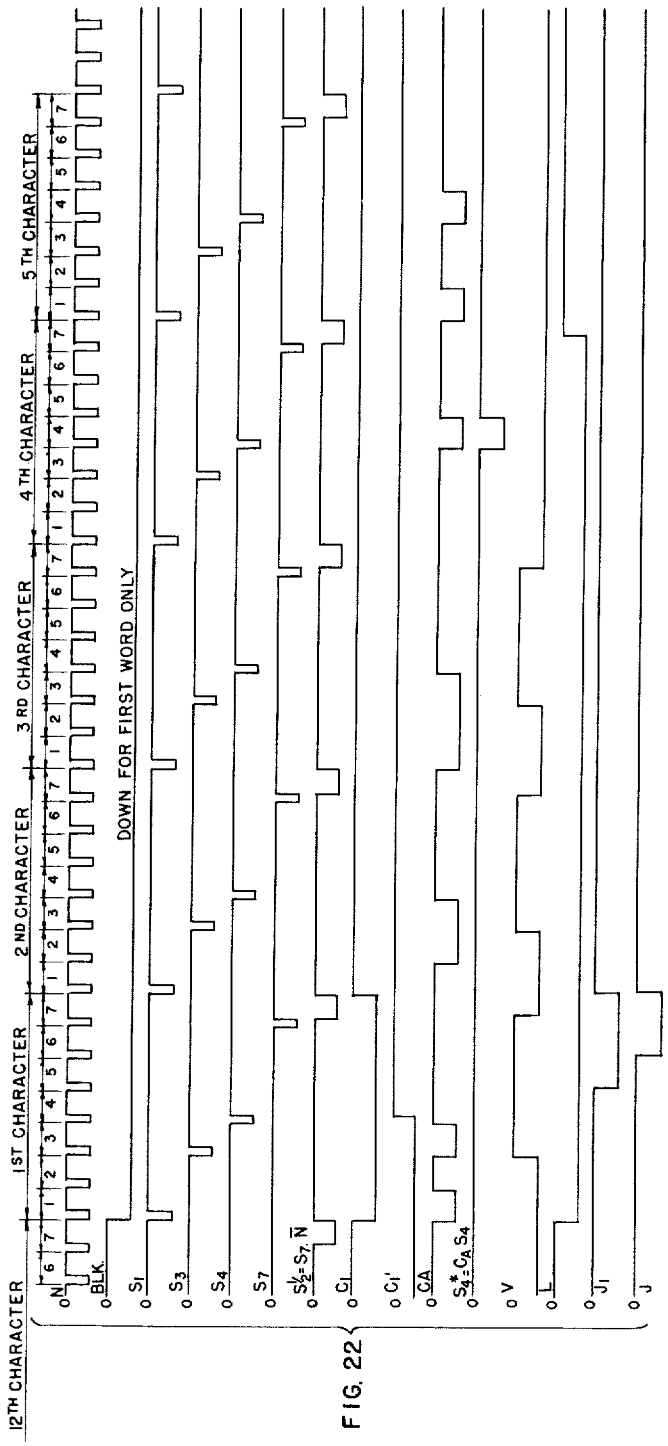
FIGURE 22 is a series of curves representing certain timing signals derived mainly from the data processor associated with the system of the invention.

As shown in FIGURES 1 and 2, the seventh channel on the tape has clock pulses recorded in it. These pulses are of the same magnetic polarity and they are recorded at fixed equidistant positions along channel No. 7 of the tape. These clock pulses correspond respectively to the positions of successive pairs of characters recorded on the tape. Each character recorded on the tape is made up of seven binary bits (as best seen in FIGURE 22), and the arrangement is such that two characters are recorded in each column extending transversely across the tape as represented by a clock pulse in channel 7. The write heads are staggered into two pluralities so that the first plurality of heads writes data in the channels 1, 3, 5, 9, 11 13 and 15, and so that the second plurality of heads writes data in the channels 2, 4, 6, 10, 12, 14 and 16. Therefore, in each column on the tape as represented by a clock pulse in the clock channel 7, the first write heads write one character and the second write heads write a second character. Each of these characters is made up of seven binary bits of ascending digital significance.

The characters are arranged on the tape, as shown in FIGURE 2, in a succession of "words," with each word being made up of twelve characters. Therefore, each word extends along the tape a distance corresponding to six clock pulses in channel 7. The words themselves are arranged into blocks with each block of data being made up of eight words. As noted previously, each block contains all the relevant data pertaining to a particular item or individual. The beginning of each new block is marked by a pair of block control pulses recorded in the channel 8. It will be noted that the clock pulses are recorded in the central channel 7. The purpose is to prevent slight skewing of the tape from affecting adversely the timing of the system.

Figure 3:
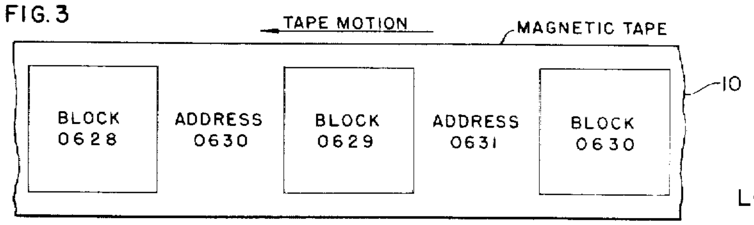

In one constructed embodiment of the invention, the magnetic tape which is designated as 10 in FIGURES 1, 2 and 3 was provided with a typical length of 150 feet and a typical width of 35 millimeters. This tape had sufficient dimensions to contain 3750 blocks of data. The tape was included in apparatus such as that disclosed in co-pending application, Serial Number 668,356, which was filed June 20, 1957 in the name of Lothar M. Schmidt, et al. and which issued February 9, 1960 as Patent 2,924,669.

In the particular constructed system, four binary bits of each seven-bit character constituted the numeric portion of the character and two bits constituted the alphabetical portion, with the one remaining bit constituting a check bit. Each bit had a duration of 2.77 microseconds, as read by the reading head, so that each character pair took about 77 microseconds to be read. In this manner, a block of data could be scanned in 4 milliseconds so that the entire tape could be sensed in about 15 seconds.

In one embodiment the first four characters of each block constitute the "address" portion of the block, this portion serving to identify the block. The address portion of each block may be recorded on the tape independently of the data portion, and as shown in FIGURE 3, it is preferable for the address portion to identify the block of data two blocks away so as to provide a sufficient time delay from the sensing of the address to the actual reading of the corresponding block of data. The addresses may be arranged on the tape 10 in a numerical sequence.

As described briefly above, the apparatus and system of the invention enable pertinent data referring to a variety of items or individuals to be stored on the tape 10 in respective ones of the data blocks identified by the addresses recorded on the tape. The apparatus functions so that data relevant to a particular address may be fed in serial form from a data processor into the apparatus of the invention. Such data is then automatically recorded by the apparatus of the invention into its proper position on the tape. That is, the data is recorded in the block represented by a selected address on the tape. Then, when it is desired to utilize the data so recorded on the tape, the apparatus of the invention enables a required block of data to be selected by setting up its address in a register, the block of data whose address matches the address in the register being fed automatically to an output buffer and then to the data processor.

Figure 4:
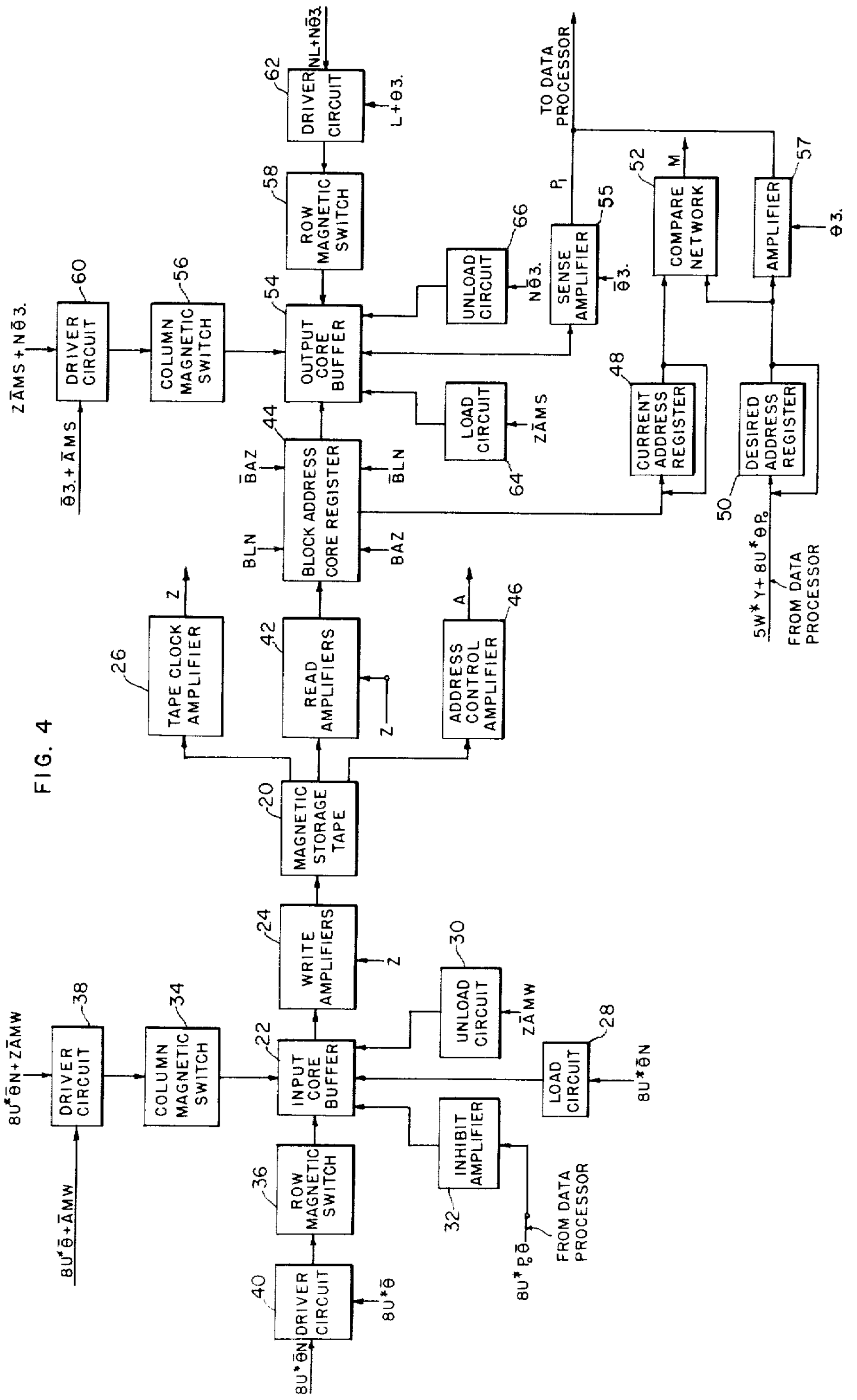
FIGURE 4 is a block diagram of the system of the invention, this diagram representing the various elements of the system and the manner in which they cooperate with one another.

In the block diagram of FIGURE 4, the magnetic storage tape and its associated read and write heads are represented by the block 20. The system includes an input core buffer 22, and the buffer is connected to a plurality of write amplifiers 24, which in turn are connected to the respective write heads associated with the magnetic storage tape 20. The amplifiers 24, in a manner to be more completely described, are under the control of a signal "Z" which corresponds to the clock pulses recorded in channel 7 of the tape as described above. The signal "Z" is in the form of a series of pulses, and it is derived from an amplifier 26 which is coupled to the appropriate sensing element of the read head associated with the channel 7 of the tape.

The input core buffer 22 is under the control of a load circuit 28 and of an unload circuit 30. An inhibit amplifier 32 is connected to the input core buffer in a manner to be more fully described, and this amplifier serves to feed data from a data processor into the input core buffer. The input core buffer 22 is controlled by a column magnetic switch 34 and by a row magnetic switch 36. The column magnetic switch 34 is driven by a driver circuit 38, and the row magnetic switch is driven by a driver circuit 40.

The read heads associated with the storage tape 20 are connected to a plurality of read amplifiers 42. The various sensing elements of the read heads associated with the different channels, as described above, are connected through individual read amplifiers in the block 42 to a block address register 44. The sensing element of the read head associated with the block control channel 8 of the tape is connected to an address control amplifier 46. This amplifier develops a signal "A," which is in the form of a pair of pulses occurring at the beginning of each new block of data on the tape, as read in the track 8 of FIGURE 1 by the read heads and corresponding in time to the address portion of that block. The control signal from the amplifier 46 controls the block address core register 44 in a manner to be described, so that the address portion of each block as the tape is scanned by the read heads is set up in a current address register 48.

A desired address register 50 is provided in which the desired address is set up by appropriate means, such as programming. The registers 48 and 50 are connected to a compare network 52. The compare network causes development of an output signal "M" whenever the address in the current address register 48 corresponds to the address set up in the desired address register 50.

The block address core register 44 is connected to an output core buffer 54. The buffer 54 is controlled by a column magnetic switch 56 and by a row magnetic switch 58. The row magnetic switch 58 also controls the block address core register 44. The column magnetic switch 56, in turn, is controlled by a driver circuit 60, and the row magnetic switch 58 is controlled by a driver circuit 62.

The output core buffer 54 is loaded under the control of a load circuit 64, and this buffer is unloaded under the control of an unload circuit 66. The output core buffer 54 is connected to an amplifier 55, which in turn is connected back to the data processor associated with the equipment. The amplifier 55 is under the control of an instruction "3." from the data processor, which indicates a readiness for the contents of the output buffer 54 to be read into the appropriate memory block of the processor.

When it is desired to load data from the data processor into a particular data block on tne storage tape 20, such data is introduced into the inhibit amplifier 32. This data, for example, may represent a complete new set of information coresponding to a particular item which is to be identified by a particular address on the tape 20. Alternately, the data may be updated information concerning an item or individual which is permanently represented by the particular address on the tape. Additionally, information composed of detailed program instruction for the associated data processor may be stored in a given tape location.

Upon an instruction "8U" from the data processor which indicates a readiness to write into the input core buffer 22 an eight word block of data, the output $P_0$ from the data processors is fed into the inhibit amplifier 32. The "$\bar{\theta}$" component of the input is a derived signal corresponding to the data portion of the block, and the "$\theta$" component corresponds to the address portion. It might be pointed out that the asterisk (*) component of the input refers merely to an interlocked condition of the instruction "8U" (as will be described).

A signal "8U*$\bar{\theta}$" is introduced to the load circuit 28 to cause the load circuit to place the input core buffer 22 in a loading condition to receive the block of data from the amplifier 32. This load circuit is keyed by a clock pulse signal "N" from the data processor merely to reduce the power dissipation of the particular transistors used in the load circuit. The signal "8U*$\theta P_0$" is introduced to the desired address register 50 to cause the address of the data from the data processor to be set up in the desired address register.

A signal "8U*$\bar{\theta}$N" is introduced to the driver circuits 38 and 40 to cause the input core buffer 22 to be actuated in a manner to be described so that the buffer responds to the serially injected block of data from the data processor to store that block. At the termination of the eight word block, the instruction "8U" goes false corresponding to a non-operative condition to terminate the control of the input buffer. At this moment, the data portion of the eight word block is stored in the input buffer 22, and its address portion is stored in the desired address register 50. It is now desired to record the block of data that is now stored in the input buffer at the proper position on the tape 20, this position being designated by an address recorded on the tape which corresponds to the address set up in the desired address register 50.

The tape mechanism is activated to cause the tape to move past the associated read heads. As each address is sensed by the read heads, the block address core register 44 under the control of the output signal "A" from the amplifier 46 causes the corresponding address to be fed into the current address register 48. When the address in the current address register 48 corresponds to the address of the block of data in the input buffer 22 (whose address is stored in the register 50), the compare network 52 develops an output signal "M." This output signal causes the unload circuit 30 to condition the input core buffer 22 to be unloaded in an essentially parallel manner to the amplifiers 24 and to the magnetic storage tape 20. The unloading of the input core buffer 22 is obtained through the operation of the column magnetic switch 34. This switch responds to the direction $Z\bar{A}MW$ to unload the input buffer when the compare network 52 causes the output signal "M" to become true, and this unloading occurs after the address portion of the block (as designated by the output signal "A" from the amplifier 46) has passed the write heads. This unloading of the input core buffer is also under the control of the tape clock signal "Z" from the amplifier 26 so that the bits of data may be properly registered and synchronized on the magnetic tape 20.

In the manner described briefly above, and as will be described in greater detail subsequently, the block of data from the data processor, therefore, is introduced to its proper position on the magnetic storage tape 20.

Now, when it is desired to read a certain block from the magnetic storage tape 20, and to feed that block to the associated data processor, the address for the desired block is set up in the desired address register 50 under an instruction from the data processor, or other equally suitable means. As before, the read heads scan the magnetic tape 20, and the successive addresses are selected by the block address core register 44 and fed to the current address register 48. The block address core register now is controlled by the row magnetic switch 58 which is being driven by the driver 62 under the control of a signal "NL." Again when the desired address is reached, the compare network 52 produces an output signal "M." This output signal activates the load circuit 64 associated with the output core buffer 54, and it also causes the driver circuit 60 to activate its magnetic switch 56. Therefore, the data from the desired block is fed in a parallel manner into the output core buffer 54.

Finally, under the control of the instruction "3." from the data processor, which instruction indicates a readiness on the part of the data processor to receive the eight word block from the output core buffer 54, the unload circuit 66 is activated, as is the driver circuit 62 and also circuit 60. This causes the output core buffer 54 to feed the block of data in serial form through the amplifier 55 to the memory unit of the data processor. The signal "$\bar{\theta}3$." unblocks the amplifier 55 for this period, and for the entire data portion of the block during which the instruction $\theta$ is false. The output of the desired address register 50 is also passed to an amplifier 57 whose output also extends to the data processor. The amplifier 57 is under the control of the instruction "$\theta 3$." Therefore, the amplifier 57 is unblocked only for the address portion of the block. This causes the address portion of the block to be fed, together with the data portion, to the data processor.

In the manner described, therefore, a block of data may be selected from the magnetic tape 20 and fed to the data processor for processing. The processed block may then be returned to the equipment of the invention and it may rapidly be reinserted in the described manner at its proper position on the tape 20. The control functions of the equipment are under the control of the indicated instructions synthesized from the data processor, as will be described in detail, and also under the control of the indicated clock signals derived from the tape itself which will also be described in more detail.

Figures 5, 6, 7:
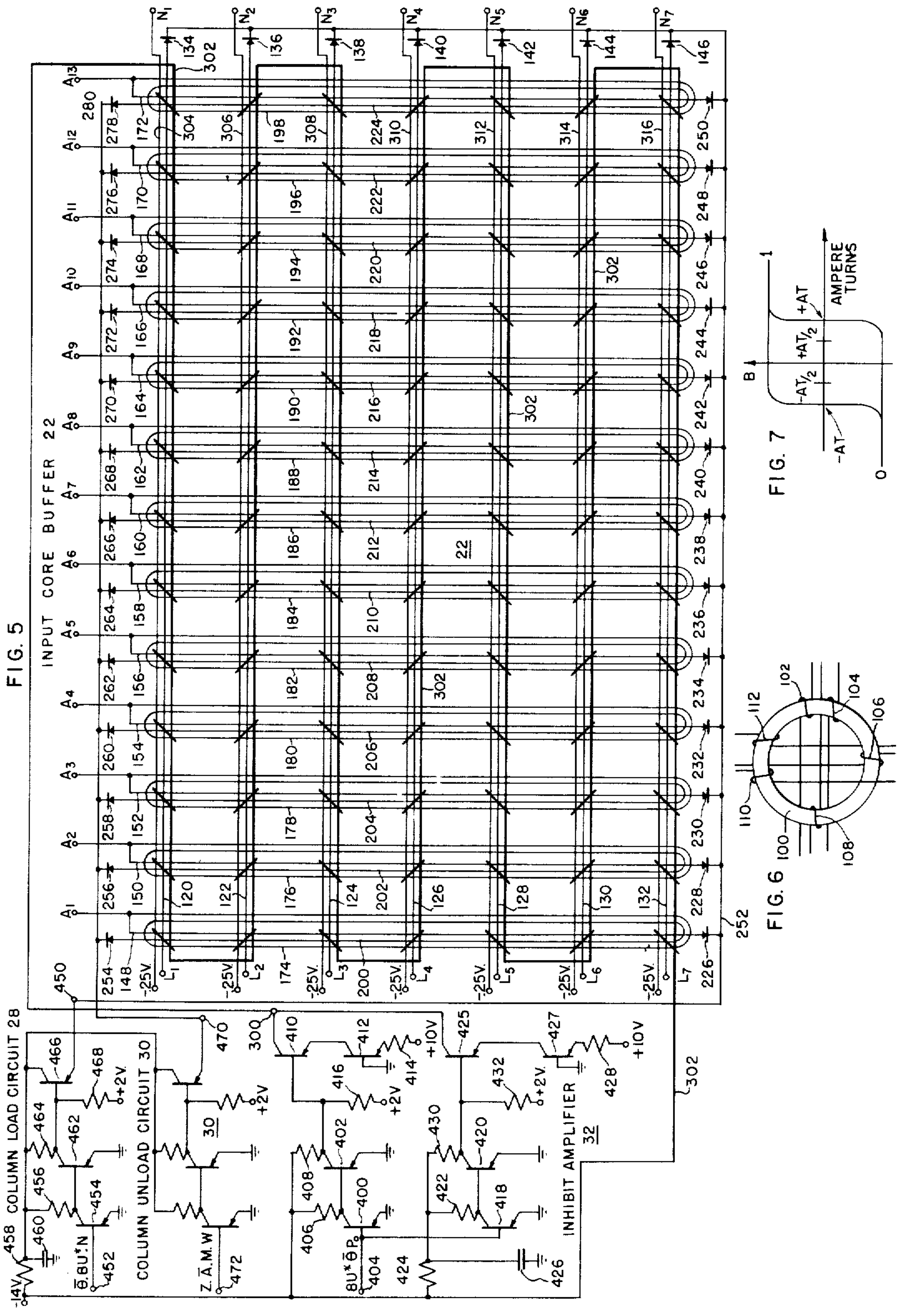
FIGURE 5 is a circuit diagram of the input core buffer of the system and various control circuitry associated with that buffer, the buffer itself being shown in schematic form because the constructional details of the magnetic matrix constituting the buffer are known to the art.
FIGURE 6 shows one of the magnetic cores used in the matrix of FIGURE 5, the core being illustrated as having a toroidal or annular shape, and the core having a plurality of coils associated with it.
FIGURE 7 is the hysteresis loop of the core of FIGURE 6 which shows the general rectangular properties of the magnetic hysteresis characteristics of the core material.

The input core buffer is indicated in schematic form in FIGURE 5. As noted above, this buffer in one constructed embodiment of the invention contains forty-five columns and fourteen rows of magnetic cores. However, for purposes of simplicity and to facilitate the description of the system and apparatus of the invention, the buffer is illustrated in FIGURE 5 with a reduced number of cores and with alternate columns only being illustrated. The illustrated buffer of FIGURE 5 contains thirteen columns and seven rows of magnetic cores. It is recognized that this illustrated buffer may not be a desirable embodiment.

The magnetic cores in the buffer of FIGURE 5 are represented in each instance by a diagonal line. This is a known and conventional means for representing these cores. It will be understood that each diagonal line of FIGURE 5 represents a toroidal or annular core such as the core 100 shown in FIGURE 6. Each such core, as indicated above, has a relatively high coercive force, and each core has an essentially rectangular hysteresis curve, as indicated in FIGURE 7.

In the schematic representation of the buffer of FIGURE 5, each line passing through a core, as represented by a diagonal line, represents a coil wound in toroidal fashion around the particular core, these coils being interconnected to form windings in accordance with a desired matrix configuration. These coils are shown, for example, as 102, 104, 106, 108, 110 and 112 in the core assembly shown in FIGURE 6.

The input buffer of FIGURE 5 includes a series of input terminals L1 to L7, inclusive (hereinafter designated as L1–L7). These terminals are connected to corresponding switching terminals of the row magnetic switch 36 of FIGURE 4. It will be understood that in a practical constructed embodiment of the invention, fourteen such terminals would be provided. The input core buffer of FIGURE 5 also includes a series of column input terminals A1–A13, inclusive (hereinafter designated as A1–A13). These column input terminals are connected to corresponding terminals of the column magnetic switch 34 of FIGURE 4. It will be understood that in an actual constructed embodiment, forty-five of such column input terminals would be provided. Other acceptable column counts are 9 and 39. The number of rows and columns can have no common factors for satisfactory operation of the buffers.

The input terminals L1–L7 are respectively connected to a plurality of windings 120, 122, 124, 126, 128, 130 and 132. These windings each link a coil on each core of an associated row of cores in the buffer. The ends of the windings remote from the input terminals are respectively connected to anodes of a plurality of diodes 134, 136, 138, 140, 142, 144 and 146. The cathodes of these diodes are connected in common to the negative terminal of a source of direct voltage. This source may, for example, have a value of −10 volts where the driving transistors are of the PNP conductivity type. The coils comprising the windings 120, 122, 124, 126, 128, 130 and 132 in each instance may be a single-turn coil.

The column input terminals A1–A13 are connected to a plurality of windings 148, 150, 152, 154, 156, 158, 160, 162, 164, 166, 168, 170 and 172. These windings link respective one-turn coils in each associated column of cores. The terminals A1–A13 are also connected respectively to a first set of windings 174, 176, 178, 180, 182, 184, 186, 188, 190, 192, 194, 196 and 198 which link the various cores in the respective columns and which interconnect single-turn coils and these windings are respectively connected to a second set of windings 200, 202, 204, 206, 208, 210, 212, 214, 216, 218, 220, 222 and 224 which also link the various cores in the respective columns and which interconnect single-turn coils.

The remote ends of the windings 148, 150, 152, 154, 156, 158, 160, 162, 164, 166, 168, 170 and 172 are respectively connected to the anodes of a plurality of diodes 226, 228, 230, 232, 234, 236, 238, 240, 242, 244, 246, 248 and and 250. The cathodes of these diodes are connected in common to a lead 252. The remote ends of the windings 200, 202, 204, 206, 208, 210, 212, 214, 216, 218, 220, 222 and 224 are connected respectively to the anodes of a plurality of diodes 254, 256, 258, 260, 262, 264, 266, 268, 270, 272, 274, 276 and 278. The cathodes of these diodes are connected in common to a lead 280.

The arrangement is such that when the lead 252, for example, is connected to a negative voltage source, a plurality of circuits may be selectively completed from the input terminals A1–A13 through respective ones of the windings 148, 150, 152, 154, 156, 158, 160, 162, 164, 166, 168, 170 and 172. A particular current flowing through any one of these circuits will provide a certain number of ampere-turns $+H_{max}/2$ in each of the cores. On the other hand when the lead 280 is returned to a negative voltage source, for example, the same current from any of the input terminals A1–A13 will provide double the ampere-turns $-H_{max}$ in each of the cores, as compared with the condition when the lead 252 was returned to the negative voltage source. The reason for this is that for the condition in which the lead 280 is connected to the negative voltage source, each column of cores has two windings linking the individual cores, as compared with a single winding in the case where the lead 252 was connected to the negative voltage source.

The output terminal 300 of the inhibit amplifier 32 is connected to a winding 302 which links all the cores in the buffer 22. The remote end of the winding 302 is connected to the negative terminal of a direct voltage source having a value of, for example, −14 volts.

The input core buffer 22 also has a series of output terminals N1–N7 which are connected to respective ones of the write amplifiers 24 of FIGURE 4. As with the input terminals L1–L7, in the actual constructed embodiment of the invention in which the input buffer had fourteen rows of cores, that buffer would have fourteen output terminals instead of seven, as illustrated. The output terminals are connected to a plurality of windings 304, 306, 308, 310, 312, 314, 316. These windings respectively link the cores of respective ones of the rows in the buffer. In each instance, the remote end of these windings is returned to the negative terminal of a direct voltage source having a value of, for example, −.25 volt.

The inhibit amplifier 32 includes two separate amplifiers connected in parallel to provide the desired current flow through the winding 302 of the buffer. This current flow, for example, may be of the order of 200 milliamperes. The first section of the amplifier includes a pair of transistors 400 and 402. These transistors may be of the usual low-current amplifier type as presently designated 2N114. The transistors 400 and 402 are of the PNP type (as are all the transistors in the system to be described), and they are connected as cascaded grounded emitter amplifiers. The input terminal 404 of the amplifier is connected to the base of the transistor 400. A resistor 406, of, for example, 5.6 kilo-ohms, is connected between the collector of the transistor 400 and the negative terminal of the 14-volt voltage source. The collector of the transistor 400 is connected to the base of the transistor 402. A resistor 408 having a resistance of, for example, 300 ohms is connected between the collector of the transistor 402 and the negative terminal of the 14-volt voltage source.

The collector of the transistor 402 is connected to the base of a power transistor 410. The emitter of the transistor 410 is connected to the collector of a second power transistor 412. The base of the transistor 412 is grounded, and its emitter is connected to a resistor 414. The resistor 414 is connected to the positive terminal of a 10-volt voltage source. A resistor 416 is connected to the base of the transistor 410 and to the positive terminal of a 2-volt voltage source. The transistors 410 and 412 may be of the type designated as 2N316.

The input terminal 404 is also connected to the base of a low current transistor 418, which, together with a second transistor 420, is connected as a two-stage grounded-emitter amplifier. The transistors 418 and 420 may each be of the type presently designated as 2N114. A 5.6 kilo-ohm resistor 422 is connected to the collector of the transistor 418 and to the junction of a resistor 424 and a capacitor 426. The resistor 424 may have a resistance of 10 ohms, and the capacitor 426 may have a capacity of 20 microfarads. The resistor 424 is connected to the negative terminal of the 14-volt voltage source, and the capacitor 426 is grounded. The resistor 424 and capacitor 426 are connected as a usual R-C filter. The collector of the transistor 420 is connected to the base of a transistor 425. The transistor 425 has its collector connected to the collector of the transistor 410, and has its emitter connected to the collector of a transistor 427. The transistors 425 and 427 are connected as power amplifiers, and these transistors may be of the type designated 2N316. The base of the transistor 427 is grounded, and a resistor 428 is connected between its emitter and the positive terminal of a 10-volt voltage source. A resistor 430 is connected between the collector of the transistor 420 and the junction of the resistor 424 and capacitor 426. A resistor 432 is connected to the base of the transistor 425 and to the positive terminal of a 2-volt voltage source.

As indicated in FIGURE 5, the input signal introduced to the terminal 404 is designated "$8U*\theta P_0$." The transistors 400 and 418 are held non-conductive until the proper instruction "8U" is received from the data processor, and also until "$\theta$" is false to indicate the data portion only of the block to be read into the input core buffer 22. When these conditions have been fulfilled, the transistors 400 and 418 are in condition to receive the block of output data "$P_0$" from the data processor. This data is in the form of a signal which is normally at zero volts and which assumes a negative value for a binary "0," but which remains at zero voltage for a binary "1."

When the voltage at the input terminal 404 is zero, the transistors 400 and 418 are both nonconductive. This establishes the collectors of these transistors at a negative voltage so that the transistors 402 and 420 are conductive. The conductivity of the transistors 402 and 420 establishes their collectors at a voltage approaching zero so that the power transistors 410, 412, 425 and 427 are held nonconductive. However, each time the voltage at the input terminal 404 drops to a negative value to indicate a binary "0," the conductivity of the transistors in the amplifier 32 is reversed so that the power transistors 410, 412, 425 and 427 become conductive to cause a 200 milliampere current to flow through the buffer winding 302 for each such binary "0."

The lead 252 is connected to the output terminal 450 of the column load circuit 28. The column load circuit 28 has an input terminal 452 which is connected to the base of a PNP transistor 454. This transistor may be of the type presently designated 2N114. The emitter of the transistor 454 is grounded, and its collector is connected to one terminal of a resistor 456. The resistor 456 may have a value of 5.6 kilo-ohms, and is connected to a second resistor 458 of 10 ohms, the second resistor being connected to the negative terminal of the 14-volt voltage source. The junction of the resistors 456 and 458 is connected to a grounded capacitor 460 having a capacity of 20 microfarads.

The collector of the transistor 454 is connected to the base of a transistor 462. The emitter of the latter transistor is grounded, and its collector is connected to a resistor 464. The resistor 464 is connected to the junction of the resistors 456 and 458, and it may have a value of 300 ohms. The transistor 462 may also be of the type presently designated 2N114. The collector of the transistor 462 is further connected to the base of a transistor 466. The transistor 466 may be of the power type, such as is presently designated 2N316. The base of the transistor 466 is connected to a 10 kilo-ohm resistor 468, which in turn is connected to the positive terminal of a 2-volt voltage source. The collector of the transistor 466 is connected to the junction of the resistors 456 and 458, and its emitter is connected to the terminal 450.

The transistor 454 is normally held in a non-conductive condition so that the transistor 462 conducts. The conductivity of the transistor 462 produces a voltage at its collector of the order of zero, so that the power transistor 466 is normally nonconductive. However, upon the instruction "8U" from the data processor to feed information into the input buffer, and also upon the occurrence of the signal "$\bar{\theta}$" indicating the data portion of the block, the transistor 454 becomes conductive to render the transistor 462 nonconductive. This makes the power transistor 466 conductive, and the conductivity of the latter transistor reduces the voltage on its emitter to a negative value approaching 14 volts. This effectively establishes a connection from the terminal 450 to the negative terminal of the 14 volt voltage source.

The clock pulses N from the data processor are also introduced to the input terminal 452. These clock pulses provide the effective connection from the terminal 450 to the negative terminal of the voltage source only for the duration of each pulse. However, as will be evident, the input buffer is controlled by the same clock pulses so that the effective connection is required only during the interval of each positive clock pulse. This provides that the power transistor 466 is intermittently energized only, but at the times it is required, so as to reduce its power dissipation.

In like manner, the lead 280 is connected to the output terminal 470 of the column unload circuit 30. The circuitry and elements in the unload circuit 30 may be identical to those used in the load circuit 28. Therefore, it is believed unnecessary to repeat a detailed description for the unload circuit. The unload circuit has an input terminal 472 to which the signal "ƒAMW" is introduced. In this manner, the lead 280 is effectively connected to the negative terminal of the 14 volt voltage source only for the data portion of a block selected from the tape 20 of FIGURE 4, and only when the compare network 52 develops an output signal M indicating an identity between the address in the current address register 48 (FIGURE U) and the address set up in the desired address register 50. The signal "Z" is the clock signal from the tape, as noted above, and it is introduced to the input terminal 472 to reduce the power dissipation of the power transistor and for the same reasons as the clock signal "N" from the data processor is introduced to the input terminal 452 of the column load circuit 28.

The input core buffer 22 is controlled in a manner to be described by the magnetic switches designated 34 and 36 in FIGURE 4. These magnetic switches are such that they successively cause a current of, for example, 200 milliamperes, to flow in the corresponding rows and columns. The 200 milliamperes current flow provides an ampere-turn value corresponding to AT/2 in FIGURE 7. As shown by the curve of that figure, this current in itself is insufficient to turn over any core in the buffer. However, the coincidence in any core of a 200 milliampere current from the column magnetic switch and of a 200 milliampere current from the row magnetic switch would cause that core to turn over.

Assume now that the load circuit 28 has been activated so that a circuit is effectively established between the lead 252 and the negative terminal of the 14 volt voltage source. Then, the column magnetic switch successively pulses the columns from left to right in FIGURE 5 starting at the terminal A1 and proceeding to the terminal A13. Therefore, a 200 milliampere current pulse successively flows through the windings 148, 150, 152, 154, 156, 158, 160, 162, 164, 166, 168, 170 and 172. It should be pointed out that during the time that the column load circuit is actuated, the current unload circuit 30 is not actuated so that no circuit is established between the lead 280 and the negative terminal of the 14 volt voltage source. Therefore, the successive pulsing of the terminals A1–A13 by the magnetic switch does not produce a resulting current flow through the windings 200, 202, 204, 206, 208, 210, 212, 214, 216, 218, 220, 222 and 224 or through the windings 174, 176, 178, 180, 182, 184, 186, 188, 190, 192, 194, 196 and 198.

While the column magnetic switch is producing current pulses in the successive windings 148, 150, 152, 154, 156, 158, 160, 162, 164, 166, 168, 170 and 172 for the buffer load condition, the row magnetic switch is producing current pulses in the successive windings 120, 122, 124, 126, 128, 130 and 132. These latter current pulses combine with the current pulses from the column magnetic switch in any core in which they appear in coincidence to turn over that core. However, it will be remembered that the data from the inhibit amplifier 32 causes a current flow through all the cores by way of the winding 302 in the presence of each binary 0. This latter current flow is in a direction to oppose the effect of the current from the row or column magnetic switch. Therefore, any core will turn over upon the coincidence of the current pulse from the column magnetic switch and from the row magnetic switch and in the absence of a current pulse from the inhibit amplifier. That is, the selected core will turn over only in the presence of a binary 1. In the presence of a binary 0, however, the inhibit current flow nullifies the effect of the flow from the row and column magnetic switch in the selected core so that that particular core is not turned over.

In the manner described above, the data from the data processor which is serially fed through the inhibit amplifier to the core input buffer 22 is stored in that buffer. Each core in the input buffer 22 has a particular polarity to represent a binary 0, and it has the opposite polarity to represent a binary 1. As will be described, the pulsing of the input buffer 22 by the row and column magnetic switches is such that the buffer is loaded in a diagonal direction. That is, considering the buffer as a series of positive rectangular coordinates in the fourth quadrant with the core at the upper left hand corner being designated as 1, 1; then the loading proceeds, for example, in the following manner 1, 1; 2, 2; 3, 3 . . . 14, 14; 15, 1 . . . 28, 14 . . . referring now to an actual embodiment, and so on, until the entire buffer is loaded by the block of data fed serially into it from the data processor. If may be noted that the 45 position switch rotates 14 complete cycles while the 14 position switch rotates 45 complete cycles to load 630 memory cores.

As noted in the description of the system of FIGURE 4, the input core buffer is loaded and held in a loaded condition until the compare network 52 causes the output signal "M" which indicates that the tape 20 is in position to receive the data from the input core buffer. Then, the input buffer is unloaded through the amplifiers 24 (FIGURE 4) and fed to the tape 20 in its proper location on the tape. For this latter condition, the column load circuit becomes de-activated due to the fact that the instruction "8U" from the data processor has been discontinued. Now, the column unload circuit 30 is activated because of the production of the signal "M" from the compare network 52. The signal "W" is also required, this latter signal being a preparatory signal to prevent the unloading of the input buffer until all the necessary conditions have been fulfilled. The production of the signal "W" will be described subsequently.

Now the circuit is established between the lead 280 and the negative terminal of the 14 volt voltage source. Therefore, the successive pulsing of the terminals A1–A13 by the column magnetic switch causes pulses to flow in the unload windings 174, 176, 178, 180, 182, 184, 186, 188, 190, 192, 194, 196, 198 and 200, 202, 204, 206, 208, 210, 212, 214, 216, 218, 220, 222 and 224, instead of in the load windings 148, 150, 152, 154, 156, 158 160, 162, 164, 166, 168, 170 and 172. Because of the double nature of the unloading windings, the 200 milliampere current flow from the column magnetic switch is sufficient to turn over the various cores. Therefore, each core that had previously been turned over from a 0 to a 1 condition is returned to the 0 condition by the column magnetic switch. However, the magnetic state of any core that had not previously been turned over is relatively unaffected. Therefore, as the columns are successively pulsed, a series of output pulses appear across the terminals N1, N2, N3, N4, N5, N6 and N7, and these pulses as a group successively represent the state of a pulsed column in the input core buffer. That is, a pulse appears at any of these terminals for each column to indicate each binary 1 stored in the cores of that column. Therefore, the data from the input buffer is fed column by column in a parallel form through the amplifiers 24 to the magnetic tape 20 to be recorded in its appropriate position on the tape so that the data may be accurately indexed by its address which, as noted above, is permanently recorded on the tape. It may be noted that relative character positions lose sequential significance due to the core buffer unloading scheme.

Figures 8, 9:
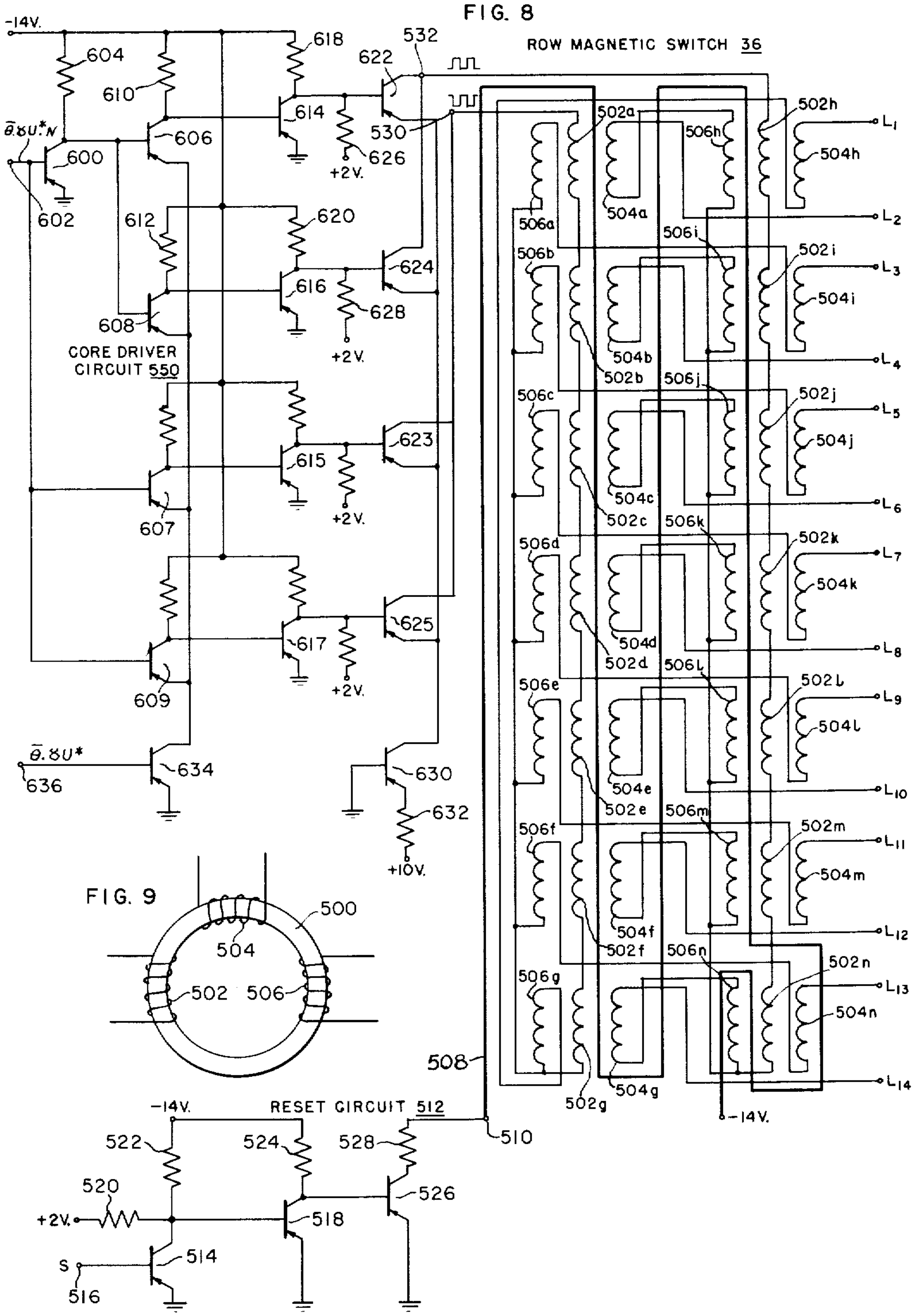
FIGURE 8 is a circuit diagram of a magnetic core switch for controlling the rows of cores in the buffer of the magnetic matrix of FIGURE 5, the circuit of FIGURE 8 also including a phase inverter drive network for the magnetic switch.
FIGURE 9 illustrates one of the cores used in the magnetic switch of FIGURE 8, the core being shown as having a generally toroidal or annular form and also as having several coils wound about it in toroidal manner.

The row magnetic switch for the input buffer 22 is indicated in the right hand side of FIGURE 8. This switch comprises a series of toroidal or annular magnetic cores such as represented as 500 in FIGURE 9. These cores, like the cores of the buffer 22, have a relatively high coercive force and a substantially rectangular hysteresis loop. Therefore, a current of sufficient amplitude through each coil on the core 500 is capable of turning the core over from one magnetic saturation condition to another, provided certain magnetic conditions are met. As also shown in FIGURE 9, each of the cores 500 of the magnetic switch has three coils 502, 504 and 506 wound on it in toroidal form. The cores also have a reset winding 508 (which is shown in FIGURE 8 but which is not shown in FIGURE 9) threading through them for reset purposes.

The winding 508 threads all the cores in a certain direction with the exception of one core, this one core being associated with the coils in the lower right hand corner in FIGURE 8. Then, when a current is passed through the winding 508, all the cores are returned to a saturation state corresponding to 0, except the one core which is returned to a saturation state corresponding to 1. One end of the reset winding 508, as shown in FIGURE 8, is connected to the negative terminal of a 14 volt voltage source, whereas the other terminal of the winding is connected to the output terminal 510 of a reset circuit 512.

The reset circuit 512 includes a grounded emitter PNP transistor 514 of the type presently designated 2N114.

The reset circuit has an input terminal 516 which is connected to the base of the transistor 514. The collector of the transistor 514 is connected to the base of a grounded emitter transistor 518. The latter transistor may be of the type presently designated 2N316. The base of the transistor 518 is connected to a 10 kilo-ohm resistor 520, which, in turn, is connected to the positive terminal of a 2 volt voltage source. The collector of the transistor 514 is connected to one terminal of a resistor 522 which, in turn, is connected to the negative terminal of a 14 volt voltage source. The resistor 522 may have a resistance of 300 ohms. The collector of the transistor 518 is connected to a resistor 524, of, for example, 110 ohms, and this resistor is connected to the negative terminal of the 14 volt direct voltage source. The collector of the transistor 518 is also connected to the base of a transistor 526. This latter transistor may be of the power type designated 2N156, and its emitter is grounded. The collector of the transistor 526 is connected to one terminal of a resistor 528 of 10 ohms, and this resistor is connected to the output terminal 510 of the circuit.

In response to a reset input signal "S" introduced to the input terminal 516, the power transistor 526, is rendered conductive to reset the cores in the magnetic switch 36. As noted above, the cores are all reset to a binary 0 condition, with the exception of the core associated with the coils grouped in the lower right hand corner of FIGURE 8.

As shown in FIGURE 8, the cores of the row magnetic switch are divided in two groups. The coils **502*a*–502*g* of the first group are connected in series, with the free terminal of the coil 502*a* being connected to an input terminal 530 of the switch. In like manner, the coils 502*h*–502*n* of the second group of cores are connected in series, with the free terminal of the coil 502*h* being connected to an input terminal 532 of the magnetic switch. Each of the coils 504*a*–504*n* has one terminal connected respectively to the output terminals L1–L14 of the magnetic switch. As illustrated, the coil 504*h* is connected to the terminal L1, the coil 504*a* is connected to the terminal L2, the coil 504*i* is connected to the terminal L3, the coil 504*b* is connected to the output terminal L4**, and so on. It should be understood that the illustrated magnetic switch is intended to control a fourteen row input core buffer.

Each of the coils **506*a*, 506*b*, 506*c*, 506*d*, 506*e*, 506*f* and 506*g* has one terminal connected to the free terminal of the coil 502*g*. Likewise, each of the coils 506*h*, 506*i*, 506*j*, 506*k*, 506*l*, 506*m* and 506*n* has one terminal connected to the free terminal of the coil 502*n*. The other terminal of the coil 506*a* is connected to the free terminal of the coil 504*i*. The other terminal of the coil 506*b* is connected to the free terminal of the coil 504*j***, and so on.

Assume now that the cores of the magnetic switch have been reset to binary 0, with the exception of the core associated with the group of coils **502*n*, 504*n* and 506*n*, which is reset to binary 1. Now, when a positive-going input pulse is applied to the terminal 532, it causes terminal 532 to go from −14 volts to zero. This, in turn, causes a pulse of current to flow through the coils 502*h*–502*n*. This current pulse has no effect on any of the cores with the exception of the one associated with the coils in the lower right hand corner, because all these cores are reset to a saturated "0" condition on which this current has no effect except to maintain relatively constant flux for an increase of ampere turns (i.e. saturated). However, the core associated with the coils 502*n*, 504*n*, 506*n* is turned over by this current pulse, since its magnetic state was in the "1" direction, and in turning over it induces a voltage across coil 506*n*. This effectively reduces the inductance of the coil 506*n* to the circulating current pulse. The current pulse, therefore, passes through the coil 506*n* and through the coil 504*g* to the winding of the input core buffer connected to the terminal L14. The current pulse, in passing through the coil 504*g*, turns over the core associated with the coils 502*g*, 504*g* and 506*g***.

The next succeeding positive going pulse is introduced to the input terminal 530 and it flows down through the coils **502*a*–502*g*. This latter current pulse has no effect on any of the cores, except the core associated with the coils 502*g*, 504*g* and 506*g* because all the other cores are magnetized in a saturated condition which is not affected by that pulse. However, the core associated with the coils 502*g*, 504*g*, and 506*g* in turning over, effectively reduces the inductance of the coil 506*g* to the latter current pulse. This causes the current pulse to flow through coil 504*h* and through the row of the input core buffer associated with the terminal $L_1$. The current pulse flowing through the coil 504*h*** causes the core associated with that core to turn over.

In like manner, each succeeding positive going pulse introduced to the input terminal 530 travels through the coils **502*a*–502*g* associated with the first group of cores and causes a corresponding pulse to appear at successive ones of the terminals L3, L5, L7, L9, L11 and L13. Also, each such pulse will cause a core of each of the groups to turn over in the manner described. Similarly, each succeeding positive going input pulse introduced to the input terminal 532 will cause a pulse to travel through the coils 502*h*–502n associated with the first group of cores and cause a corresponding pulse to be produced at the successive output terminals L2, L4, L6, L8, L10, L12 and L14. Moreover, each such pulse will turn over a core of the first mentioned group and of the latter group. Therefore, by the successive introduction of positive going pulses to the terminals 530 and 532, alternately switching pulses are successively established in the rows of the input core buffer respectively connected to the output terminals L1–L14**.

It will be appreciated from the foregoing description that the proper operation of the magnetic switch 36 requires that it be alternately pulsed by positive going pulses introduced to the input terminals 530 and 532. This alternate pulsing may be obtained by introducing a first pulse train to the input terminal 532 and an inverted pulse train to the input terminal 530. The leading edges of the pulses of the first pulse train produce the desired positive-going triggering pulses for the magnetic switch and the succeeding trailing edges of the pulses of the second pulse train produce, for example, the desired positive-going triggering pulses for the magnetic switch. The diodes 134, 136, 138, 140, as shown in FIGURE 5, prevent reverse current flow from any succeeding magnetic switch to its adjacent preceding magnetic switch.

The two pulse trains described above are produced by the amplifier driver and inverter circuit 550 of FIGURE 8. The amplifier driver 550 includes a first portion which is connected to the output terminal 532 and a second portion connected to the output terminal 530. The first portion includes an additional transistor stage which effectively inverts the polarity of the output signal with respect to the polarity of the output signal of the second portion.

The additional stage of the first portion includes a PNP transistor 600 having a grounded emitter. The input terminal 602 of the driver circuit is connected to the base of the transistor 600 and a 2.2 kilo-ohm resistor 604 is connected between the collector of the transistor 600 and the negative terminal of a 14 volt voltage source. The collector of the transistor 600 is connected to the base electrode of a transistor 606 and to the base electrode of a transistor 608. A resistor 610 is connected to the collector of the transistor 606 and to the negative terminal of the 14 volt voltage source. This resistor may have a value of 1 kilo-ohm. Likewise, a resistor 612 is connected between the collector of the transistor 608 and the negative terminal of the 14 volt voltage source. This latter resistor may also have a resistance of 1 kilo-ohm.

The collector of the transistor 606 is connected to the base of a transistor 614, and the collector of the transistor 608 is connected to the base of a transistor 616. The emitters of the transistors 614 and 616 are grounded. A pair of resistors 618 and 620 respectively connect the collectors of the transistors 614 and 616 to the negative terminal of the 14 volt voltage source. The resistors 618 and 620 may each be of the order of 300 ohms, and the transistors 614 and 616 may of the type designated 2N114.

The collector of the transistor 614 is connected to the base of a power transistor 622, and the collector of the transistor 616 is connected to the base of a power transistor 624. A resistor 626 is connected between the base of the transistor 622 and the positive terminal of a 2-volt voltage source, and a resistor 628 is connected between the base of the transistor 624 and that positive terminal. Each of the resistors 626 and 628 may have a resistance of 10 kilo-ohms.

The collectors of the transistors 622 and 624 are connected together and to the output terminal 532. Likewise, the emitters of the transistors 622 and 624 are connected together and to the collector of a transistor 630. The base of the transistor 630 is grounded and its emitter is connected to a 50 ohm resistor 632. This resistor is connected to the positive terminal of a 10-volt voltage source. The transistor 630 functions as a voltage regulator and this transistor may be of the type designated 2N101.

The emitters of the transistors 606 and 608 are connected to the collector of a transistor 634. The emitter of the latter transistor is grounded and its base is connected to an input terminal 636.

The second portion of the driver circuit 550 includes a pair of transistors 607 and 609 corresponding to the transistors 606 and 608 and connected in the same manner. The second portion includes a pair of transistors 615 and 617 corresponding to the transistors 614 and 616. Finally, the second portion of the driver includes a pair of transistors 623 and 625 corresponding to the transistors 622 and 624. The collectors of the transistors 623 and 625 are connected together and to the output terminal 530.

Before the driver circuit 550 can be operated, it is necessary for a negative signal to be introduced to the input terminal 636. Such a negative signal causes the transistor 634 to become conductive effectively to complete the circuit to ground from the emitters of the transistors 606, 608, 607 and 609. The input signal introduced to the terminal 636 is represented as "$\bar{\theta}$.8U*." This means that the driver circuit for the row magnetic switch may be actuated only upon the instruction from the data processor to write into the input buffer, and only for the data portion of the block of information read into the buffer.

The same signal is introduced to the input terminal 602 together with the clock signal "N." When the driver is conditioned for translation, the clock signal is passed to the output terminals 530 and 532. Because of the additional stage including the transistor 600 in the first portion of the driver circuit, the signal appearing at the output terminal 532 has the opposite polarity to the signal appearing at the output terminal 530. These are the desired wave forms to drive the row magnetic switch 36, as described above. Therefore, in response to the proper instruction from the data processor, the row magnetic switch 36 is driven by the clock pulses "N" from the data processor and in synchronism with these pulses. The arrangement is such that one-half of the components of the magnetic switch respond to the positive half-cycle of each clock pulse and the other half of the components respond to the negative half-cycle. This unique arrangement enables the driver circuit 550 to be feasibly designed to take care of the load dictates of the magnetic switch.

Figure 10:
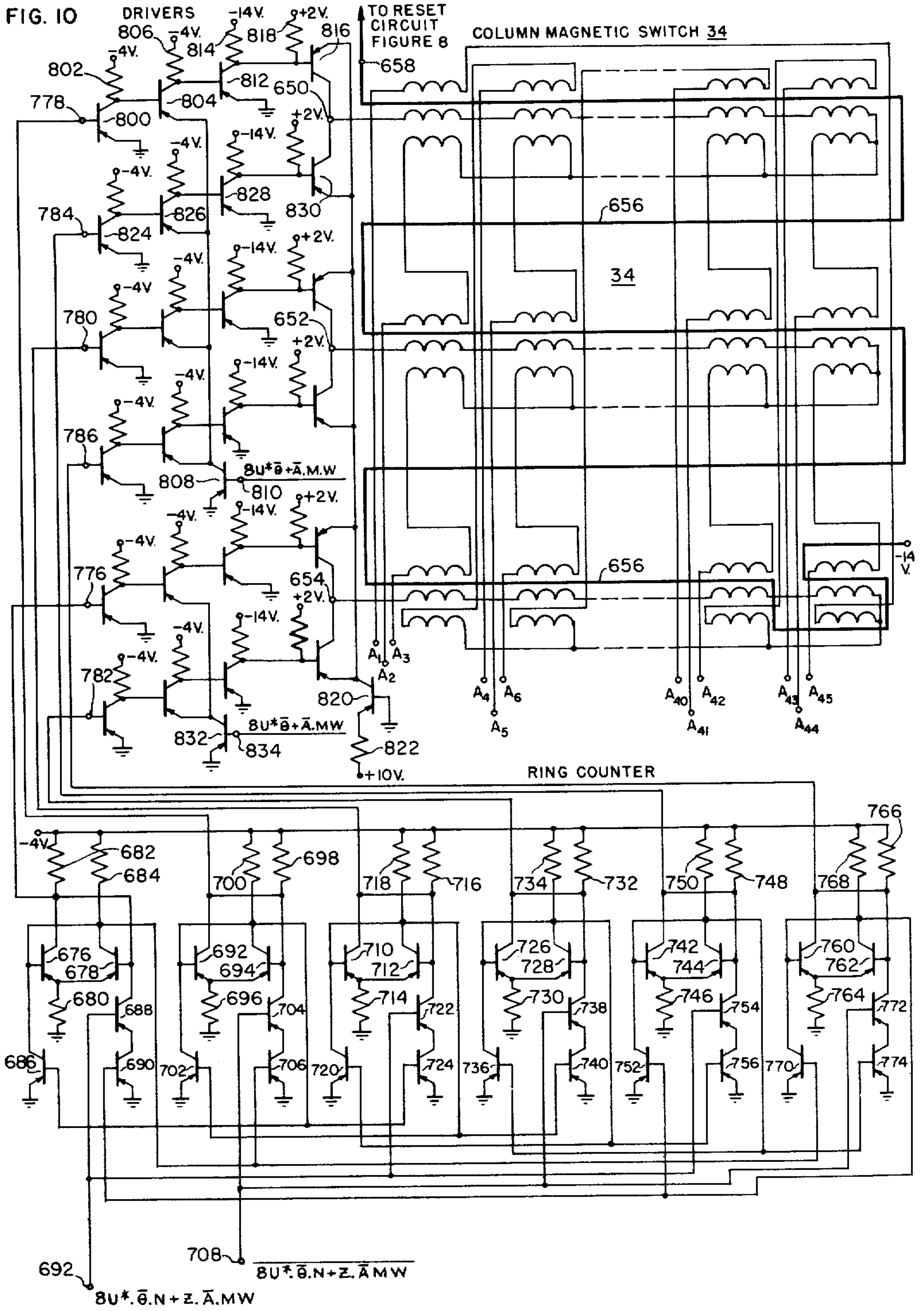
FIGURE 10 is a circuit diagram of a magnetic switch for controlling the columns of cores in the magnetic input core buffer of FIGURE 5, and this circuit diagram also includes a ring counter and associated amplifier for driving the column magnetic switch.

The column magnetic switch of FIGURE 10 is constructed in the same manner as the row magnetic switch of FIGURE 8. For that reason, it is believed that a detailed description of the column magnetic switch is unnecessary. It will be observed, however, that where the row magnetic switch 32 comprised two sections of components, the column magnetic switch 34 includes three such sections. The first section is connected to an input terminal 650, the second section is connected to an input terminal 652, and the third section is connected to an input terminal 654. The column magnetic switch 34 is shown as having forty-five output terminals to control 45 columns as in a constructed embodiment of the invention. The column magnetic switch also has a reset winding 656 which links all the cores. This reset winding has one end connected to the negative terminal of the 14 volt voltage source and it has its other end connected to a terminal 658. The terminal 658 is suitably connected to the reset circuit 512 of FIGURE 8.

As was the case with the row magnetic switch 32, the reset winding 656 links all the cores of the column magnetic switch 34 in such a manner so that current from the reset circuit will set all the cores to a polarity of magnetic saturation indicating, for example, binary 0. All of the cores are reset to binary 0, that is, with the exception of the core associated with the coils in the lower right hand corner in FIGURE 10. This latter core is set to a magnetic saturation corresponding to a binary 1.

The column magnetic switch is controlled by the clock pulses "N" from the data processor for loading data into the input buffer 22, and this switch is controlled by the clock pulses Z from the tape 20 (FIGURE 4) when it is desired to unload the data from the input buffer into the magnetic tape 20. A ring counter, which may be similar to that disclosed in co-pending application, Serial Number 574,657, filed March 29, 1956, in the name of A. J. Pankratz, et al., and which issued August 5, 1958 as Patent 2,846,594, is used to respond to these clock pulses to provide three successive pulses to the respective input terminals 650, 652, and 654 for each clock pulse, will be described in detail. This enables each clock pulse to cause all the coils of the column magnetic switch 34 to be activated without creating an impractical loading condition.

The ring counter of FIGURE 10 includes a pair of transistors 676 and 678. A resistor 680 is connected between the emitters of these transistors and ground. A pair of resistors 682 and 684 are connected to the negative terminal of a 4 volt voltage source and to the respective collectors of the transistors 676 and 678.

A transistor 686 has its collector connected to base of the transistor 676 and to the collector of the transistor 678. The emitter of the transistor 686 is grounded. A transistor 688 has its collector connected to the base of the transistor 678 and to the collector of the transistor 676. The emitter of the transistor 688 is connected to the collector of a transistor 690, and the emitter of the latter transistor is grounded. An input terminal 692 is connected to the base of the transistor 688.

The ring counter also includes a pair of transistors 692 and 694. A grounded resistor 696 is connected to the emitters of these transistors. A pair of resistors 698 and 700 are connected to the negative terminal of the 4 volt voltage source and to the respective collectors of the transistors 692 and 694. A transistor 702 has its collector connected to the base of the transistor 692 and to the collector of the transistor 694. The emitter of the transistor 702 is grounded.

A transistor 704 has its collector connected to the base of the transistor 694 and to the collector of the transistor 692. The emitter of the transistor 704 is connected to the collector of a transistor 706, and the emitter of the latter transistor is grounded. The base of the transistor 706 is connected back to the collector of the transistor 678. An input terminal 708 is connected to the base of the transistor 704.

The ring counter also includes a pair of transistors 710 and 712. The emitters of these transistors are connected to a grounded resistor 714, and their collectors are connected respectively to a pair of resistors 716 and 718. The resistors 716 and 718 are connected to the negative terminal of a 4 volt voltage source.

A transistor 720 has its collector connected to the base of the transistor 710 and to the collector of the transistor 712. The emitter of the transistor 720 is grounded. A transistor 722 has its collector connected to the base of the transistor 712 and to the collector of the transistor 710. The emitter of the transistor 722 is connected to the collector of a transistor 724. The emitter of the transistor 724 is grounded. The base of the transistor 724 is connected back to the collector of the transistor 694.

A pair of transistors 726 and 728 are included in the ring counter. A grounded resistor 730 is connected to the emitters of these transistors. A first resistor 732 is connected to the collector of the transistor 726, and a second resistor 734 is connected to the collector of the transistor 728. The resistors 732 and 734 are both connected to the negative terminal of a 4 volt voltage source.

A transistor 736 has its emitter connected to ground, and the collector of this transistor is connected to the base of the transistor 726 and to the collector of the transistor 728. A transistor 738 has its collector connected to the base of the transistor 728 and to the collector of the transistor 726. The emitter of the transistor 738 is connected to the collector of a transistor 740, and the emitter of the latter transistor is grounded. The base of the transistor 740 is connected to the base of the transistor 702 and to the collector of the transistor 712. The base of the transistor 722 is connected to the input terminal 692 and the base of the transistor 738 is connected to the input terminal 708.

The ring counter also includes a pair of transistors 742 and 744. The emitters of these transistors are connected to a grounded resistor 746. A pair of resistors 748 and 750 are connected to the negative terminal of the 4 volt voltage source and to respective ones of the collectors of the transistors 742 and 744. A transistor 752 has its collector connected to the base of the transistor 742 and to the collector of the transistor 744. The emitter of the transistor 752 is grounded.

A transistor 754 has its collector connected to the base of the transistor 744 and to the collector of the transistor 742. The emitter of the transistor 754 is connected to the collector of a transistor 756. The emitter of the transistor 756 is grounded. The base of the transistor 756 is connected to the collector of the transistor 728 and to the base of the transistor 720.

A pair of transistors 760 and 762 are included in the ring counter. The emitters of these transistors are connected to a grounded resistor 764. The collector of the transistor 760 is connected to a resistor 766, and the collector of the transistor 762 is connected to a resistor 768. The resistors 766 and 768 are connected to the negative terminal of a 4 volt voltage source.

A transistor 770 has its collector connected to the base of the transistor 760 and to the collector of the transistor 762. The emitter of the transistor 770 is grounded, and the base of this transistor is connected back to the collector of the transistor 678 and to the base of the transistor 706.

A transistor 772 has its collector connected to the base of the transistor 762 and to the collector of the transistor 760. The base of the transistor 772 is connected to the input terminal 708 and the base of the transistor 754 is connected to the input terminal 692. The emitter of the transistor 772 is connected to the collector of a transistor 774. The emitter of the latter transistor is grounded and its base is connected back to the collector of the transistor 744 and to the base of the transistor 736.

The collector of the transistor 676 is connected to an output terminal 776. The collector of the transistor 693 is connected to an output terminal 778, the collector of the transistor 710 is connected to an output terminal 780, and the collector of the transistor 726 is connected to an output terminal 782. Likewise, the collector of the transistor 742 is connected to an output terminal 784 and the collector of the transistor 760 is connected to an output terminal 786.

An input signal "$8U*\bar{\theta}N$" is introduced to the input terminal 692 and an input signal "$\overline{8U*\theta N}$" is introduced to the input terminal 708 to drive the column magnetic switch 34 when it is desired to load data from the data processor into the input core buffer 22 of FIGURE 4. It will be remembered that this input signal includes the instruction "8U" from the data processor to write into the input buffer, together with the signal "$\theta$" representing the data portion of the block to be loaded into the buffer. When these conditions have been fulfilled, the clock pulses "N" from the data processor are introduced to the input terminal 692 to trigger the ring counter. Likewise, the phase inverted clock pulses $\bar{N}$ are introduced at this time to the input terminal 708.

In like manner, when it is desired to actuate the magnetic switch 34 to cause the input core buffer 22 of FIGURE 4 to feed its data into the data amplifiers, and when the compare network 52 develops its output signal "M" as described above, the ring counter is triggered by the clock pulses "Z" and by the clock pulses "$\bar{Z}$" from the magnetic tape 20. The first set of clock pulse is introduced to the input terminal 692 and the second set is introduced to the input terminal 708.

It will be understood that the transistors 676 and 678, 693 and 694, 710 and 712, 726 and 728, 742 and 744, 760 and 762 are cross-connected as bi-stable flip-flop circuits, so that when one of each pair of transistors is conductive the other transistor of the pair is cut off.

The transistors in the ring counter, and all those in the entire system to be described, are of the PNP type. As is well known, when a negative voltage is applied to the base of a PNP type of transistor relative to the potential on the emitter, the positive charges in the emitter are attracted toward the base. If sufficient acceleration is imparted to the positive charges by the voltage between the base and emitter of the transistor, the positive charges continue their movement past the base to the collector of the transistor. This is especially true when a negative voltage is applied to the collector of the transistor so that the collector will exert a further attractive force on the positive charges traveling from the emitter.

The transistors in each flip-flop of the ring counter are cross-connected so that one of the transistors is conductive and the other transistor is cut off at any instant. For example, when a negative voltage is introduced to the base of the transistor 676, the transistor becomes conductive. This causes current to flow through a circuit including the resistor 680, the emitter and collector of the transistor 676, the resistor 682 to the voltage source. The flow of current through the transistor 676 causes a relatively low impedance to be produced between the emitter and collector of the transistor relative to the value of the resistor 682. Because of this difference in impedance, a voltage approaching ground potential is produced on the collector of the transistor 676.

The ground potential on the collector of the transistor 676 is introduced to the base of the transistor 678. Since no significant voltage difference is produced between the base and emitter of the transistor 678, the transistor becomes non-conductive. This prevents current from flowing through a circuit including the resistor 680, the transistor 678, the resistor 684, and the voltage source. By preventing current from flowing through this circuit, a negative voltage is produced on the collector of the transistor 678. This negative votlage is introduced to the base of the transistor 676 to maintain the flow of current through the latter transistor in a negative manner.

The transistor 676 remains conductive and the transistor 678 remains nonconductive until the introduction of a negative signal to the base of the transistor 678. This signal makes the transistor 678 conductive and produces a flow of current through a circuit including the resistor 680, the transistor 678, the resistor 684 and the voltage source. Because of the low impedance produced in the transistor 678, a voltage approaching ground potential is produced on the collector of the transistor 678 when current flows through the transistor.

The ground potential on the collector of the transistor 678 is introduced to the base of the transistor 676 to cut off the transistor 676 in a regenerative manner. Since the transistor 676 becomes cut off, current is not able to flow through a circuit including the resistor 680, the transistor 676, the resistor 682 and the voltage source. This causes a negative voltage to be produced on the collector of the transistor 676. This negative voltage is introduced to the base of the transistor 678 to maintain a flow of current through the transistor.

The bistable flip-flop formed in part by the transistor 676 and 678 is described in detail in copending application, Serial Number 565,093, filed February 13, 1956, in the name of Frank A. Hill, et al. The flip-flop circuits made up by the transistors 693 and 694, 710 and 712, 726 and 728, 742 and 744, 760 and 762, are also similar to the flip-flop circuit described in the copending application, Serial Number 565,093. In each instance, the individual flip-flops will be considered as being in a false state when the right hand transistor is conductive, and will be considered as being in a true state when the left hand transistor of each pair is conductive.

Assume that at the start of the operation, all of the flip-flops including the transistors 676 and 678, 710 and 712, 726 and 728, 742 and 744, 760 and 762 are in their false state, such that the left hand transistor of each pair is nonconductive and the right hand transistor of each pair is conductive. Further assume that the flip-flop made up of the transistors 693 and 694 is in its true state in which the transistor 693 is conductive and the transistor 694 is nonconductive. Since the right transistor 694 of the flip-flop is nonconductive, a voltage of negative polarity is produced on the right output terminal of the flip-flop. This voltage is introduced to the base of the transistor 724 to condition the transistor conductive. By conditioning transistor 724 conductive, a potential approaching ground may be produced on the collector. This potential would be introduced to the emitter of the transistor 722.

Upon the introduction of the triggering signal to the input terminal 692, the transistor 722 becomes conductive because a negative potential is then applied to the base of that transistor at the time that a ground potential is applied to the emitter. By making the transistor 722 conductive, a ground potential is produced at its collector for introduction to the right input terminal of the flip-flop made up by the transistors 710 and 712.

The ground potential introduced to the right input terminal of the flip-flop mentioned immediately above triggers the flip-flop so as to render the right hand transistor 712 non-conductive and make the left transistor 710 conductive. By cutting off the right transistor 712, a voltage of negative polarity is produced on the right output terminal of the flip-flop. This voltage is introduced to the base of the transistor 702 to make that transistor conductive. When the transistor 702 becomes conductive, it causes a potential approaching ground to be produced on the collector of the transistor. This potential acts to cut off the left transistor 693 of the flip-flop made up of the transistors 693 and 694. This action, of course, makes the right transistor 694 of the pair conductive. The flip-flop made up of the transistors 693 and 694 is, therefore, triggered to its false state.

The triggering of the flip-flop made up of the transistors 710 and 712 to its true state can be logically expressed as:

$$n_3=N_1\bar{N} \quad (1)$$

where $n_3$=a triggering signal introduced to the right input terminal of the flip-flop formed by the transistors 710 and 712;

$N_1$=a voltage of negative polarity on the right output terminal of the flip-flop formed by the transistors 693 and 694; and $\bar{N}$=a triggering clock signal introduced to the input terminal 692.

Likewise, the triggering of the flip-flop formed by the transistors 693 and 694 to its false state can be logically expressed as:

$$\bar{n}_1=N_3 \quad (2)$$

where $\bar{n}_1$=the introduction of a triggering signal to the base of the transistor 693; and $N_3$=the production of a voltage of negative polarity on the right output terminal of the flip-flop formed by the transistors 710, 712.

The voltage of negative polarity produced on the right output terminal of the flip-flop formed by the transistors 710 and 712 is also introduced to the base of the transistor 740. This voltage makes the transistor 740 conductive such that a voltage approaching ground is produced on the collector of the transistor. The ground potential on the collector of the transistor 740 is in turn introduced to the emitter of the transistor 738. Upon the occurrence of the next triggering signal introduced to the input terminal 708, a negative potential is introduced to the base of the transistor 738 to make the transistor conductive.

When the transistor 738 becomes conductive, it causes a potential approaching ground to be produced on the collector of the transistor. This potential is introduced to the base of the transistor 728 to cut off any flow of current through the transistor such that a negative voltage is produced on the collector of that transistor. Since the transistor 728 becomes cut off, the transistor 726 of that flip-flop becomes conductive. By cutting off the transistor 728, a potential of negative polarity is produced on the collector of the transistor.

The triggering of the flip-flop formed by the transistors 726, 728 for the production of a negative potential on the collector of the transistor 728 and a ground potential on the collector of the transistor 726, can be logically expressed as triggering of this flip-flop to its true state as follows:

$$n_6=N_3N \quad (3)$$

where $n_6$=the introduction of a triggering signal to the base of the transistor 728;

$N_3$=the production of a voltage of negative polarity on the right output terminal of the flip-flop formed by the transistors 710 and 712, and $N$=a triggering clock signal introduced to the input terminal 708.

The voltage of negative polarity produced on the collector of the transistor 728 is introduced to the base of the transistor 720 to produce a flow of current through that transistor. By making the transistor 720 conductive, a potential approaching ground is produced on the collector of the transistor. This potential is introduced to the left input terminal of the flip-flop formed by the transistors 710 and 712 to trigger the left transistor 710 to a state of non-conductivity and the right transistor in the flip-flop to a state of conductivity. Since the right transistor in the flip-flop is in a state of conductivity, a potential approaching ground is produced on the right output terminal of the flip-flop.

The introduction of triggering signals to the left input terminal of the flip-flop formed by the transistors 710 and 712 to trigger that flip-flop to a false state can be expressed by the following logical equation:

$$\bar{n}_3 = N_6 \qquad (4)$$

where $\bar{n}_3$=the introduction of a triggering signal to the left input terminal of the flip-flop formed by the transistors 710 and 712; and $N_6$=the production of a voltage of negtive polarity on the collector of the transistor 728.

In like manner to that described above, and as fully described in the co-pending application, Serial Number 574,657, the successive triggering of the ring counter by the clock pulses N and $\bar{N}$ introduced to the input terminals 692 and 708 causes pulses to appear in succession across the output terminals 778, 784, 780, 786, 776 and 782.

The first triggering pulse in the sequence described above causes the potential of the output terminal 780 first to drop from a value approaching ground to a negative value. Then, the potential of the output terminal 782 drops from ground to a negative value, followed by the potential of the output terminal 784. Then the potential of the output terminal 786 drops to a negative value, followed by the potential of the output terminal 776. Finally, the potential of the output terminal 778 drops to a negative value, and the sequence repeats itself.

A grounded emitter PNP transistor 800 is connected to the output terminal 778 of the ring counter. A resistor 802 connects the collector of the transistor 800 to the negative terminal of a 4 volt voltage source. The collector of the transistor 800 is connected to the base of a transistor 804. The collector of the latter transistor is connected to a 1 kilo-ohm resistor 806, and this resistor is also connected to the negative terminal of the 4 volt voltage source. The emitter of the transistor 804 is connected to the collector of a grounded emitter PNP transistor 808. The base of the latter transistor is connected to an input terminal 810.

The collector of the transistor 804 is connected to the base of a power PNP transistor 812. A 300 ohm resistor 814 connects the collector of the power transistor to a 14 volt voltage source, and the emitter of the transistor 812 is grounded. The collector of the transistor 812 is connected to the base of a power transistor 816, and a 10 kilo-ohm resistor 818 connects that base to the positive terminal of a 2 volt voltage source. The collector of the transistor 816 is connected to the input terminal 650 of the column magnetic switch 34. The emitter of the transistor 816 is connected to the collector of a transistor 820. The latter transistor serves as a current regulator and it has a grounded base. This transistor may be of the type designated 2N101. A 50 ohm resistor 822 may be typically connected between the emitter of the transistor 820 and the positive terminal of a 10-volt voltage source.

The output terminal 784 of the ring counter is connected to the base of a transistor 824 of a transistor driver amplifier. The transistor 824 and a transistor 826 are connected in a manner similar to the transistors 800 and 804. The collector of the transistor 826 is connected to the base of a transistor 828. The transistor 828 and a transistor 830 are connected in a manner similar to the transistors 812 and 816. The collector of the transistor 830 is connected to the input terminal 650 of the column magnetic switch 34.

A similar transistor amplifier driver circuit is connected between the output terminals 780 and 786 of the ring counter and the input terminal 652 of the column magnetic switch. Likewise, a similar transistor amplifier driver circuit is connected between the output terminals 776 and 782 of the ring counter and the input terminal 654 of the column magnetic switch. The latter amplifier driver circuit includes a transistor 832 which serves the same function as the transistor 808, and which has its base connected to an input terminal 834.

The signals "$8U*\bar{\theta}+\bar{A}.MW$" are introduced to the input terminals 810 and 834 to assure that the transistors 808 and 832 will be conductive only upon the proper instruction from the data processor, or upon the equality direction from the compare network 52 of FIGURE 4, and also only for the data portion "$\bar{\theta}$" of the block from the data processor, or "$\bar{A}$" from the magnetic tape. Only when the transistors 808 and 832 are conductive is the circuit completed for the transistors such as the transistors 804 and 826 to ground, and only then will the transistor driver and amplifier circuits introduce signals from the ring counter to the input terminals of the magnetic switch.

It is evident that the transistors such as the transistors 800 and 824, which have their bases connected to the output terminals of the ring counter, will become conductive only when those output terminals are driven from ground to a negative polarity. As noted above, the first clock pulse "N" (or "Z") will drive the output terminal 782 negative to introduce a pulse to the input terminal 654. The first clock pulse "$\bar{N}$" (or "$\bar{Z}$") will cause the output terminal 784 to assume a negative voltage so that a drive pulse is introduced to the input terminal 650 of the magnetic switch 34. The succeeding clock pulse "N" or "Z" will cause the output terminal 786 to assume a negative value to produce a drive pulse at the input terminal 652 of the magnetic switch. Likewise, the next drive pulse "$\bar{N}$" or "$\bar{Z}$" will cause the output terminal 776 to go negative to produce a drive pulse on the input terminal 654. In this manner, the ring counter cycles to produce drive pulses successively on the terminals 650, 652 and 654 of the column magnetic switch 34. These drive pulses are such as to cause the column magnetic switch 34 to operate in conjunction with the row magnetic switch 36 to load the input core buffer 22, or to operate alone in the manner described to cause data in the input core buffer to be fed to the magnetic tape 20.

Figure 11:
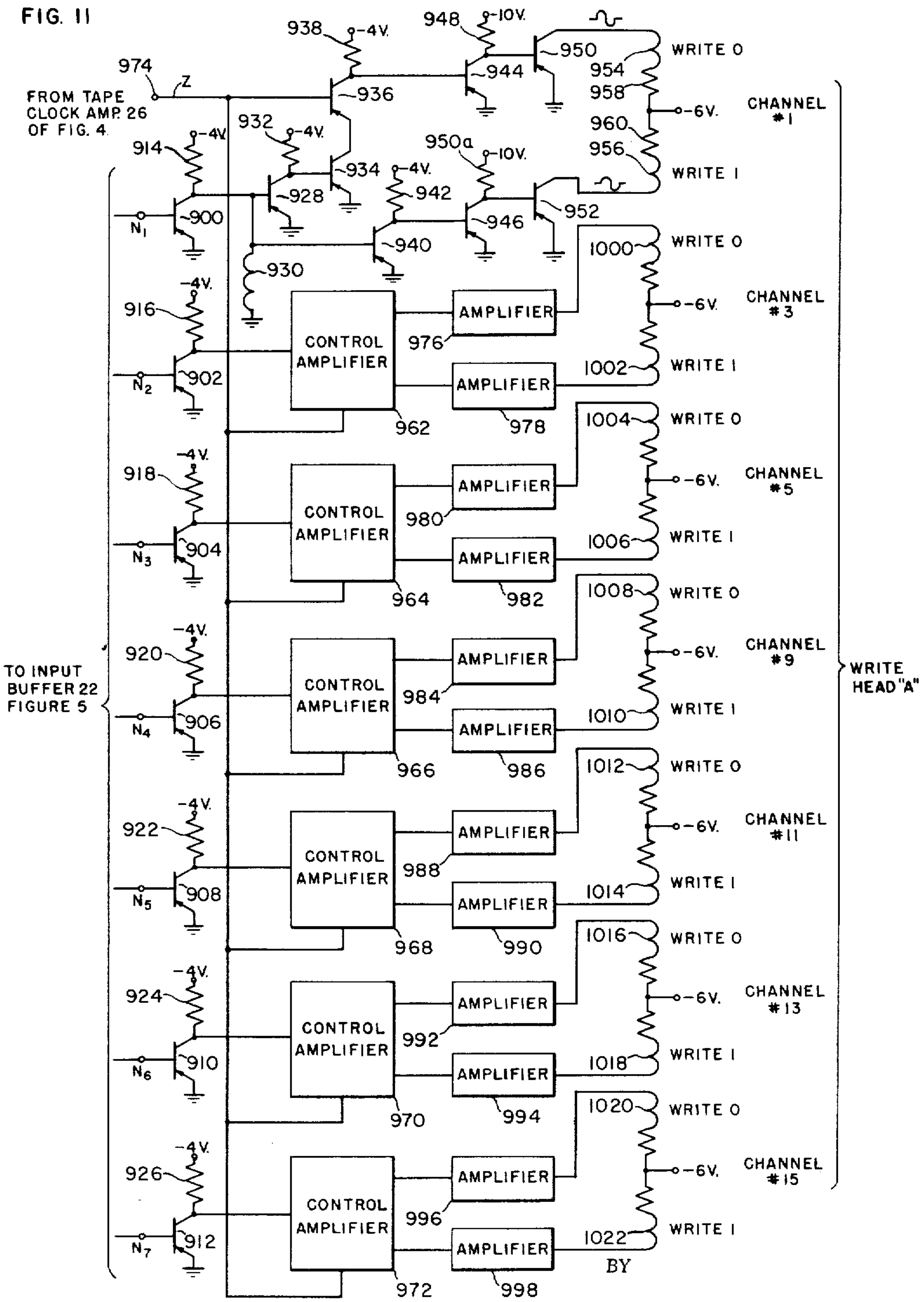
FIGURE 11 is a schematic representation, partly in block and partly in circuitry, of a series of amplifiers for data read out of the input core buffer.

The output terminals of the input core buffer 22 of FIGURE 5 are connected to a series of write amplifiers which are shown in FIGURE 11. Seven such amplifiers are shown in FIGURE 11 and these amplifiers are shown as connected to a write head "A." This head, for example, may be associated with the channels 1, 3, 5, 9, 11, 13 and 15 on the tape 10, as described in conjunction with FIGURE 1. As mentioned previously, the input buffer 22 in a constructed embodiment was provided with fourteen output terminals, and these terminals were connected to a first group of write amplifiers such as shown in FIGURE 11, and also to a second group which were connected to the write head "B" which was described in conjunction with FIGURE 1.

The terminals N1–N7 of FIGURE 11 are connected respectively to the bases of a plurality of transistors 900, 902, 904, 906, 908, 910 and 912. A plurality of 1.5 kilo-ohm resistors 914, 916, 918, 920, 922, 924 and 926 are connected to respective ones of the collectors of the transistors. These resistors are all connected to the negative terminal of a 4 volt voltage source. The emitters of the transistors are all grounded.

The collector of the transistor 900 is connected to the base of a transistor 928. An inductance coil 930 has one terminal connected to the base of the transistor 928 and the other terminal of this coil is grounded. The coil 930 may have an inductance of the order of 10 microhenries. This coil serves to sharpen the signal translated by its associated circuit and to sharpen the cut-off of the transistors included in this circuit by supplying electors to the base.

The emitter of the transistor 928 is grounded. A resistor 932 is connected to the collector of the transistor 928 and to the negative terminal of a 4 volt voltage source. This resistor may have a resistance of 1.5 kilo-ohms. The collector of the transistor 928 is connected to the base of a transistor 934. The emitter of the transistor is grounded, and the collector of this transistor is connected to the emitter of a transistor 936. The collector of the transistor 936 is connected to a resistor 938, and that resistor is connected to the negative terminal of the 4 volt voltage source. The resistor 938 may have a resistance of 1.5 kilo-ohms.

The collector of the transistor 900 is also connected to the base of a transistor 940. The emitter of the transistor 940 is grounded, and a 1.5 kilo-ohm resistor 942 is connected between its collector and the negative terminal of the 4 volt voltage source. The collector of the transistor 936 is connected to the base of a grounded emitter transistor 944, and the collector of the transistor 940 is connected to the base of a grounded emitter transistor 946. The collectors of the transistors 944 and 946 are respectively connected to a pair of resistors 948 and 950*a*. These resistors are connected to the negative terminal of a 10 volt voltage source, and they may have a resistance of 220 ohms. The transistors 944 and 946 may be of the type presently designated CK761.

The collectors of the transistors 944 and 946 are connected respectively to the bases of grounded emitter transistors 950 and 952. These latter transistors may be of the type designated 2N316 and they function as power amplifiers.

The collector of the transistor 950 is connected to a coil 954 in the write head "A," and the collector of the transistor 952 is connected to a coil 956 in the write head "A." A resistor 958 is connected between the other terminal of the coil 954 and the negative terminal of a 6 volt voltage source and a resistor 960 is connected between the other terminal of the coil 956 and the negative terminal of the 6 volt voltage source. The resistors 958 and 960 may each have a value of 27 ohms.

Both the coils 954 and 956 are associated with channel No. 1 on the magnetic tape. When the transistor 950 is rendered conductive, a current such as shown by the wave form adjacent the coil 954 flows through the coil. This current wave causes a magnetic recording to be made on the magnetic tape corresponding, for example, to a binary 1.

In like manner, when the transistor 952 is rendered conductive, a current pulse such as indicated by the adjacent wave form flows through the coil 956. This latter coil is also associated with the channel No. 1 on the magnetic tape, and when the illustrated current pulse flows through it, it causes a binary 0 to be recorded on the tape. The coils 954 and 956 are wound in the opposite directions so that the current flow through the coil 954 produces a magnetic recording of one polarity to correspond to the binary 1, and a current flow in the same direction through the coil 956 causes a magnetic recording of an opposite polarity to be recorded on the tape to indicate the binary 0. It may be noted that this serves to reverse the polarity of a previous 1 in that position, but does not affect a previous 0.

The transistors 902, 904, 906, 908, 910 and 912 are respectively connected to a plurality of control amplifiers 962, 964, 966, 968, 970 and 972, each of which may include circuitry similar to the circuit of the transistors 928, 934 and 940, described above. For this reason, each of the control amplifiers 962, 964, 966, 968, 970 and 972 is shown merely in block form.

An input terminal 974 is connected to the base of the transistor 936 and to the bases of corresponding transistors in the control amplifiers 962, 964, 966, 970 and 972.

The control amplifier 962 is connected to a pair of amplifiers 976 and 978, whose circuitry may correspond to the circuits of the transistors 944, 950 and 946, 952, described above. Likewise, the control amplifier 964 is connected to a pair of amplifiers 980 and 982, the control amplifier 966 is connected to a pair of amplifiers 984 and 986, the control amplifier 968 is connected to a pair of amplifiers 988 and 990, the control amplifier 970 is connected to a pair of amplifiers 992 and 994, and the control amplifier 972 is connected to a pair of amplifiers 996 and 998.

The pair of amplifiers 976 and 978 are connected respectively to a pair of coils 1000 and 1002, which, like the coils 954 and 956, are included in the write head "A." The coils 1000 and 1002 are both associated with the channel No. 3 on the tape, for example.

Likewise, the amplifiers 980 and 982 are connected to a pair of coils 1004 and 1006 in the write head "A" which are associated with channel No. 5, the amplifiers 984 and 986 are connected to a pair of coils 1008 and 1010 in the write head "A" associated with channel No. 9, and the amplifiers 988 and 990 are connected to a pair of coils 1012 and 1014 in the write head "A" associated with channel No. 11. Finally, the amplifiers 992 and 994 are connected to a pair of coils 1016 and 1018 in the write head "A" associated with channel No. 13, and the amplifiers 996 and 998 are connected to a pair of coils 1020 and 1022 in the write head "A" and which are associated with channel No. 15.

As described previously, the block of data from the data processor is loaded into the input core buffer 22 in a diagonal manner and under the control of the magnetic core switches 34 and 36 described above. However, the data loaded in the buffer 22 is fed to the data amplifiers of FIGURE 11 in a column-by-column manner under the control of the magnetic core switch 34, and when the buffer 22 has been conditioned to its unload mode by the control circuit 30 of FIGURE 4. The actuation of the magnetic switch 34, by the signal M caused by compare network 52 of FIGURE 4, causes in the manner described a series of pulses to be produced across the terminals N1–N7 of FIGURE 11 as each column of data is fed into the data amplifiers.

During the unloading of the input buffer, each time a positive pulse appears at one of the terminals N1–N7 of FIGURE 11, a binary 1 is indicated, and the absence of such a positive pulse represents a binary 0. Assume now that a binary 0 has been indicated by the absence of a positive pulse, the base of the transistor 900 being held at a negative voltage. This causes a current flow to be established through the transistor 900 so that its collector, and, therefore, the base of the transistor 928 are at essentially ground potential to render the latter transistor nonconductive. Likewise, the base of the transistor 940 is essentially at ground potential because the potential of the collector of the transistor 900 is at that value, and the transistor 940 also becomes nonconductive.

The nonconductivity of the transistor 928 causes its collector to be at the negative voltage of the terminal of the 4 volt direct voltage source and the voltage of the base of the transistor 934 is also at that value. The transistor 934 is thereby rendered conductive effectively to establish a connection between the emitter of the transistor 936 and ground. This permits the transistor 936 to translate the next clock pulse "Z" introduced to the input terminal 974. This clock pulse is amplified by the transistors 944 and 950 to produce a current flow through the coil 954 and record a binary 0 in channel 1 at the proper moment.

Because the transistor 940 was nonconductive, as noted above, the base of the transistor 946 is established at a negative value, so that the transistor 946 conducts. This conductivity of the transistor 946 causes the base of the transistor 952 to be established at a value substantially approaching the ground potential so that no current flows through the transistor 952 or through the coil 956.

Alternately, for a binary 1 at the terminal $N_1$ in FIGURE 11, the base of the transistor 900 rises to a value approaching ground potential. This causes a negative going potential to be produced at the collector of this transistor and at the base of the transistor 928. The transistor 928, therefore, tends to cut off the base of the transistor 934. This renders the transistor 934 nonconductive so that the path from the emitter of the transistor 936 to ground is effectively opened. Therefore, the clock pulse Z from the terminal 974 is not passed by the transistor 936. The collector of the latter transistor is established at the negative voltage, as is the base of the transistor 944. This causes the transistor 944 to be conductive to establish the base of the transistor 950 at a ground value. The transistor 950 is, therefore, rendered nonconductive so that no current flows through the coil 954.

The transistor 900 is made nonconductive for a binary 1, so that its collector is at a negative voltage and the base of the transistor 940 is also swung negative. This causes the latter transistor to become conductive to cut off the transistor 946. The transistor 952, therefore, becomes conductive to cause the current flow through the winding 956 so that a binary 1 may be written in channel No. 1. Therefore, for a binary 0, the input terminal $N_1$ is held at a negative voltage to cause a current pulse to flow through the winding 954, and for a binary 1 from the input buffer the terminal $N_1$ is swung to essentially ground potential to cause the current pulse to flow through the winding 956.

In like manner, the pulses appearing across the terminals $N_2$–$N_7$ cause corresponding recordings to be made in the channels of the tape associated with these terminals. Therefore, to record data from the data processor on the magnetic tape 20 of FIGURE 4, and in response to the proper direction from the data processor, the data portion of a block from the data processor is introduced in serial manner to the input terminal 404 of FIGURE 5. The data is amplified by the inhibit amplifier 32 in FIGURE 5, and a current flow is produced through the input core buffer 22 (which is placed in a loading condition) for each binary 0, but no current flow is instituted for a binary 1. For this loading condition of the input core buffer 22, and in response to the proper instruction introduced to the input terminal 452, the column load circuit 28 effectively connects the terminal 450 to a return circuit for the input terminals $A_1$–$A_{13}$ and $L_1$–$L_7$ from the magnetic core switches 34 and 36. Then, and in the manner described, the magnetic core switches successively cause current to flow through the various cores in the input core buffer 22.

In known manner, the control described in the preceding paragraph is such that each magnetic switch passes a current corresponding to $AT/2$ through any core in the input core buffer 22 at any particular time. This is insufficient to turn over the core, as shown by the hysteresis loop of FIGURE 7. However, for each instant a particular core has both the current from the row magnetic switch and the current from the column magnetic switch flowing through it. At this instant, the current flow through the particular core corresponds to AT in FIGURE 7, and, without further control, this is sufficient to turn over that core. However, the output from the inhibit amplifier 32 flows in a direction to oppose the current flow from the row magnetic switch whenever a binary "0" appears at the output terminal 300. This means, that whenever a binary "0" is fed to the buffer from the inhibit amplifier 32 the corresponding core is not turned over. However, the selected core is turned over in the presence of a binary "1" since no inhibiting current flows from the inhibit amplifier for a binary "1."

Therefore, the input core buffer 22 of FIGURE 5 is loaded in accordance with the block of data fed through the inhibit amplifier 32. In each instance, the cores in the buffer have a particular polarity to represent a binary "0" and a turned-over opposite polarity to represent a binary "1."

Now, and in response to the proper instruction as described above, the column load circuit is de-activated and the column unload circuit 30 of FIGURE 5 is activated. This latter circuit effectively establishes a return connection from the lead 280 to the input terminals A1–A13 of the column magnetic switch. An examination of the input core buffer 22, shown in FIGURE 5, will show that for this connection the windings 174, 176, 178, 180, 182, 184, 186, 188, 190, 192, 194, 196 and 198, and 200, 202, 204, 206, 208, 210, 212, 214, 216, 218, 220, and 224 are arranged so that each core is linked twice by the unloading current from the column switch. Therefore, the column switch alone is able to turn over any core since it supplies a current corresponding to AT in FIGURE 7.

During the unloading operation the column magnetic switch returns all the cores which were previously turned over to represent a binary "1" to their previous state representing binary "0." Of course, the column magnetic switch during the unloading has no effect on the cores representing binary 0 because these cores are already saturated in the direction in which the column switch tends to saturate the cores.

As each core is turned over by the column magnetic switch 34 during the unloading operation, a voltage is introduced in the corresponding one of the windings 304, 306, 308, 310, 312, 314 and 316. Therefore, as each column is unloaded, a series of positive pulses appears at respective ones of the terminals N1–N7 of FIGURE 5 respectively representing each of the cores which was turned over during the unloading operation, which, in turn, represents a binary "1." These pulses are then amplified by the circuit described in conjunction with FIGURE 11 so that the appropriate recording may be made on the magnetic tape.

It will be appreciated that the block of data loaded into the input buffer in a diagonal manner, as described, is read out in a parallel column-to-column fashion. Therefore, the block is recorded on the magnetic tape 20 of FIGURE 4 is a coded manner, which is different from the sequence with which the various characters and words were read into the buffer. However, as will be described, the data from the tape is loaded into the output buffer 54 (FIGURE 4) in the reverse manner, so that the data reverts to its original form when it is fed to the sense amplifier 55.

Figure 12:
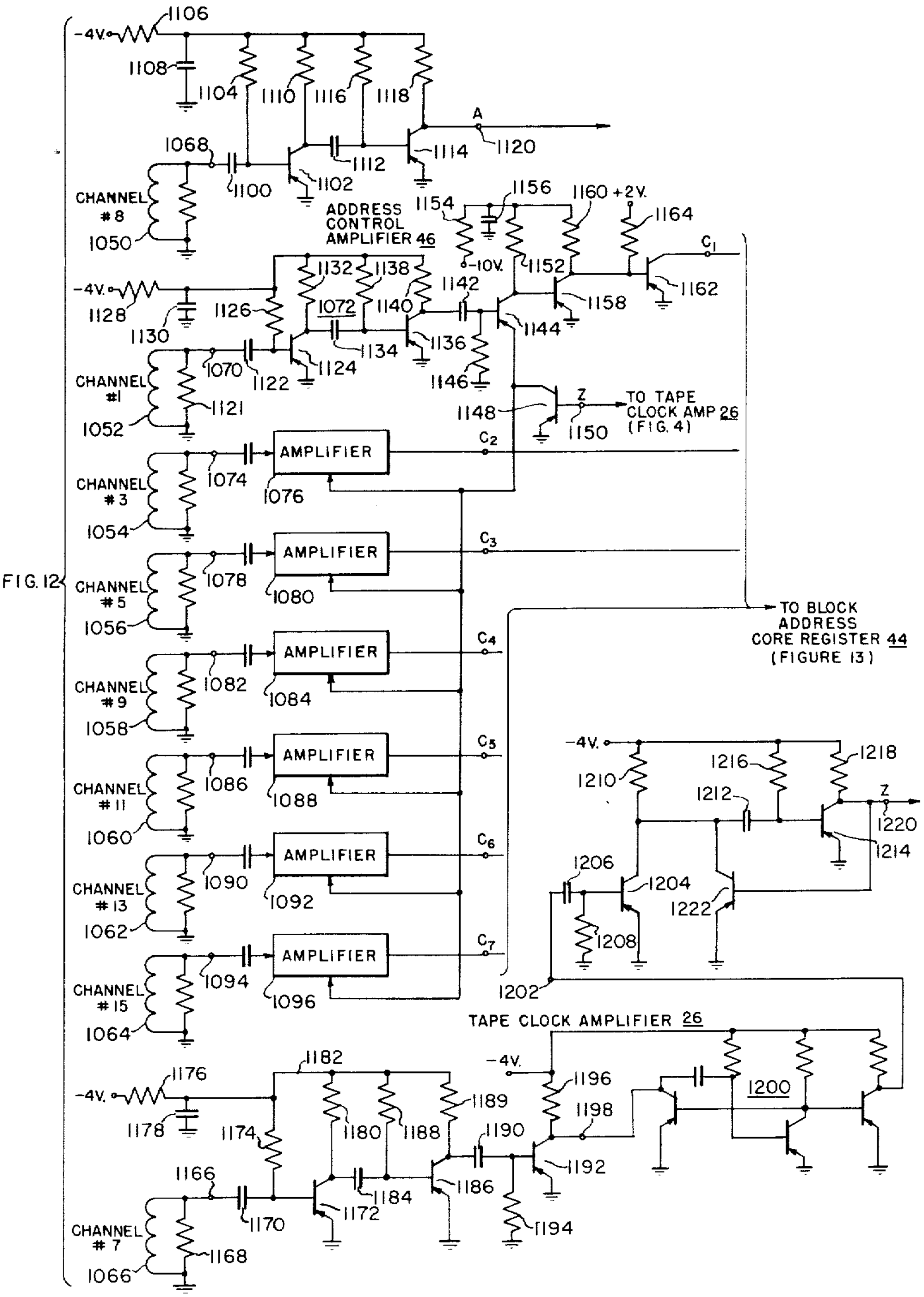
FIGURE 12 shows a plurality of coils to which the amplifiers of FIGURE 11 are connected and which are associated with transducing means for transforming the output signals from these amplifiers into magnetic impulses.

The diagram of FIGURE 12 shows a plurality of coils 1050, 1052, 1054, 1056, 1058, 1060, 1062, 1064 and 1066 which are associated with different channels on the magnetic tape 20 of FIGURE 4. The coils 1050, 1052, 1054, 1056, 1058, 1060, 1062, 1064 and 1066 may, for example, be associated with the read head "A." The 1052 coil is shunted by a 1 kilo-ohm resistor 1121, and the other coils are shunted respectively by like resistors. The coil 1050 reads the block address clock channel 8 (FIGURE 1) and it is connected to the input terminal 1068 of the address control amplifier 46 of FIGURE 4. The coil 1052 reads the channel No. 1 (FIGURE 1) on the tape, and it is connected to an input terminal 1070 of a read amplifier 1072, which is shown in circuit form and which will be described in detail. The coil 1054 reads the tape channel 3, and it is connected to the input terminal 1074 of a data amplifier 1076, which is shown in block form.

Similarly, the coil 1056 is connected to the input terminal 1078 of a data amplifier 1080, the coil 1058 is connected to the input terminal 1082 of a data amplifier 1084, and the coil 1060 is connected to the input terminal 1086 of a data amplifier 1088. The coil 1056 reads the tape channel 5, for example, the coil 1058 reads the tape channel 9, and the coil 1060 reads the channel 11 on the tape. The coil 1062 is associated, for example, with the channel 13 on the tape and reads that channel. This latter coil is connected to the input terminal 1090 of an amplifier 1092. Likewise, the coil 1064 reads the channel 15 on the tape and is connected to the input terminal 1094 of a data amplifier 1096.

A similar arrangement of coils is associated with the read head "B" described in conjunction with FIGURE 1. This arrangement includes the coil 1050. The coils associated with the read head "B," other than the coil 1050, are not shown. It will be understood that the coils which are not shown read the various data rows 2, 4, 6, 10, 12, 14 and 16 on the magnetic tape 20, and that the connections of these coils are the same as those which will be described in conjunction with the coils 1052, 1054, 1056, 1058, 1060, 1062 and 1064. The amplifiers 1072, 1076, 1080, 1084, 1088, 1092 and 1096, together with other amplifiers associated with the other read head coils which are not shown, make up the read amplifiers represented by the block 42 in FIGURE 4.

The input terminal 1068 of the address control amplifier 46 is connected to a capacitor 1100, of, for example, .022 microfarad, and this capacitor is connected to the base of a grounded emitter transistor 1102. A resistor 1104 is connected to the base of the transistor 1102. The resistor 1104 may have a resistance of 570 kilo-ohms. This resistor is connected to a second resistor 1106, of, for example, 22 ohms, and this second resistor is connected to the negative terminal of a 4 volt direct voltage source. A capacitor 1108 of, for example, 20 microfarads, is connected to the junction of the resistors 1104 and 1106, and this capacitor is further connected to ground.

The transistor 1102 may be of the type designated GT763. A resistor 1110 is connected to the collector of this transistor and to the junction of the resistors 1104 and 1106. The resistor 1110 may have a resistance of 56 kilo-ohms.

A capacitor 1112 is connected between the collector of the transistor 1102 and the base of a grounded-emitter transistor 1114. This capacitor may have a capacity of .022 microfarad, and the transistor 1114 may be of the type designated GT763. A resistor 1116 is conected to the base of the transistor 1114 and a resistor 1118 is connected to the collector of that transistor. The resistor 1116 may have a resistance of 240 kilo-ohms, and the resistor 1118 may have a resistance of 5.6 kilo-ohms. Both of these resistors are connected to the junction of the resistors 1104 and 1106.

The transistors 1102 and 1114 are connected as known grounded-emitter amplifiers. The block control pulses recorded in the channel No. 8 on the tape are transduced to electrical pulses by the coil 1050, and the electrical pulses are amplified and appear at the output terminal 1120 of the address control amplifier. As described in conjunction with FIGURE 2, a pair of pulses appears at the output terminal 1120 at the beginning of each block of data, and these pulses identify the characters representing the address portion of that block. These pulses make up the signal designated A.

The input terminal 1070 of the data amplifier 1072 is connected to a capacitor 1122. This capacitor may have a value of .022 microfarad. The capacitor 1122 is connected to the base of a grounded emitter transistor 1124. This transistor may be of the type designated GT763.

The base of the transistor 1124 is connected to a resistor 1126, and this resistor may have a value of 510 kilo-ohms. The resistor 1126 is connected to a 22 ohm resistor 1128, and the latter resistor is connected to the negative terminal of a 4 volt voltage source. A grounded capacitor 1130 is connected to the junction of the resistors 1126 and 1128.

The collector of the transistor 1124 is connected to a resistor 1132. This resistor may have a resistance of 5.6 kilo-ohms. The collector of the transistor 1124 is also connected to a capacitor 1134, and the capacitor is connected to the base of a grounded emitter transistor 1136. The base of the transistor 1136 is connected to a resistor 1138, of, for example, 240 kilo-ohms, and the collector of the transistor 1136 is connected to a resistor 1140 of, for example, 5.6 kilo-ohms. Resistors 1132, 1138 and 1140 are all connected to the common junction of the resistors 1126 and 1128. The transistor 1136 is of the type designated GT763.

The collector of the transistor 1136 is also connected to a capacitor 1142 of, for example, 500 micro-micro-farads. The capacitor 1142 is connected to the base of a transistor 1144, and this base is connected to a grounded resistor 1146. The resistor 1146 may have a resistance of 100 kilo-ohms, and the transistor 1144 may be of the type designated 2N114.

The emitter of the transistor 1144 is connected to the collector of a grounded emitter transistor 1148. The base of the transistor 1148 is connected to an input terminal 1150. The terminal 1150 is connected to the tape clock amplifier 26 of FIGURE 4, and the tape clock pulses are introduced to that input terminal. The collector of the transistor 1148 is also connected to a similar circuit in each of the amplifiers 1076, 1080, 1084, 1088, 1092 and 1096.

The collector of the transistor 1144 is connected to a 5.6 kilo-ohm resistor 1152. This resistor is connected to a second resistor 1154, which, in turn, is connected to the negative terminal of a 10-volt direct voltage source. A grounded capacitor 1156 is connected to the junction of the resistors 1152 and 1154. The resistor 1154 may have a resistance of 20 ohms, and the capacitor 1156 may have a capacity of 20 microfarads.

The collector of the transistor 1144 is also connected to the base of a grounded-emitter transistor 1158. The collector of the transistor 1158 is connected to a resistor 1160, which, in turn, is connected to the common junction of the resistors 1152 and 1154. The resistor 1160 may have a resistance of 200 ohms, and the transistor 1158 may be of the type designated GT763. The collector of the transistor 1158 is connected to the base of a power transistor 1162. A resistor 1164 is connected between the base and the positive terminal of a 2-volt direct voltage source. The emitter of the transistor 1162 is grounded, and the collector is connected to an output terminal $C_1$.

In like manner, the amplifiers 1076, 1080, 1084, 1088, 1092 and 1096 include similar circuitry and are connected respectively to similar output terminals $C_2$–$C_7$. In the constructed embodiment of the invention, of course, fourteen output terminals would be used.

The coil 1066 of the read head "A," which, as mentioned above, reads the tape clock channel 7, is connected to the input terminal 1166 of the tape clock amplifier 26.

The recorded magnetic pulses in channel 1 of the magnetic tape 20 are transformed into electrical pulses by the read head coil 1052. These electrical pulses are amplified in the transistor amplifier circuit which includes the transistors 1124, 1136, 1158 and 1162. The transistor 1148 is rendered conductive at particular times, only as determined by the tape clock pulses introduced to the input terminal 1150. Only when the transistor 1148 is conductive is a path established between the emitter of the transistor 1144 and ground. Therefore, the recorded magnetic data pulses of channel 1 on that tape are read by the read head coil 1052, and these pulses are transformed into electric pulses and are translated by the circuit of the transistor 1144 at times determined by the tape clock pulses Z. This assures that properly timed data pulses will appear at the output terminal $C_1$ for subsequent use in the system. In like manner, properly timed data pulses appear at the output terminals $C_2$–$C_7$.

The read head coil 1066 which reads the tape clock channel 7 is shunted by a usual damping resistor 1168 of, for example, 1 kilo-ohm. The input terminal 1166 of the tape clock amplifier 26 is connected to a capacitor 1170, which, in turn, is connected to the base of a grounded emitter transistor 1172. The capacitor 1170 may have a value of .022 microfarad, and the transistor 1172 may be of the type designated CT763. A resistor 1174 is connected to the base of the transistor 1172 and to the common junction of a resistor 1176 and a grounded capacitor 1178. The resistor 1176 is connected to the negative terminal of a 4-volt direct voltage source. The resistor 1174 may have a value of 510 kilo-ohms, the resistor 1176 may have a resistance of 22 ohms and the capacitor 1178 may have a capacity of 20 microfarads.

The collector of the transistor 1172 is connected to a resistor 1180, which, in turn, is connected to a lead 1182. The lead 1182 is connected to the junction of the resistor 1176 and the capacitor 1178. A capacitor 1184 is connected between the collector of the transistor 1172 and the base of a transistor 1186. The latter base is connected to a resistor 1188 which is connected to the lead 1182. The capacitor 1184 may have a capacity of .022 microfarad, the resistor 1180 may have a resistance of 5.6 kilo-ohms, and the resistor 1188 may have a resistance of 240 kilo-ohms.

The transistor 1186 may be of the type designated GT763, and the emitter of this transistor is grounded. The collector of the transistor 1186 is connected to a resistor 1189, the resistor having a resistance of 5.4 kilo-ohms and being connected to the lead 1182. A capacitor 1190 is connected to the collector of the transistor 1186 and to the base of a transistor 1192. A resistor 1194 is connected to the base of the transistor 1192 and to ground. The capacitor 1190 may have a capacitance of 500 micro-microfarads, and the resistor 1194 may have a resistance of 100 kilo-ohms.

The transistor 1192 has a grounded emitter, and the collector of this transistor is connected to a 1 kilo-ohm resistor 1196. The resistor 1196 is connected to the negative terminal of the 4-volt direct voltage source. The collector of the transistor 1192 is connected to the input terminal 1198 of a usual multivibrator circuit. The multivibrator circuit is designated as 1200, and it may be constructed in known manner and to incorporate transistors. The multivibrator may be of the type having a stable operating condition and an unstable operating condition.

Each time a clock pulse is read by the coil 1066, the pulse is amplified by the circuit of the transistors 1172, 1186 and 1192. The amplified pulse is introduced to the input terminal 1198 of the multivibrator 1200. This amplified pulse triggers the multivibrator from its stable condition to its unstable condition. The parameters of the multivibrator are chosen so that the multivibrator will return to its stable condition before the currents of the next clock pulse are read by the coil 1066. Therefore, the multivibrator 1200 develops a series of pulses at its output terminal 1202.

The pulses appearing at the output terminal 1202 of the multivibrator 1200 coincide with the clock pulse recordings in channel 7 on the tape. However, the output pulses are delayed by a selected time delay by a second multivibrator with respect to corresponding ones of the recording clock pulses.

The pulses appearing at the output terminal 1202 are introduced to the base of a grounded-emitter transistor 1204 through a capacitor 1206, the capacitor having a capacity on the order of 330 micro-microfarads, and the base of the transistor being connected to a grounded 10 kilo-ohm resistor 1208.

The collector of the transistor 1204 is connected to a resistor 1210, this resistor being in turn connected to the negative terminal of a 4-volt direct voltage source. The collector of the transistor 1204 is also connected to a capacitor 1212, of, for example, 1000 micro-microfarads. The capacitor 1212 is connected to the base of a transistor 1214 and to one side of a resistor 1216. The resistor 1216 has a value of 10 kilo-ohms and is connected to the negative terminal of the 4-volt voltage source.

The emitter of the transistor 1214 is grounded, and the collector is connected to a resistor 1218. This latter resistor is also connected to the negative terminal of the 4-volt voltage source. The resistor 1216 may have a value of 10 kilo-ohms, and the resistor 1218 may have a value of 1 kilo-ohm. The collector of the transistor 1214 is connected to the output terminal 1220 of the tape clock amplifier, and the collector is also connected to the base of a transistor 1222. The emitter of the transistor 1222 is grounded and its collector is connected to the collector of the transistor 1204.

The transistors 1214 and 1222 are connected as a monostable multivibrator. This latter multivibrator is triggered successively to its unstable state by the output pulses from the multivibrator 1200. This causes the output pulses from the multivibrator 1200 to be strengthened and delayed. Therefore, amplifier pulses "Z" appear at the output terminal 1220, these pulses corresponding to the tape clock pulses recorded in channel 7 but delayed with respect to such pulses. This delay is made to be approximately equal to one-half the interval of each data pulse. Therefore, the output pulses "Z" occur essentially at the middle of the data pulse interval. This permits a shift in the timing of the clock pulses due to the effects of tape skewing, and the like, to occur without disturbing the timing of the system, and as would follow from a shift of a clock pulse from a correct data pulse to an adjacent data pulse.

It will be appreciated, therefore, that the data recorded on the magnetic tape 20 is read by the read heads "A" and "B," and data pulses corresponding to that data appear at the output terminals C1–C7 in FIGURE 12 and across an additional seven output terminals in the constructed embodiment to constitute fourteen channels of recorded data. The output terminals are connected to the block address core register 44, and this register is activated at the proper times so that the address of each subsequent block on the magnetic tape may be fed to current address register 48 in FIGURE 4, as the blocks are subsequently read by the read heads. The circuit of the block address core register 44 and its associated control circuitry are shown in FIGURE 13.

Figure 13:
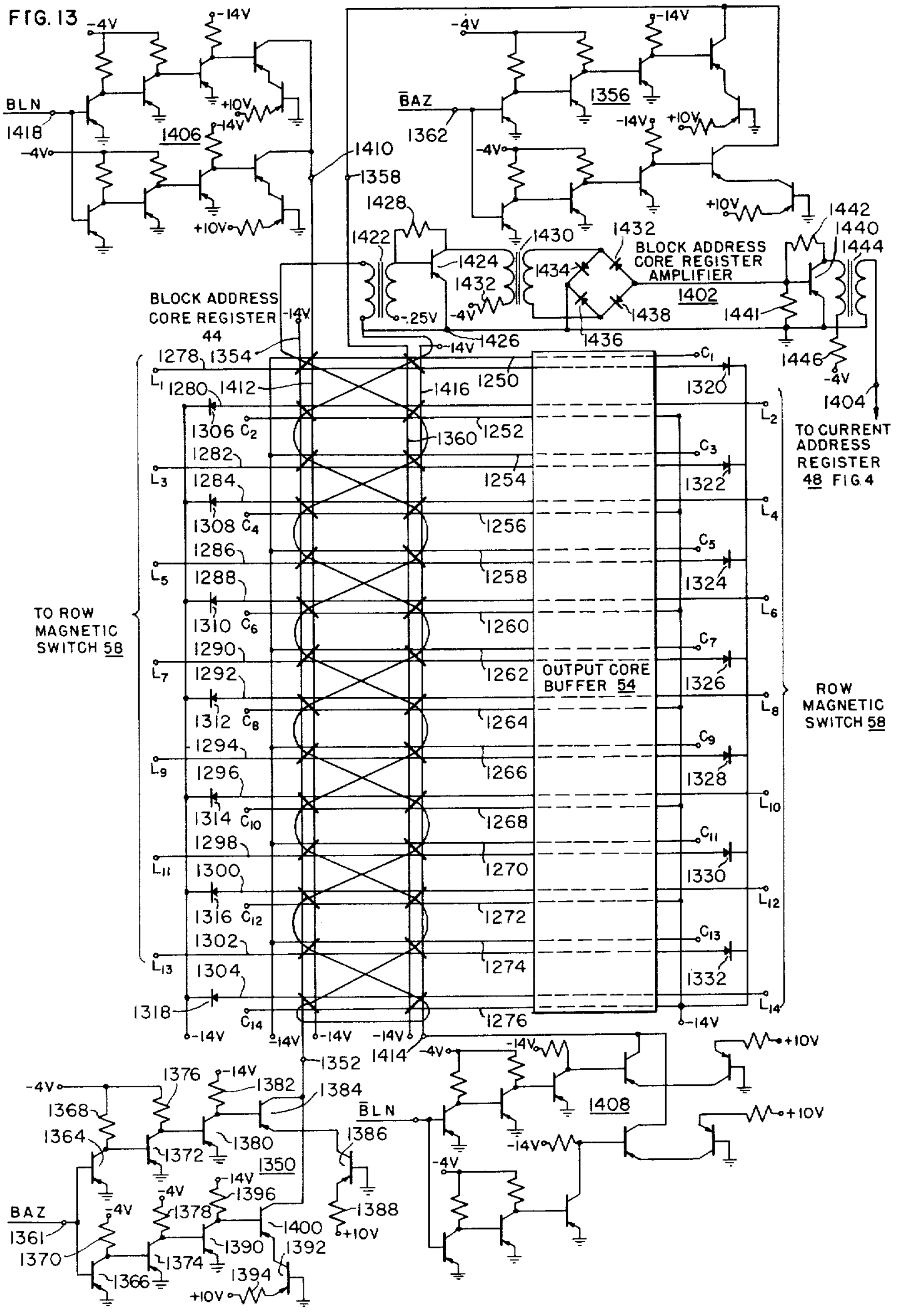
FIGURE 13 is a circuit diagram of a typical block address core register component of the system of the invention, and this circuit diagram also includes control networks for loading and unloading the address register and further showing the circuit diagram of a block address core register amplifier coupled to that register.

The output terminals from the data amplifier 24 in FIGURES 4 and 12 are represented as C1–C14 in FIGURE 13 to correspond to the fourteen amplifiers in the constructed embodiment. As shown in FIGURE 13, the block address core register 44 includes a plurality of magnetic cores which are arranged in fourteen rows and in typical two columns in this particular embodiment. A first plurality of windings 1250, 1252, 1254, 1256, 1258, 1260, 1262, 1264, 1266, 1268, 1270, 1272, 1274 and 1276 link the cores in the respective rows, and those windings are respectively connected to the terminals C1–C14, on one hand, and to the negative terminal of a 14-volt direct voltage source on the other hand. A second plurality of windings 1278, 1280, 1282, 1284, 1286, 1288, 1290, 1292, 1294, 1296, 1298, 1300, 1302 and 1304 respectively link the cores of the respective rows in the block address register. These latter windings are connected to the terminals L1–L14 of the row magnetic switch 58 of FIGURE 4 on one hand, and to the anodes of respective ones of a plurality of diodes 1306, 1308, 1310, 1312, 1314, 1316, 1320, 1322, 1324, 1326, 1328, 1330, 1332 on the other hand. The cathodes of these diodes are all connected to the negative terminal of the 14-volt direct voltage source. As shown in FIGURE 13, the connections described above are made through windings of the output core buffer 54, which windings will be described in more detail subsequently. It might also be pointed out that the block address core register 44 is activated for the first four characters of each block read from the magnetic tape. During the intervals of these characters, the output core buffer 54 is not activated so that even though there is a current flow through windings in that buffer, such current flow has no effect on the cores in the buffer. Only when the current address fed from the block address register to the current address register agrees with the address set up in the desired address register is the output core buffer 54 activated so that the selected block may be fed into the output core buffer. This action will be described subsequently.

Reverting to the diagram of FIGURE 2, it will be remembered that the block address clock channel 8 contains a first recorded pulse "A" for the position of the first two characters of each block, and a second recorded pulse for the second two characters as noted above. These two pulses correspond to the four characters constituting the address portion of each block. An additional signal "B" is derived in a manner to be explained, and this signal is present for an interval corresponding to the first two characters of each block and occurs again during a subsequent interval as each block is read. In like manner, a signal "$\overline{B}$" is derived, and this latter signal is on for an interval corresponding to the second two characters of each block, and this latter signal also occurs again during the interval each block is being read. This relationship for the signals "A" and "B" may be seen from FIGURES 22 and 23.

The read head "A" reads the first character of each block and the read head "B" reads the second character, and the binary impulses corresponding to these first two characters appear simultaneously across the terminals C1–C14. In a manner to be described, the signals "A" and "B" are used to control the introduction of these pulses into the first column of cores in the block address core register 44. Immediately following the reading of the first and second characters by the read heads "A" and "B," these heads simultaneously read the second and third characters of the address portion. The signal "A" is used in conjunction with the signal "$\overline{B}$" to store the latter two characters in the second column of the block address core register 44, as also will be described in detail.

The storing of the first two address characters of each block into the register 44 is accomplished by means of a control circuit 1350. This circuit has an output terminal 1352 which is connected to a winding 1354. The winding 1354 links all the cores of the first column of the register 44, and the remote end of this winding is connected to the negative terminal of a 14-volt direct voltage source. The loading of the second column of the register 44, on the other hand, is controlled by a circuit 1356. This latter circuit has an output terminal 1358 which is connected to a winding 1360 which links all the cores of the second column of the register 44, the remote end of the winding 1360 being connected to the negative terminal of the 14-volt direct voltage source.

To load the first column of the block address core register 44, the circuit 1350 passes a current through the winding 1354. Then, for every positive pulse appearing at the terminals C1–C14 in response to the reading of a binary 1 on the magnetic tape, the corresponding core in the first column is turned over. However, for a binary 0 the corresponding terminal exhibits a negative voltage and no current flow is produced. The current flow due to the circuit 1350 through the cores of the first column of the block address core register 44 is insufficient in itself to turn over a core in the first column. However, that current in conjunction with the current flow due to the reading of a binary 1 is sufficient to turn over the corresponding core. Therefore, the first column of cores in the block address core register is controlled so that each core may be turned over by a binary 1 for any bit in the first two characters.

Likewise, the second column in the register 44 is controlled by the circuit 1356 to cause each core in that column to be turned over in response to a corresponding binary 1 at the various significant levels of the second two characters of the address portion of each block. Therefore, the address portion of each block has half of its characters stored in the first column of the block address core register 44, and it has the other half of its characters stored in the second column of the register.

The circuit 1356 may be considered similar to the circuit 1350, and for that reason the circuit 1350 only will be described in detail. It should be pointed out that the circuit 1350 has an input terminal 1361 to which the signal "BAZ" is introduced, and the circuit 1356 has an input terminal 1362 to which the signal "$\overline{B}$AZ" is introduced. The composition of these signals will be described subsequently. The signals are timed so that the circuit 1350 may be activated at the proper time to store the first two characters of each address in the first column of the block core register 44 so that the circuit 1356 may be activated to store the second two characters of each address in the second column.

The input terminal 1361 of the circuit 1350 is connected to the base of a grounded-emitter transistor 1364 and to the base of a grounded emitter transistor 1366. Both these transistors may be of the type designated as SB100. A pair of resistors 1368 and 1370 are connected respectively to the collectors of the transistors 1364 and 1366. Each of these resistors may have a resistance of 1 kilohm, and they are connected to the negative terminal of a 4-volt direct voltage source.

The collectors of the transistors 1364 and 1366 are connected to the bases of respective ones of a pair of transistors 1372 and 1374. The emitters of these latter transistors are grounded and their collectors are connected respectively to a pair of resistors 1376 and 1378. These latter resistors may have a resistance of 300 ohms and they are connected to the negative terminal of the 4-volt direct voltage source. The transistors 1372 and 1374 may also be of the type designated SB100.

The collector of the transistor 1372 is connected to the base of a grounded emitter transistor 1380. The collector of the transistor 1380 is connected to the negative terminal of a 14-volt direct voltage source through a 200 ohm resistor 1382, and this collector is also connected to the base of a transistor 1384. The transistor 1380 may be of the type designated CK761, and the transistor 1384 may be of the type designated 2N316.

The emitter of the transistor 1384 is connected to the collector of a transistor 1386. The latter transistor is connected as a current regulator, and it may be of the type designated 2N316. The base of the transistor 1386 is grounded, and its emitter is connected to a resistor 1388. The latter resistor may have a resistance of 50 ohms, and it is connected to the positive terminal of a 10 voltage source of direct voltage.

The collector of the transistor 1374 is also connected to the base of a transistor 1390. The transistor 1390 may be of the type designated CK761. The emitter of this transistor is connected to ground. A transistor 1392 is connected as a current regulator, and it has its base connected to ground. The emitter of the transistor 1392 is connected to a resistor 1394. The resistor 1394 may have a resistance of 150 ohms, and it is connected to the positive terminal of a 10-volt source of direct voltage. The collector of the transistor 1390 is connected to a resistor 1396. The resistor 1396 may have a resistance of 200 ohms and it is connected to the negative terminal of the 14-volt direct voltage source. The collector of the transistor 1390 is connected to the base of a transistor 1400. A resistor 1396 is connected to the collector of the transistor 1390 and to the negative terminal of a 14-volt direct voltage source. The collector of the transistor 1400 is connected to the collector of the transistor 1384, and both of these collectors are connected to the output terminal 1352. The emitter of the transmitter 1400 is connected to the collector of the transistor 1392.

As noted above, a signal "BAZ" is introduced to the input terminal 1361. This signal may be amplified by the double parallel chain of amplifiers and fed to the power transistors 1384 and 1400 to provide sufficient current through the first column cores of the block address core register 44, so that these cores may be conditioned to be turned over by pulses corresponding to binary 1's in the first two characters of each block address. In like manner, the signal "$\overline{B}$AZ" introduced to the input terminal 1362 is amplified by the amplifier circuit 1356 to provide sufficient current to condition the cores of the second column of the block address core register at the proper interval as described above. This is to enable the cores of the second column to be turned over by the binary 1's in the second two characters of each block address.

In the manner described, as each data block recorded on the magnetic tape is scanned or read by the read heads "A" and "B," the address portion is stored in the block address core register 44. Then, during the reading of the succeeding data portion of each block, the stored address portion is fed from the block address core register 44 to an amplifier 1402 whose output terminal 1404 is connected to the current address register 48 of FIGURE 4, and which will be described in more detail subsequently.

The control of the block address core register 44 so that it will feed its stored addresses into the amplifier 1402 is by a pair of circuits 1406 and 1408. These two circuits are similar in their circuitry to the circuit 1350 and need not be described in detail. The circuit 1406 has an output terminal 1410 which is connected to a winding 1412 in the block address core register. The winding 1412 links all the cores of the first column of the register, and its remote end is connected to the negative terminal of the 14-volt source of direct voltage. Likewise, the circuit 1408 has an output terminal 1414 which is connected to a winding 1416 in the block address core register. The latter windings link all the cores of the second column and is connected to the negative terminal of a 14-volt direct voltage source.

A signal "L" is developed in a manner to be described which constitutes the instruction to transfer data from the block address core register 44 to the current address register 48 (FIGURE 4). This signal, together with the signal "B," is introduced to the input terminal 1418 of the circuit 1406. The clock pulse signal "Z" from the tape clock channel is also introduced to the circuit to cut down power dissipation. The circuit 1406 during the intervals established by the signal "BLN" passes a current through the winding 1412 of the first column of cores in the block address core register 44. At the same time, and as was described in conjunction with FIGURE 4, the signal "NL" is introduced to the driver circuit 62 of the row magnetic switch 58. The clock pulse portion "N" of this signal pulses the row magnetic switch to cause it successively to produce a current flow through the windings 1278, 1280, 1282, 1284, 1286, 1288, 1290, 1292, 1294, 1296, 1298, 1300, 1302, and 1304, which are connected to the switch terminals L1–L14. This current flow, in conjunction with the current flow from the control circuit 1406, causes each of the cores of the first column of the core register 44, which were previously turned over by the storing of a binary "1" in that column, to be turned over to "0."

Likewise, the pulsed circuit 1408 passes a current through the winding 1416 of the second column of cores in the block address core register under the control of the signal "$\overline{B}$LN." This latter current occurs at an interval following the interval at which the circuit 1406 passed a current through the first column of cores.

Therefore, as a block address is read by the read heads "A" and "B," it is stored in the block address core register 44. The first two characters of the address are stored in the first column of cores in the register, and the second two characters are stored in the second column of cores.

Then, during the scanning of the subsequent portion of the block by the read heads, the address in the block address core register is read out and into the current address register 48, this being under the control of the row magnetic switch 58. It should be pointed out that during this read out, and even though current is being passed through the output core buffer 54 (FIGURE 4) no switching effect is produced on that buffer's cores because neither the load circuit 64 nor the unload circuit 66 is activated.

It will be appreciated that each block address does not reach the current address register 48 until the data portion of the same block is being read. However, as mentioned previously, each address pertains to data not in its own block but in the next succeeding block. Therefore, when the desired address reaches the current address register there is adequate time to load the output core buffer 54 with the entire data portion of the block to which it refers and identifies.

An output winding 1420 links all the cores of the register 44. This winding has its two ends connected to the primary of a transformer 1422 in the input circuit of the amplifier 1402. It will be appreciated that each address, as the tape 20 of FIGURE 4 is scanned by the read heads "A" and "B" is fed to the block address core register 44, and is then introduced with a certain timing in serial form to the primary winding of the transformer 1422. That is, each time a "1" is stored in the block address core register 44, the row magnetic switch 58 in reading out the register causes the corresponding core to turn over to produce an output voltage in the winding 1420, this output voltage being applied across the primary winding of the transformer 1422. However, no such output voltage appears for the "0's" stored in the block address core registered. Also, it is convenient for practical reasons, to prevent interference between adjacent cores, and that the cores be linked by the output winding in such a manner that certain cores in turning over produce positive pulses and certain cores produce negative pulses.

The transformer 1422 may have, for example, a turns ratio of 10:20. The secondary winding of the transformer has one terminal connected to the negative terminal of a .25 voltage source of direct voltage. The other terminal of the secondary winding is connected to the base of a transistor 1424. The emitter of the transistor 1424 is connected to a lead 1426, which, in turn, is connected to the lower terminal of the primary of the transformer 1422. The collector of the transistor 1424 is connected to a resistor 1428, which, in turn, is connected to the base of the transistor 1424. This resistor 1428 may have a resistance of 10 kilo-ohms, and the transistor 1424 may be of the type designated CK761.

The collector of the transistor 1424 is connected to the primary winding of a transformer 1430. A resistor 1432 has one terminal connected to this primary winding and the other terminal of this resistor is connected to the negative terminal of a 4-volt source of direct voltage. The resistor 1432 may have a resistance of 100 ohms.

The secondary winding of the transformer 1430 is connected to opposite sides of a full-wave rectifier made up of four diodes 1432, 1434, 1436 and 1438. The other sides of this rectifier network are connected respectively to the lead 1426 and to the base of a transistor 1440. The transistor 1440 has an emitter connected to the lead 1426, and the collector of this transistor is connected to a resistor 1442. The resistor 1442 may have a resistance of 7 kilo-ohms, and it is connected to the base of the transistor 1440. A resistor 1441 of, for example, 620 ohms is connected between the base of the transistor 1440 and ground.

The collector of the transistor 1440 is connected to the primary winding of a transformer 1444. The other side of the primary winding is connected to a resistor 1446 which, in turn, is connected to the negative terminal of the 4-volt source of direct voltage. The resistor 1446 may have a resistance of 100 ohms. The secondary winding of the transformer 1444 is connected to the output terminal 1404 of the amplifier and to the lead 1426.

It will be appreciated that pulses of positive and negative polarity corresponding to binary ones appear at the input terminal 1358 of the block address core register amplifier 1402. These pulses are amplified in the amplifier 1402 and rectified in the rectifier. Negative pulses are caused to appear at the output terminal 1404 corresponding to each binary "1," and no pulse appears for each binary zero, in the address portion of each block read by the read heads "A" and "B" of the equipment. These pulses, as will be described in detail, are fed to the current address register 48 with a selected timing to be compared with the data set up in the desired address register 50 of FIGURE 4. When the address fed to the current address register coincides to the one set up in the desired address register, the compare network 52 generates the signal "M." This, in a manner to be described, activates the output core buffer 54 (FIGURE 4) so that the data from the block corresponding to that address may be fed from the tape to the output core buffer.

The current address register 48 and the desired address register 50 may, for example, each include a pair of accoustical magnetostrictive delay lines. The pair of delay lines of the current adder register is capable of storing successive ones of the four-character address signals from the block address core register, and the pair of delay lines of the desired address register is capable of storing the four-character address signal constituting the address desired, the one signal being stored in the current address register 48, and the other being stored in the block address register 50.

Figure 14:
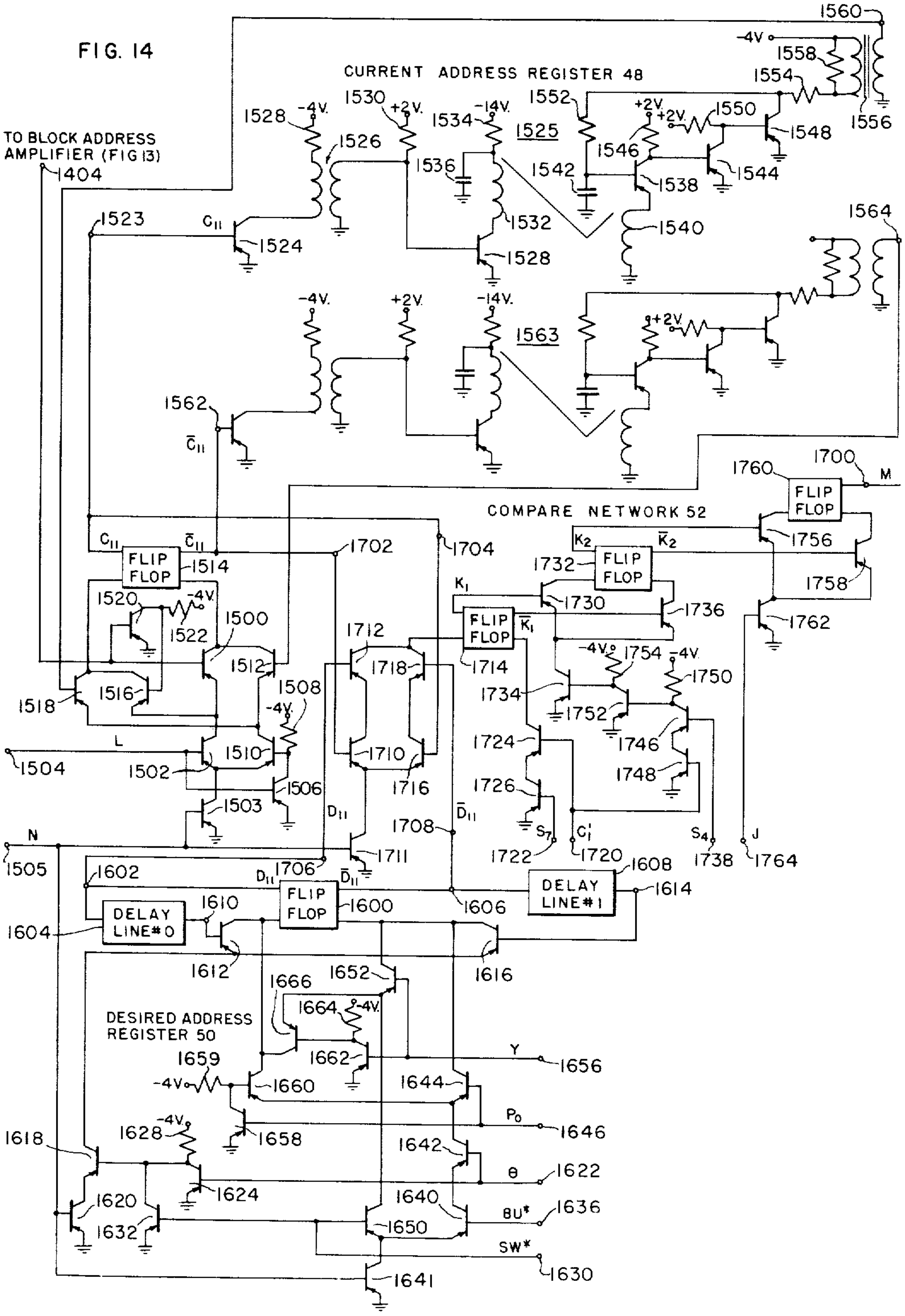
FIGURE 14 is a diagram partly in blocks and partly in detailed circuitry illustrating the components making up the desired address register and the current address register components of the system of the invention, and also illustrating those components comprising the compare network which compares the outputs from these two registers to indicate when an equality or identity is reached.

The compare network 52 (as noted above) is in the form of an exclusive "or" network, and this network is shown in the schematic diagram of FIGURE 14. FIGURE 14 also shows in more detail the system constituting the current address register 48, and the system constituting the desired address register 50. This figure also shows the connections from these registers to the compare network 52.

The output terminal 1404 of the block address core register amplifier of FIGURE 13 is connected to the base of a transistor 1500 in FIGURE 14. The emitter of the transistor 1500 is connected to the collector of a transistor 1502, and the emitter of the latter transistor is connected to the collector of a transistor 1503. An input terminal 1504 is connected to the base of the transistor 1502 and to the base of a grounded emitter transistor 1506. An input terminal 1505 is connected to the base of the transistor 1503 and the emitter of that transistor is grounded. The clock signal "N" is applied to the input terminal 1505. A timing signal "L" is introduced to the input terminal 1504, which will be discussed in detail subsequently. The collector of the transistor 1506 is connected to a resistor 1508, which, in turn, is connected to the negative terminal of a 4-volt direct voltage source.

The collector of the transistor 1506 is connected to the base of a transistor 1510, and the emitter of the latter transistor is connected to the collector of the transistor 1503. The collector of the transistor 1510 is connected to the emitter of a transistor 1512.

The collectors of the transistors 1500 and 1512 are connected to the right input terminal of a flip-flop 1514. This flip-flop, and those to be referred to subsequently, may be constructed in accordance with known practice and are bi-stable relaxation circuits. Each of these units may be triggered to what is termed a false state by the application of a negative pulse to its right input terminal. The leading edge of such a pulse causes the unit to assume its false state in which a negative voltage is exhibited at its right output terminal and a zero voltage is exhibited at its left output terminal. On the other hand, the flip-flop may be triggered to what shall be termed a true state by the introduction of a negative pulse to its left input terminal. The leading edge of such a pulse triggers the flip-flop and causes a negative voltage to be exhibited at its left output terminal and a zero voltage to be exhibited at its right output terminal. The flip-flops may be constructed in a manner similar to that described on pages 164–166, inclusive of volume 19, entitled "Wave Forms" of the Radiation Laboratory Series published in 1949 by the Massachusetts Institute of Technology.

The collector of the transistor 1502 is connected to the emitter of a transistor 1516, and the collector of the latter transistor is connected to the left input terminal of the flip-flop 1514. The collector of the transistor 1510 is connected to the emitter of a transistor 1518, and the collector of the latter transistor is connected to the left input terminal of the flip-flop 1514.

The terminal 1404 of the block address amplifier of FIGURE 14 is also connected to the base of a transistor 1520. The transistor 1520 has a grounded emitter and a 3 kilo-ohm resistor 1522 is connected from its collector to the negative terminal of a 4-volt direct voltage source. The collector of the transistor 1520 is also connected to the base of the transistor 1516.

One of the delay lines included in the current address register is designated as 1525, and this delay line is connected between the left output terminal of the flip-flop 1514 and the base of the transistor 1518. A second delay line 1563 in the current address register is connected between the right output terminal of the current address register flip-flop 1514 and the base of the transistor 1512. These two delay lines have identical characteristics and are constructed to store, for example, one word of binary data.

The left output terminal of the flip-flop 1514 is connected to the input terminal 1523 of the delay line 1525, and this input terminal is connected to the base of a transistor 1524. The emitter of the transistor 1524 is grounded, and its collector is connected to the primary winding of a transformer 1526. The primary winding is also connected to a resistor 1528 and this resistor is connected to the negative terminal of a 4-volt direct voltage source. The secondary of the transformer 1526 has one side grounded, and the other side of the secondary winding is connected to the base of a grounded emitter transistor 1528. The transistor 1524 may be of the type designated SB101, and the transistor 1528 may be of the type designated GT763. The transformer 1526 may have, for example, fifty turns in its primary winding and ten turns in its secondary winding.

A resistor 1530 is connected between the other side of the secondary winding of the transformer 1526 and the positive terminal of a 2-volt voltage source. This resistor may have a resistance, for example, of 510 ohms. The input winding 1532 of the delay line 1525 has one side connected to the collector of the transistor 1528, and a 51-ohm resistor 1534 connects the other side of this winding to the negative terminal of a 14-volt voltage source. A capacitor 1536 is connected to the junction of the resistor 1534 and the winding 1532. This latter capacitor is grounded, and it may have a capacity of .04 microfarad.

The circuitry described in the preceding paragraphs constitutes the input circuit for the delay line 1525 of the current address register. The output circuit includes a transistor 1538 whose emitter is connected to one side of the output winding 1540 of the delay line, the other side of this winding being grounded. A grounded capacitor 1542 of, for example, 4 microfarads, is connected to the base of the transistor 1538. The collector of this transistor is connected to the base of a grounded-emitter transistor 1544. A resistor 1546 is connected to the base of the transistor 1544 and to the positive terminal of a 2-volt direct voltage source. This resistor may have a resistance of 3.9 kilo-ohms.

The collector of the transistor 1544 is connected to the base of a grounded emitter transistor 1548. The base of this transistor is also connected to a resistor 1550 which, in turn, is connected to the positive terminal of a 2-volt voltage source. The resistor 1550 may, for example, have a resistance of 3.9 kilo-ohms.

The collector of the transistor 1548 is connected to a feedback resistor 1552. This latter resistor is connected to the base of the transistor 1538 and may have a value of 39 kilo-ohms. A resistor 1554 having, for example, a resistance of 1 kilo-ohm is connected to the collector of the transistor 1548. This latter resistor is connected to the primary winding of a step-down transformer 1556. This primary winding is connected to the negative terminal of a 4-volt voltage source, and it is shunted by a damping resistor 1558. The secondary winding of the transformer 1556 has one side grounded, and the other side of this winding is connected to the output terminal 1560 of the network. The turn ratio of the transformer 1556 may, for example, be 100:50. The ouput terminal 1560 is connected to the base of the transistor 1518, as mentioned above.

The delay line 1563, which is connected between the right output terminal of the flip-flop 1514 and the base of the transistor 1512, may have the same circuit configuration as the delay line 1525 described above. For this reason, the latter delay line will not be described in detail. It is believed sufficient to state that the delay line 1563 has an input terminal 1562 which is connected to the right output terminal of the flip-flop 1514 and that it has an output terminal 1564 which is connected to the base of the transistor 1512.

The delay in each of the delay lines 1525 and 1563 described above is made, for example, to correspond to one word. This means that twelve characters may be stored in each of these delay lines at any particular time.

It will be remembered that the control of the block address core register 44 is such that an address stored in that register is read out of the register at the proper moment by the introduction of a composite signal including a timing signal "L." The signal "L" is illustrated in the curves of FIGURE 22 and the manner in which it is derived will be described. As shown in FIGURE 22, the signal "L" goes negative at the beginning of the first character of the block and it remains negative for the first four characters of the block, these characters representing the address portion. This signal "L" is so timed that whenever an address is read out of the current address block register into the current address register 48, the first bit of the current address will be properly timed with respect to the first bit of the desired address which is stored in the desired address register 50. With this timing, the current address fed into the current address register 48 will be properly timed bit-by-bit with respect to the desired address stored in the desired address register 50.

The block address core amplifier of FIGURE 13 produces an output signal at the output terminal 1404 at the proper time under the timing control of the signal "L." This output signal presents a negative pulse for each binary "1" in the address read out of the block address core register 44 and into the current address register 48. This output signal, as noted above, is properly timed by the signal "L." Upon the occurrence of the negative component in the signal "L," the transistor 1502 is rendered conductive to complete the circuit from the transistors 1500 and 1516 to ground for each negative component of the clock signal "N" which renders the transistor 1503 conductive. This clock signal is also shown in FIGURE 22, and it undergoes a complete cycle for each data bit. The transistor 1506, on the other hand, reverses the polarity of the signal "L" so that the transistor 1510 is rendered nonconductive for each negative component of the signal "L." Therefore, the circuit from the emitters of the transistors 1512 and 1518 to ground is broken for each negative component of the signal "L."

Now, as the current address appears in serial form at the output terminal 1404 of the block address register, and when the signal "L" exhibits a negative component, each negative pulse (representing a binary 1) causes the transistor 1500 to become conductive, so that the corresponding clock pulse introduced to the base of the transistor 1503 triggers the flip-flop 1514 to its false state. Likewise, each zero pulse (representing a binary "0") is inverted by the circuit of the transistor 1520 to cause the transistor 1516 to become conductive and the corresponding clock pulse "N" is introduced to the left input terminal of the flip-flop 1514 to trigger that flip-flop to its true state. The flip-flop 1514, therefore, is successively triggered to its false state and to its true state in response to the signal from the block address amplifier introduced to the terminal 1404. Each time the flip-flop 1514 is triggered to a false state, a binary "1" is represented and each time it is triggered to a true state, a binary "0" is represented. The left output terminal of the flip-flop 1514 introduces a pulse to the input terminal 1523 of the first delay line 1525 each time the flip-flop is triggered to a true state. Likewise, the right output terminal of the flip-flop 1514 introduces a pulse to the input terminal 1562 of the delay line 1563 each time the flip-flop 1514 is triggered to a false state.

Therefore, as the flip-flop 1514 is triggered in response to the pulses from the block address amplifier at the terminal 1404, pulses representing the binary "0's" are fed successively to the delay line 1525 and those representing the binary "1's" are fed successively to the delay line 1563. As noted above, these delay lines may be each made to store one word or twelve characters, so that they may easily handle a typical four character address fed from the block address amplifier. However no limitation is implied either in address size and type or store of register.

At the proper time, and after an entire address has been fed to the current address register 48, the timing signal "L" causes the transistor 1502 to become nonconductive and the transistor 1510 to become conductive. Therefore, a circuit is completed to the emitters of the transistors 1512 and 1518. This latter connection enables the address sent through the delay lines 1525 and 1563 of the current address register to be recirculated. This is true because as each pulse appears at the output terminal 1560, it causes the corresponding clock pulse "N" to trigger the flip-flop 1514 to its true state because the transistor 1518 is rendered conductive. Likewise, as each pulse appears at the output terminal 1564, it causes the corresponding clock pulse to trigger the flip-flop 1514 to a false state because the transistor 1512 is rendered conductive. Therefore, the current address fed into the current address register is circulated around that register in perfect timed registry with the desired address set up in the desired address register 50.

The connections and control of the desired address register 50 are similar to those of the current address register 48, and these will now be described briefly.

The system for desired address register 50 includes a flip-flop 1600 designated the desired address register flip-flop corresponding to the flip-flop 1514 of the current address register system. The left output terminal of the flip-flop 1600 is connected to the input terminal 1602 of a delay line 1604, and the right output terminal of the flip-flop 1600 is connected to the input terminal 1606 of a delay line 1608. The delay lines 1604 and 1608 may be identical to the delay lines 1525 and 1563 of the current address register described above. For that reason, it is believed unnecessary to repeat a detailed description for the delay lines 1604 and 1608. The latter delay lines may also be constructed to have identical characteristics, and each may be designed, for example, to store one word of binary data which, as noted above, is equivalent to twelve characters, but in no way limited to that number of characters or type of storage.

The output terminal 1610 of the delay line 1604 is connected to the base of a transistor 1612, and the output terminal 1614 of the delay line 1608 is connected to the base of a transistor 1616. The collector of the transistor 1612 is connected to the left input terminal of the flip-flop 1600, and the collector of the transistor 1616 is connected to the right input terminal of the flip-flop. The emitters of the transistors 1612 and 1616 are connected together, and these common emitters are connected to the collector of a transistor 1618. The emitter of the transistor 1618 is connected to the collector of a transistor 1620, and the emitter of the transistor 1620 is grounded. The base of the transistor 1620 is connected to the clock signal input terminal 1505.

The desired address register 50 includes an input terminal 1622. It will be remembered that a desired address is introduced to the desired address register 50 under two conditions. A first condition is when it is desired to select a certain block of data from the system of the invention. When that is desired, the desired address is set up in the data processor, or other suitable device, and upon the introduction of a timing signal "5W," the address, as represented by the data signal "Y," may be set up in the desired address register. For a second condition, the block of data is in the data processor, and it is desired to insert its appropriate address into the desired address register, so that that data may be properly fed to the tape 20 of FIGURE 4. For the latter condition, a timing signal "$\theta$" representing, as mentioned previously, the address portion of the block of data in the data processor, is introduced to the input terminal 1622. This timing signal must be accompanied by the timing signal "8U" which is the proper instruction from the data processor to write into the system of the invention. When these conditions have been fulfilled, the portion of the block data signal "$P_0$" from the data processor representing the address character is introduced into the desired address register. This "$P_0$" data signal represents the entire block of data, and it is switched from the desired address register to the input core buffer 22 of FIGURE 4 when the timing signal "$\theta$" goes zero, or false.

The input terminal 1622, to which the timing signal "$\theta$" is introduced, is connected to the base of a transistor 1624. The emitter of this transistor is grounded, and its collector is connected to a 3 kilo-ohm resistor 1628, and this resistor is connected to the negative terminal of a 4-volt direct voltage source.

The system also includes an input terminal 1630 to which the timing signal "5W" is introduced. It will be noted that the asterisk (*) after the signal "5W" and after the signal "8U" represents an interlocked condition, as explained above, and which will be described in more detail subsequently. The input terminal 1630 is connected to the base of a transistor 1632. The emitter of this transistor is grounded, and its collector is connected to the 3 kilo-ohm resistor 1628. The collectors of the transistors 1632 and 1624 are also connected to the base of the transistor 1618.

The system also includes an input terminal 1636 to which the timing signal "8U*" is introduced. This input terminal is connected to the base of a transistor 1640. The emitter of the transistor 1640 is connected to the collector of a transistor 1641. The base of the transistor 1641 is connected to the clock signal input terminal 1505. The transistor 1641 has a grounded emitter, and the collector of the transistor 1640 is connected to the emitter of a transistor 1642. The base of the transistor 1642 is connected to the input terminal 1622. The collector of the transistor 1642 is connected to the emitter of a transistor 1644, the collector of the latter transistor being connected to the right input terminal of the flip-flop 1600 and its base being connected to an input terminal 1646 of the system. The signal "$P_0$" from the data processor is introduced to the input terminal 1646.

The input terminal 1630 is also connected to the base of a transistor 1650. The emitter of the transistor 1650 is connected to the collector of the transistor 1641. This transistor 1650 has its collector connected to the emitter of a transistor 1652. The base of the latter transistor is connected to an input terminal 1656 to which the desired address data signal "Y" from the data processor is introduced. The collector of the transistor 1652 is connected to the right input terminal of the flip-flop 1600.

The input terminal 1646 is also connected to the base of a transistor 1658. The emitter of the latter transistor is grounded, and its collector is connected to a resistor 1659. The latter resistor may have a resistance of, for example, 3 kilo-ohms, and it is connected to the negative terminal of a 4-volt direct voltage source. The collector of the transistor 1658 is connected to the base of a transistor 1660. The collector of the latter transistor is connected to the left input terminal of the flip-flop 1600, and its emitter is connected to the collector of the transistor 1642.

The input terminal 1656 is connected to the base of a transistor 1662. The emitter of this latter transistor is grounded, and its collector is connected to a resistor 1664. The resistor 1664 may have a resistance of 3 kilo-ohms, and it is connected to the negative terminal of a 4-volt voltage source. The collector of the transistor 1662 is connected to the base of a transistor 1666. The collector of the transistor 1666 is connected to the left input terminal of the flip-flop 1600, and its emitter is connected to the collector of the transistor 1650.

Assume first that it is desired to introduce a block of data from the data processor into the system of the invention to be recorded on the tape 20 of FIGURE 4 at the proper position on the tape. It will be remembered that to achieve this, the address portion of the block of data in the data processor is fed to the desired address register 50, and the tape 20 is scanned or read by the read heads "A" and "B" until the current address fed to the register 48 matches the desired address. Then, upon the production of the signal M by the compare network 52, the block of data is fed from the input core buffer 22 to the proper position on the magnetic storage tape 20.

The address portion of the block in the data processor under the conditions described in the preceding paragraph is fed to the desired address register 50 under the control of the signal "$8U\theta P_0$."

As noted above, the instruction signal "8U" goes negative, or true, to indicate a readiness on the part of the data processor to write the block of data into the system of the invention. When this occurs, the transistor 1640 is rendered conductive to complete the circuit from the emitter of the transistor 1642 to ground each time the clock signal "N" introduced to the base of the transistor 1641 goes negative. Then, the timing signal "$\theta$" goes true, or negative, to indicate the address portion of the block in the data processor. This causes the transistor 1642 to become conductive to complete the path from the emitter of the transistor 1644 to ground. Then, the signal "$P_0$" representing the address portion of the block is introduced to the base of the transistor 1644 to trigger the flip-flop 1600. Each negative pulse of the signal "$P_0$" representing a binary "1" causes the corresponding clock pulse "N" to trigger the flip-flop 1600 to a true state.

The signal "$P_0$" is also introduced to the base of the transistor 1658 whose circuit inverts that signal and causes the inverted signal to be introduced to the base of the transistor 1660 and from there to the left input terminal of the flip-flop 1600. The emitter of the transistor 1660 is connected to the collector of the transistor 1642 so that the condition "$8U^*\theta$" must occur before the transistor 1660 is effective. When that condition does occur, the zero pulses of the signal "$P_0$" representing the binary "0's" cause the transistor 1660 to become conductive, so that the corresponding clock pulse introduced to the base of the transistor 1641 are introduced to the left input terminal of the flip-flop 1600 to trigger the flip-flop to its true state. Therefore, the address portion of the data in the data processor, properly timed by the instruction "$\theta$," is serially introduced to the flip-flop 1600.

The timing is such that subsequent data fed to the current address register 48 may be precisely timed with the address bits in the register 50 by the timing signal "L." Therefore, the flip-flop 1600 is triggered to a true state each time a binary "1" occurs in the address portion of the block of data in the data processor, and the flip-flop is triggered to a false state each time a binary "0" occurs in the address portion. The address is introduced to the delay lines 1604 and 1608 in the manner described in conjunction with the current address register, and these addresses are circulated through the delay lines.

The circulation of the "8U*P$_0\theta$" data may be effected in the desired address register only when the signal $\theta$ is zero or false, since this causes the transistor 1624 to be nonconductive to render the transistor 1618 conductive. The conductivity of the transistor 1618 completes the circuit from the emitters of the transistors 1612 and 1616 to ground for the negative portion of each clock pulse "N" introduced to the base of the transistor 1641 to permit the circulation of the data in the delay lines 1604 and 1608.

In the manner described, therefore, the desired address "8U*P$_0\theta$" of the data in the data processor is circulated around the delay lines 1604 and 1608. As noted, this address is timed so that subsequent current addresses may be fed to the current address register 48 in precisely timed and aligned relationship with the address in the desired address register.

A second instance in which a desired address may be set up in the desired address register 50 is when it is desired to select a block of data from the magnetic tape 20 to be fed to the data processor associated with the system of the invention. To achieve this, the desired address is established in the data processor and is fed to the desired address register. This address is timed by the instruction "5W" so that it will occur at a locatable time so that subsequent addresses fed into the current address register 48 may be aligned with the desired address. Then, the data signal "Y" is introduced to the desired address register which indicates in serial form the desired address.

It will be noted that the signal "5W*" introduced to the input terminal 1630 goes negative at the proper time to render the transistor 1650 conductive so that a circuit may be completed from the emitter of the transistor 1652 to ground. Also, a circuit may be completed from the emitter of the transistor 1666 to ground. Therefore, when the data signal "Y" is introduced to the input terminal 1656, this signal is applied by the transistor 1652 to the right input terminal of the flip-flop 1600, and the inverted data signal "$\overline{Y}$" may be introduced by the transistor 1666 from the transistor 1662 to the left input terminal of the flip-flop 1600. Therefore, and in a manner similar to that described, the flip-flop 1600 is triggered to its true and false states by the clock signal "N" at the base of the transistor 1641 in accordance with the data represented by the signal "Y" and signal "5W*." Also, the desired address "5W*Y" fed into the delay lines is allowed to circulate after the signal "5W*" goes zero, or false. When the signal "5W*" goes false, the transistor 1618 becomes conductive due to the inversion by the circuit of the transistor 1632. The conductivity of the transistor 1618 completes the circuit from the emitters of the transistors 1612 and 1616 to ground each time the clock signal "N" goes negative at the base of the transistor 1620. This completion of the circuit, as noted above, enables the address "5W*Y" in the delay lines 1604 and 1608 to be recirculated.

In each instance, as the magnetic tape 20 is read by the read heads "A" and "B," the current addresses are introduced to the block address core register 44 of FIGURE 13 and then, in properly timed relation with the desired address, each is fed from the block address core register into the current address register 48 of FIGURE 14. Each current address is then recirculated in the current address register until a subsequent address is to be read into that register. Such subsequent address is timed by the signal "L," and when that signal goes negative (or true), the transistor 1506 causes the transistor 1510 to be rendered nonconductive to break the recirculation. Therefore, the previous current address is fed out of the register, and the new current address is read in. Then, the new current address circulates in the current address register in properly timed relation with the desired address. The desired address "8U$\theta$P$_0$" or "5WY" continues to be circulated in the desired address register until a new "5W" or "$\theta$" signal goes negative to break the connection to the transistors 1612 and 1616. When this occurs, the desired address in the register 50 is fed out, and a new desired address is introduced to the register.

As indicated above, the addresses circulating in the current address register 48 and in the desired address register 50 are compared by the compare network 52. This compare network causes the output signal "M" at its output terminal 1700 to go negative when the current address fed into the current address register 48 is identical to the desired address circulated in the desired address register 50.

The compare network 52 has a first pair of input terminals 1702 and 1704 and this network has a second pair of input terminals 1706 and 1708. The input terminal 1702 is connected to the right output terminal of the flip-flop 1514, and the input terminal 1704 is connected to the left output terminal of that flip-flop. In like manner, the input terminal 1706 is connected to the left output terminal of the flip-flop 1600, and the input terminal 1708 is connected to the right output terminal of that flip-flop.

The input terminal 1702 is connected to the base of a transistor 1710. The emitter of the transistor 1710 is connected to the collector of a transistor 1711, and the collector of transistor 1710 is connected to the emitter of a transistor 1712. The emitter of the transistor 1711 is grounded, and its base is connected to the clock signal input terminal 1505. The input terminal 1706 is connected to the base of the transistor 1712, and the collector of this transistor is connected to the left input terminal of a flip-flop 1714.

The input terminal 1704 is connected to the base of a transistor 1716. The emitter of this latter transistor is connected to the collector of the transistor 1711 and the collector of 1716 is connected to the emitter of a transistor 1718. The base of the transistor 1718 is connected to the input terminal 1708, and its collector is also connected to the left input terminal of the flip-flop 1714.

The compare network 52 also includes an input terminal 1720 to which a data processor timing signal "C$_1$'" is introduced. The data processor timing signal "C$_1$" goes negative for the first character in each word, as shown in the curves of FIGURE 22, and, as also shown in FIGURE 22, the negative component of the timing signal "C$_1$'" precedes each negative component of the timing signal "C$_1$" by four bits. The system also includes an input terminal 1722 in which a data processor timing signal "S$_7$" is introduced. This latter timing signal goes negative for the seventh bit of each character, as shown in FIGURE 22.

The input terminals 1720 and 1722 are connected respectively to the bases of a pair of transistors 1724 and 1726. The emitter of the transistor 1726 is grounded, and its collector is connected to the emitter of the transistor 1724. The collector of the transistor 1724 is connected to the right input terminal of the flip-flop 1714.

The left output terminal of the flip-flop 1714 is connected to the base of a transistor 1730. The collector of the transistor 1730 is connected to the left input terminal of a flip-flop 1732, and the emitter of the transistor 1730 is connected to the collector of a transistor 1734. The right output terminal of the flip-flop 1714 is connected to the base of a transistor 1736. The collector of the latter transistor is connected to the right input terminal of the flip-flop 1732, and its emitter is connected to the collector of the transistor 1734. The emitter of the transistor 1734 is grounded.

The system includes an additional input terminal 1738 to which the data processor timing signal "$S_y$" is applied. As shown in the curves of FIGURE 22, the signal "$S_y$" goes true (or negative) for the fourth bit of each character of each word in the block. The input terminal 1738 is connected to the base of the transistor 1746. The base of the transistor 1748 is connected to the input terminal 1720. The emitter of the transistor 1748 is grounded, and its collector is connected to the emitter of the transistor 1746. The collector of the transistor 1746 is connected to a resistor 1750 which, in turn, is connected to the negative terminal of a 4-voltage source. This latter resistor may have a resistance of 3 kilo-ohms.

The collector of the transistor 1746 is also connected to the base of a transistor 1752. The emitter of the transistor 1752 is grounded, and its collector is connected to a resistor 1754. The resistor 1754 may have a resistance of 3 kilo-ohms, and it is connected to the negative terminal of a 4-volt direct voltage source. The collector of the transistor 1752 is further connected to the base of the transistor 1734.

The left output terminal of the flip-flop 1732 is connected to the base of a transistor 1756. The right output terminal of the flip-flop 1732 is connected to the base of a transistor 1758. The collectors of the transistors 1756 and 1758 are connected respectively to the left and right input terminals of a flip-flop 1760. The right output terminal of the flip-flop 1760 is connected to the output terminal 1700 of the compare network 52.

The emitter of the transistor 1756 is connected to the emitter of the transistor 1758. These emitters are connected together and to the collector of a transistor 1762. The emitter of the transistor 1762 is grounded and its base is connected to an input terminal 1764 of the compare network. A timing signal "J" is introduced to the input terminal 1764, and the composition of this timing signal and the manner in which it is derived will be described subsequently.

The flip-flop 1714 is set at a true state just before the beginning of each word line in the block. This is achieved by the signals $C_1$ and $S_7$ both going negative, and this occurs only at that time.

The left output terminal of the flip-flop 1600 is connected by way of the input terminal 1706 to the base of the transistor 1712, and the right output terminal of the flip-flop 1514 is connected to the base of the transistor 1710, by way of the input terminal 1702. Also, the right output terminal of the flip-flop 1600 is connected by way of the input terminal 1708 to the base of the transistor 1718, and the left output terminal of the flip-flop 1514 is connected by way of the input terminal 1704 to the base of the transistor 1716. It is therefore apparent that when the current address in the current address register 48 is the same as the desired address in the desired address register 50, both the flip-flops 1514 and 1600 will be triggered to their true and false states at the same time. This means that whenever the flip-flop 1600 tends to render the transistor 1712 conductive, the flip-flop 1514 will render the transistor 1710 nonconductive, and vice versa. Also, whenever the flip-flop 1600 tends to render the transistor 1718 conductive, the flip-flop 1514 tends to render the transistor 1716 nonconductive. Therefore, the flip-flop 1714, which is triggered to its true state at the start of each word (as noted above), will remain in its true state when the current address in the register 48 is the same as the desired address in the register 50.

However, if the current address is not the same as the desired address, a situation will occur when the flip-flop 1514 is in one state and the flip-flop 1600 is in another. This is all that is necessary to complete the connection between the transistors 1710, 1712 or between the transistors 1716, 1718 to cause the corresponding clock pulse "N" applied to the base of the transistor 1711 to trigger the flip-flop 1714 to a false state. Therefore, whenever the current address is unlike the desired address, the flip-flop 1714 is triggered to a false state. This tends to render the transistor 1730 conductive. Then, at a time determined by the timing signals "$S_y$" and "$C'_1$," the flip-flop 1732 is triggered to a false state. On the other hand, when an equality occurs between the current address and the desired address, the flip-flop 1714 remains in a true state and the transistor 1736 tends to be not conductive. Then, the occurrence of the timing signals "$C'_1$" and "$S_4$" causes the flip-flop 1732 to be triggered to a true state. Therefore, the flip-flop 1732 is triggered to a true state if the current address equals the desired address, and this flip-flop is triggered to a false state if the current address does not equal the desired address. Also, this triggering of the flip-flop 1732 occurs at a time when both "$C'_1$" and "$S_y$" go negative, and this occurs in the twelfth or last character in the word, that is, a three-bit interval before the next word of the block.

When the flip-flop 1732 is in a true state, it tends to render the transistor 1756 conductive, and when it is in a false state it tends to render the transistor 1758 conductive. Then, at a time determined by the timing signal "J" introduced to input terminal 1764, the flip-flop 1760 is triggered to a false state when an inequality between the desired address and a current address, and it is triggered to a true state for an equality between the desired address and a current address. Therefore, at a particular time after the first current address is fed into the current address register 48, the flip-flop 1760 is triggered to a true state if that address is the same as the signal in the desired address register. The flip-flop 1760, therefore, is maintained in its true state when an equality is reached. When such equality is reached, and at a time determined by the signal "J," the flip-flop 1760 is triggered to a true state to produce a negative component in the memory transfer signal "M" at its output terminal.

Figure 23:
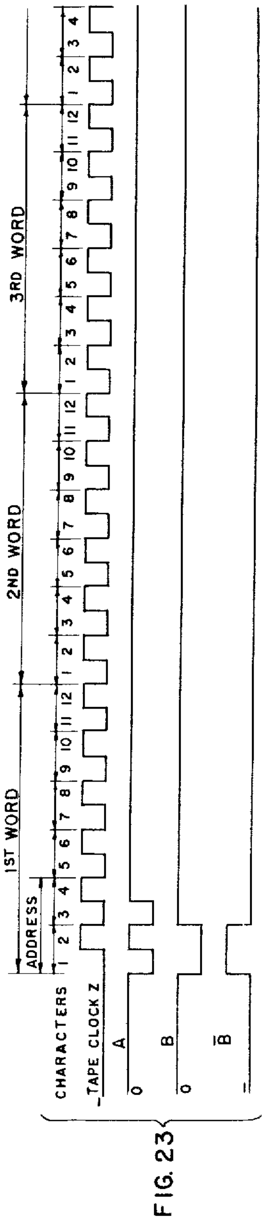
FIGURE 23 is a series of curves under the control of the tape clock signal derived from a magnetic tape used in the embodiment of the system of the invention to be described.

As described in conjunction with the system of FIGURE 4, the production of the negative component in the memory transfer signal "M" (under the condition in which a block is to be fed from the input core buffer to the magnetic tape 20) causes the unload circuit 30 to be activated. The memory transfer signal "M" in going negative also causes the driver circuit 38 of the column magnetic switch 34 to be activated, and this driver circuit is pulsed by the clock pulses "Z" for the data portion of the block, as determined by "$\bar{A}$," so that the block may be fed to the magnetic storage tape 20. The signal "A" is shown in FIGURE 23 and it goes negative for the first character and for the second character only of each block. The signal "$\bar{A}$," on the other hand, is negative for the remainder or data portion of the block.

For the condition in which a block is to be fed from the tape 20 to the output buffer, the production of the negative component of the memory transfer signal "M" activates the load circuit 64 associated with the output core buffer 54 and also the driver circuit 60 of the column magnetic switch 56, so that the block may be fed in parallel form from the tape to the output core buffer 54.

Figure 15:
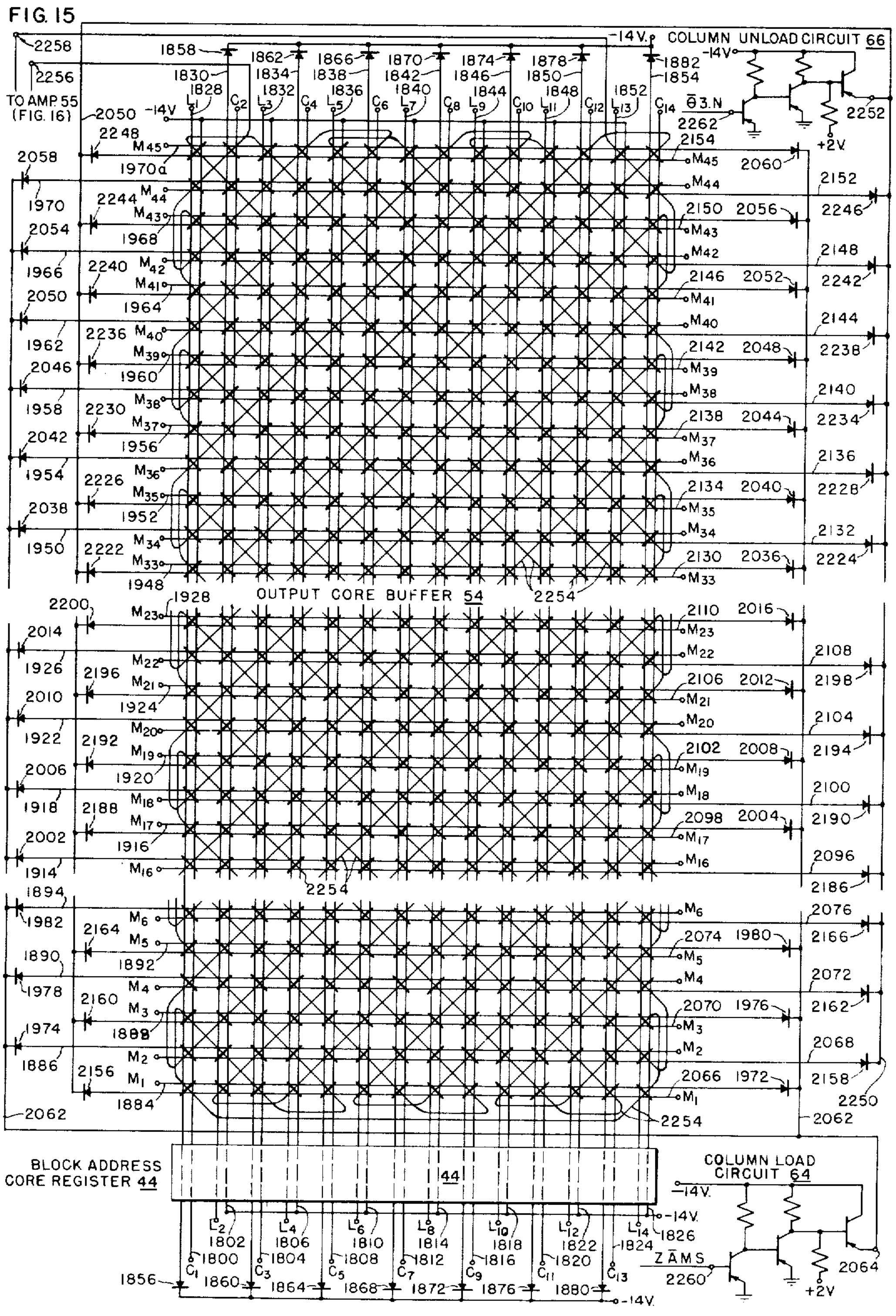
FIGURE 15 is a schematic representation of the output core buffer component of the system of the invention, and this latter representation also includes the circuitry for a pair of control networks for loading and unloading the output core buffer.

The composition of the output core buffer 54 and its associated equipment is shown in FIGURE 15. The output core buffer 54, like the input core buffer 22, has a plurality of magnetic cores arranged in a series of rows and columns. In the illustrated embodiment the output core buffer includes forty-five columns and fourteen rows. The output core buffer is shown in fragmentary form in FIGURE 15.

As described in conjunction with FIGURE 13, the windings from the various rows of the output core buffer are brought through the block address register 34 for the reasons previously described. As shown in FIGURE 15, the various terminals C1–C14, which are connected to the respective read amplifiers, are, in turn, connected to respective ones of a plurality of windings 1800, 1802, 1804, 1806, 1808, 1810, 1812, 1814, 1816, 1818, 1820, 1822, 1824 and 1826. These windings respectively link the cores of each row of the output core buffer. The ends of these windings remote from the terminals C1–C14 are connected to the negative terminal of a 14-volt direct voltage source.

Figure 16:
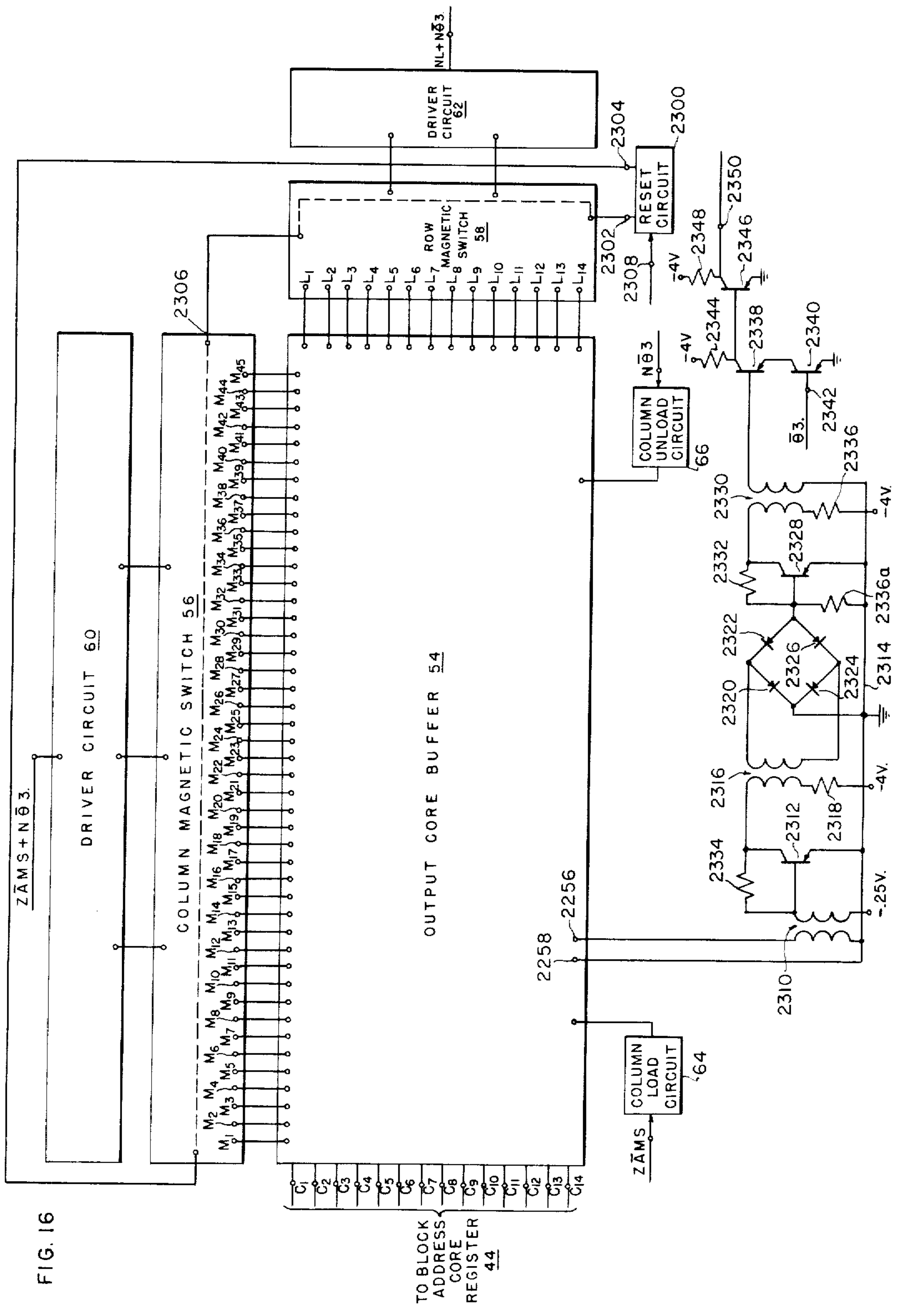
FIGURE 16 shows in block form the output core buffer component of the system and a pair of magnetic switches and their driver circuits for activating the output core buffer, this latter representation also showing in block form the control circuits associated with the output core buffer and showing in circuitry an output amplifier coupled to the output core buffer.

The row magnetic switch 58, as shown in FIGURE 16, and as noted previously, has a plurality of output terminals L1–L14. These output terminals are connected to respective ones of a plurality of windings 1828, 1830, 1832, 1834, 1836, 1838, 1840, 1842, 1844, 1846, 1848, 1850, 1852 and 1854. These latter windings also link the cores of respective ones of the rows of the output core buffer 54. The ends of these windings remote from the output terminals of the row magnetic switch 58 are respectively connected to the anodes of a plurality of diodes 1856, 1858, 1860, 1862, 1864, 1866, 1868, 1870, 1872, 1874, 1876, 1878, 1880 and 1882. The cathodes of all these diodes are indirectly connected to the negative terminal of a 14-volt direct voltage source.

The column magnetic switch 56, as shown in FIGURE 16, includes a plurality of output terminals M1–M45. These output terminals are connected respectively in FIGURE 15 to a plurality of windings 1884, 1886, 1888, 1890, 1892, 1894, . . . 1914, 1916, 1918, 1920, 1922, 1924, 1926, 1928 . . . 1948, 1950, 1952, 1954, 1956, 1958, 1960, 1962, 1964, 1966, 1968, 1970, 1970*a*. The remote ends of these windings are respectively connected to the anodes of a plurality of diodes 1972, 1974, 1976, 1978, 1980, 1982, . . . 2002, 2004, 2006, 2008, 2010, 2012, 2014, 2016 . . . 2036, 2038, 2040, 2042, 2044, 2046, 2048, 2050, 2052, 2054, 2056, 2058, 2060. These windings respectively link the coils on the cores in the different columns of the output core buffer 54. The cathodes of the diodes listed above are all connected to a lead 2062 and this lead is connected to the output terminal 2064 of the column load circuit 64.

The output terminals M1–M45 of the column magnetic switch 56 are also connected to a second series of windings which also link the cores of the various columns in the output buffer 54. These latter windings are designated 2066, 2068, 2070, 2072, 2074, 2076 . . . 2096, 2098, 2100, 2102, 2104, 2106, 2108, 2110 . . . 2130, 2132, 2134, 2136, 2138, 2140, 2142, 2144, 2146, 2148, 2150, 2152 and 2154. The ends of these windings remote from the output terminals M1–M45 of the row magnetic switch are respectively connected to the anodes of a plurality of diodes 2156, 2158, 2160, 2162, 2164, 2166 . . . 2186, 2188, 2190, 2192, 2194, 2196, 2198, 2200 . . . 2220, 2222, 2224, 2226, 2228, 2230, 2234, 2236, 2238, 2240, 2242, 2244 and 2246. The cathodes of all these diodes are connected to a lead 2250. The lead 2250 is connected to the output terminal 2252 of the column unload circuit 66.

All the cores of the output core buffer 54 are linked by a winding 2254. This winding is terminated in a pair of terminals 2256 and 2258, and these terminals are connected to the amplifier 55 which is shown in FIGURE 16.

The column load circuit 64 has an input terminal 2260, and the column unload circuit 66 has an input terminal 2262. The circuitry of the load circuit 64 and the unload circuit 66 may be similar to the circuitry of the circuits 28 and 30 discussed previously in conjunction with the input core buffer. For that reason, it is believed unnecessary to discuss the circuitry of the circuits 64 and 66 in detail at this time.

An input signal $\bar{\theta}$N3 (whose composition will be described), is introduced to the input terminal 2262 effectively to connect the output terminal 2252 of the column unload circuit to the negative terminal of the 14-volt source. This effectively completes the circuit of the windings 2066, 2068, 2070, 2072, 2074, 2076, . . . 2096, 2098, 2100, 2102, 2104, 2106, 2108, 2110 . . . 2130, 2132, 2134, 2136, 2138, 2140, 2142, 2144, 2146, 2148, 2150, 2152 and 2154.

Therefore, the actuation of the column unload circuit 66 by the input signal "$\bar{\theta}$N3." enables the column magnetic switch 56 in conjunction with the row magnetic switch 58 to unload the output core buffer 54 under the control of the signal N$\bar{\theta}$3. introduced to the driver circuits 60 and 62 as shown in FIGURES 4 and 16, the unloading sequence of the output core buffer to produce data in serial form at the output terminals 2256 and 2258, proceeding in the same manner as the loading of the input core buffer 22 which was described previously.

As discussed above, the component "$\bar{\theta}$" of the instruction "$\bar{\theta}$N3." represents the data portion of the block, the "N" component is the clock signal from the data processor, and the "3." represents a timing signal from the data processor indicating that it is ready to receive data from the output core buffer.

It will be appreciated that the current from the column magnetic switch 56 itself, or from the row magnetic switch 58 itself, is insufficient to turn over any of the cores in the output core buffer. However, when the two currents properly poled combine in a single core, they do represent sufficient ampere-turns to turn over that core. Then, if the core has previously been turned over to store a binary "1," it will be restored to the binary "0" condition. The turning over of the core, however, will cause a voltage to be introduced into the output winding 2254. Therefore, each time a core is turned over, a pulse representing a binary "1" appears at the output terminals 2256 and 2258. The unloading of the output core buffer under the control of the column magnetic switch 56 and the row magnetic switch 58 proceeds in a diagonal manner in the same way as the loading of the input core buffer 22 as described above. Therefore, the data appearing in serial form at the output terminals 2256 and 2258 has the same composition as when it was originally fed into the system at the input terminal of the inhibit amplifier 32 of FIGURE 6.

To load the output core buffer 54, the column load circuit 64 is activated by a signal "Z$\bar{A}$MS" introduced to its input terminal 2260. The "M" component of this signal, as described, represents an equality between the addresses in the current address register 48 and the desired address register 50, plus appropriate synchronizing to effect a memory transfer. It is when this equality occurs, and when the "M" flip-flop goes negative, that it is desired to load the data from the block following the one immediately succeeding the equality address on the tape into the output core buffer. The tape clock "Z" component of the signal introduced to the input terminal 2260 is made to pulse the column load circuit 64 to reduce power dissipation. The "$\bar{A}$" component, as noted, represents the data portion of the block to be loaded into the output core buffer. The "S" component represents a search signal.

The activation of the column load circuit 64 effectively connects the lead 2062 to the negative terminal of the 14-volt source. This connects the circuit for the windings 1884, 1886, 1888, 1890, 1892, 1894, . . . 1914, 1916, 1918, 1920, 1922, 1924, 1926, 1928 . . . 1948, 1950, 1952, 1954, 1956, 1958, 1960, 1962, 1964, 1966, 1968, 1970 and 1970*a*. Now the column magnetic switch 56 can proceed under the control of the signal Z$\bar{A}$MS to to load the data from the tape in a column-by-column manner. This is similar to the unloading of the input core buffer 22 and it is achieved by passing a current through the windings listed above in succession so that a current flows successively in the different columns. This current itself is insufficient to turn a core over. However, when a pulse representing a binary "1" appears at the same time at one of the output terminals C1–C14, the resulting combined currents are enough to turn over the corresponding core in the particular column. Therefore, at the end of the loading operation, all the cores in the output core buffer which represent a binary "1" from the block received from the tape 20 are in a turned-over state.

FIGURE 16 shows in block form the output core buffer 54 and the various components associated with the output core buffer. As described above, the column magnetic switch 56 has forty-five output terminals which are respectively connected to the forty-five columns of the output core buffer. The magnetic switch 58 has fourteen output terminals which are connected to the respective rows of the buffer. Likewise, the input terminals C1—C14 are connected to the respective rows.

The connections of the driver circuit 60 with the column magnetic switch 56 may be considered the same as those of the driver circuit 38 and the column magnetic switch 34 associated with the input core buffer 22. For this reason, it is believed unnecessary to repeat a detailed description of the units 56 and 60. Likewise, the row magnetic switch 58 may be considered the same as the row magnetic switch 36 associated with the input core buffer 22, and the driver circuit 62 may be similar to the driver circuit 40. Therefore, it is also believed unnecessary to repeat the detailed description for the circuits 58 and 62.

A reset circuit 2300 has a pair of output terminals 2302 and 2304. These output terminals are connected to a reset winding which links the row magnetic switch and the column magnetic switch and which is designated as 2306. This reset winding, like the reset winding linking the row magnetic switch 36 and column magnetic switch 34 responds to a signal introduced to its input terminal 2308 for reset circuit 2300 to set all the cores in the magnetic switches 56 and 58 to binary "0," with the exception of the last core in each switch, as described.

Circuit details of the output amplifier 55 are shown in FIGURE 16. This circuit may be similar to the circuit of the block address amplifier of FIGURE 13. The output terminals 2256 and 2258 of the output core buffer 54 are connected to the primary winding of a transformer 2310. The secondary winding of the transformer is connected to the base of a transistor 2312 and to the negative terminal of a .25-volt direct voltage source. The collector of the transistor 2312 is connected to one side of the primary winding of a transformer 2316. The other side of this primary winding is connected to a resistor 2318, and this resistor is connected to the negative terminal of a 4-volt voltage source. The resistor 2318 may have a resistance of 100 ohms. The emitter of the transistor 2312 is connected to a common lead 2314, and this lead is connected to the lower side of the primary of the transformer 2310. One side of the secondary winding of the transformer 2316 is connected to the anode of a diode 2320 and to the cathode of a diode 2322. The other side of the secondary winding of this transformer is connected to the anode of a diode 2324 and to the cathode of a diode 2326. The cathode of the diode 2320 is connected to the cathode of the diode 2324, and these cathodes are returned to the common lead 2314. The anode of the diode 2322 is connected to the anode of the diode 2326 and these anodes are connected to the base of a transistor 2328. The diodes are connected to constitute a full-wave rectifier since 1's in the output core buffer will be of + and − polarity. A resistor 2336a connects to the base of transistor 2328 and common lead 2314, and it may have a value of 62 ohms. The emitter of the transistor 2328 is connected to the common lead 2314, and the collector of this transistor is connected to the primary of a transformer 2330.

A feedback resistor 2332 is connected to the collector of the transistor 2328 and to its base. This resistor may have a resistance of 7 kilo-ohms. A similar feedback resistor 2334 is connected from the collector of the transistor 2312 to its base, and it (2334) may have a resistance of 10 kilo-ohms. A resistor 2336 is connected to the primary of the transformer 2330 and to the negative terminal of a 4-volt voltage source. This resistor and the resistor 2318 may each have a value of 100 ohms.

The secondary winding of the transformer 2330 is connected to the common lead 2314 and to the base of a transistor 2338. Common lead 2314 is grounded. The emitter of the transistor 2338 is connected to the collector of a transistor 2340, and the emitter of the latter transistor is grounded. The base of the transistor 2340 is connected to an input terminal 2342. The signal "$\bar{\theta}$3." is introduced to the input terminal 2342. This means that the circuit of the transistor 2338 is completed only in the presence of that signal. This, in turn, assures that the amplifier 55 will translate the output signal only upon the receipt of the instruction "3." from the data processor and only for the data portion of the block as represented by the component "$\bar{\theta}$."

The collector of the transistor 2338 is connected to a resistor 2344. The resistor 2344 may have a resistance of 2.2 kilo-ohms, and it is connected to the negative terminal of a 4-volt direct voltage source. The collector of the transistor 2338 is connected to the base of a transistor 2346, and the emitter of the latter transistor is grounded. The collector of the transistor 2346 is connected to a resistor 2348 having, for example, a resistance of 2.2 kilo-ohms. The latter resistor is connected to the negative terminal of the 4-volt voltage source. The collector of the transistor 2346 is also connected to the output terminal 2350 of the amplifier. This output terminal, as explained previously, is connected to the data processor.

Therefore, and in the manner described previously, when the proper conditions arise, the amplifier 55 rectifies and feeds the contents of the output core buffer 54 into the data processor. The output signal from the output amplifier 55 exhibits a negative pulse for each binary "1" and a zero amplitude pulse for each binary "0." As also described, this amplifier feeds only the data portion of the block into the data processor, the address portion being fed from the desired address register 50 under the control of the amplifier 57 in FIGURE 4. The circuit of the amplifier 57 may be similar to that of the amplifier 55 described above.

The amplifier 57, as shown in FIGURE 4, is connected to the output terminal of the desired address register 50, and it is under the control of the signal "$\theta$3.". At the precise time that the address portion of the block to be fed to the data processor occurs, the amplifier 57 is activated to feed the address to the data processor. Immediately at the end of the address portion, the amplifier 57 is de-activated by the signal $\theta$ going false, and the amplifier 55 is activated by the signal "$\bar{\theta}$" going true. The activation of the amplifier 55 causes it to translate at the proper time the data portion of the block to the data processor.

As described previously, the input core buffer is controlled by the following signals: "8U*$\bar{\theta}$N," "8U*$\bar{\theta}$," "8U*$\bar{\theta}$"+"$\bar{A}$MW," "8U*$\bar{\bar{\theta}}$N"+"Z$\bar{A}$MW," "8U*$P_0\bar{\theta}$," "8U*$\bar{\theta}$N," "Z$\bar{\bar{A}}$MW."

The various signals referred to above are made up of the following components, and each component is considered to have a zero amplitude when in its false state and a negative value when in its true state:

8U—an instruction from the data processor to write an 8 word block into the input core buffer 22 of FIGURE 4.

*—an interlocked condition to prevent reading while writing and to prevent writing while reading.

$\bar{\theta}$—the data portion of the 8-word block fed into the system from the data processor, this signal continuing throughout the entire data portion.

N—a clock signal from the data processor, this clock completing a full cycle for each binary bit fed from the data processor into the input core buffer 22.

$P_0$—the binary data fed out of the data processor and into the input core buffer 22.

Z—a clock signal from the tape clock amplifier 26, this signal going through one complete cycle for each binary bit to be recorded on the tape 20.

$\bar{A}$—the data portion of the block to be fed from the input core buffer 22 to the magnetic tape 20.

M—the signal produced by the compare network 52 indicating an equality between the address in the current address register 48 and in the desired address register 50 plus appropriate synchronizing to effect a data transfer involving tape storage.

W—a signal indicating that the entire block has been read into the input core buffer 22 and that the system is now prepared to write the contents of the input core buffer 22 into the magnetic tape 20.

As also discussed previously, the block address core register has four signals associated with it, namely, the signals "BLN," "$\bar{B}$LN," "BAZ" and "$\bar{B}$AZ. The signals "BAZ" and "$\bar{B}$AZ" are used to load each address into the block address core register, and the signals "BLN" and "$\bar{B}$LN" are used to write the address in the block address core register at the proper time into the current address register 48.

The various components of the signals referred to in the preceding paragraphs are as follows:

B—this is a block address column control signal, and it is true for the first two characters of each block and it is false for the second two characters of each block.

A—this signal is derived from the address control amplifier 46 and it comprises a pair of pulses which occur for the first two characters of each block, it being evident that the combination BA and $\bar{B}$A provides an indication for the first two characters of each block and for the second two characters of each block.

Z—as indicated above, this is the clock signal from the tape as derived from the amplifier 26.

L—this is a signal that occurs at the proper time to transfer an address stored in the block address core register 44 into the current address register 48 in coincidence with the desired address that is stored in the register 50.

N—as indicated above, this is the clock signal from the data processor.

The desired address register 50 has the signal

"$5W^*Y+8U^*\theta P_0$"

As explained above, this permits a desired address to be written into the desired address register 50 either to select a block from the system of the invention or to introduce a block from the data processor or other available device into the system. The components constituting the signal referred to in the preceding paragraph are as follows:

5W—this signal occurs when the data processor is in readiness to feed a desired address into the desired address register 50 to enable the system to search the storage tape 20 for desired block, this signal being interlocked with the 8U signal so that when the system is in the 5W mode, it is impossible to feed data into the input core buffer, and vice versa.

Y—this represents data from the data processor corresponding to the desired address of the block to be selected from the system of the invention.

8U—as indicated above, this represents a readiness of the data processor in the other mode of operation to feed a block into the input core buffer 22.

θ—this signal occurring only for the address portion of the block fed into the system, this signal operating in conjunction with its inverse to cause the address portion of the block to be fed into the desired address register 50 and to cause the data portion to be fed into the input core buffer 22.

As also described in some detail previously in the present specification, the signals associated with the output core buffer 54 are as follows: "Z$\bar{A}$MS," "N$\bar{\theta}$3.," "Z$\bar{A}$MS+N$\bar{\theta}$3.," "$\bar{\theta}$3.+$\bar{A}$MS," "NL+N$\bar{\theta}$3.," "L+$\bar{\theta}$3.," "N$\bar{\theta}$3.," "$\bar{\theta}$3.," and "θ3.," and "$P_1$."

The various components constituting the signals described in the preceding paragraph and which have not been previously defined in detail, are as follows:

S—this is a signal that occurs when the system is in readiness to search for a block of data into the output core buffer 54 whose address will have to correspond to that stored in the desired address register 50.

3.—is an instruction from the data processor which indicates a readiness to read the data out of the output core buffer and into the data processor.

Circuits which respond to the various timing signals and instructions from the data processor and from the magnetic storage tape 20 to derive and produce the composite signals described above are shown in FIGURES 17–21, and these circuits will now be described.

Figure 17:
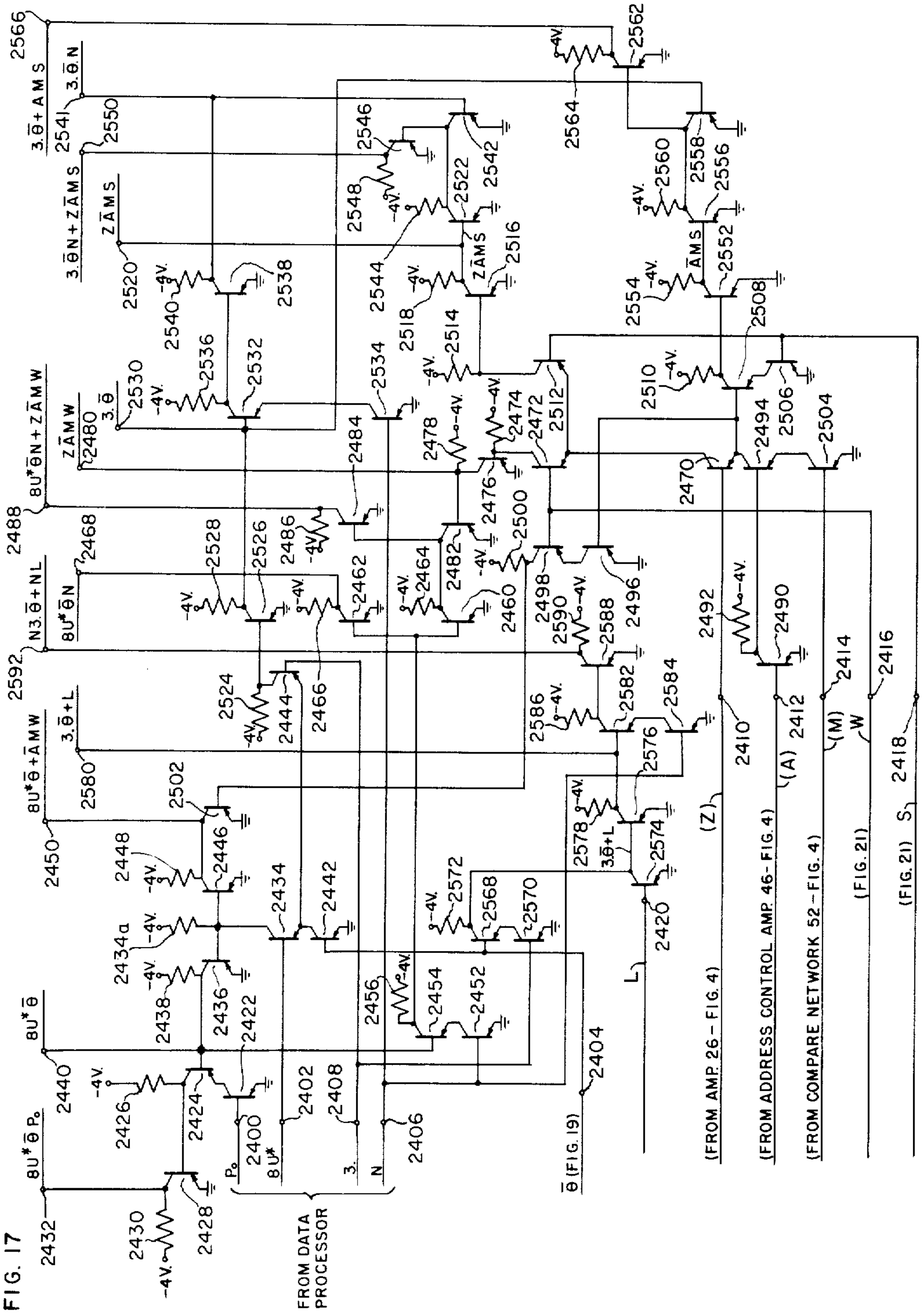
FIGURE 17 is a circuit representation of a control network which responds to various signals to provide a plurality of composite signals which are utilized in controlling the system of the invention in a synchronized manner, the signals generated by this circuit being used to control the magnetic switches associated with the input and output core buffers of the system.

Referring first to the circuit of FIGURE 17, it will be noted that this circuit has an input terminal 2400 by which the signal "$P_0$" is introduced. The circuit also has an input terminal 2402 to which the signal "8U*" is applied. This latter signal is derived from the interlock circuit of FIGURE 18, which will be described. The circuit of FIGURE 17 also has an input terminal 2404. The signal "$\bar{\theta}$" is applied to the latter input terminal and this signal is obtained from the circuit of FIGURE 19, which also will be described.

Figure 21:
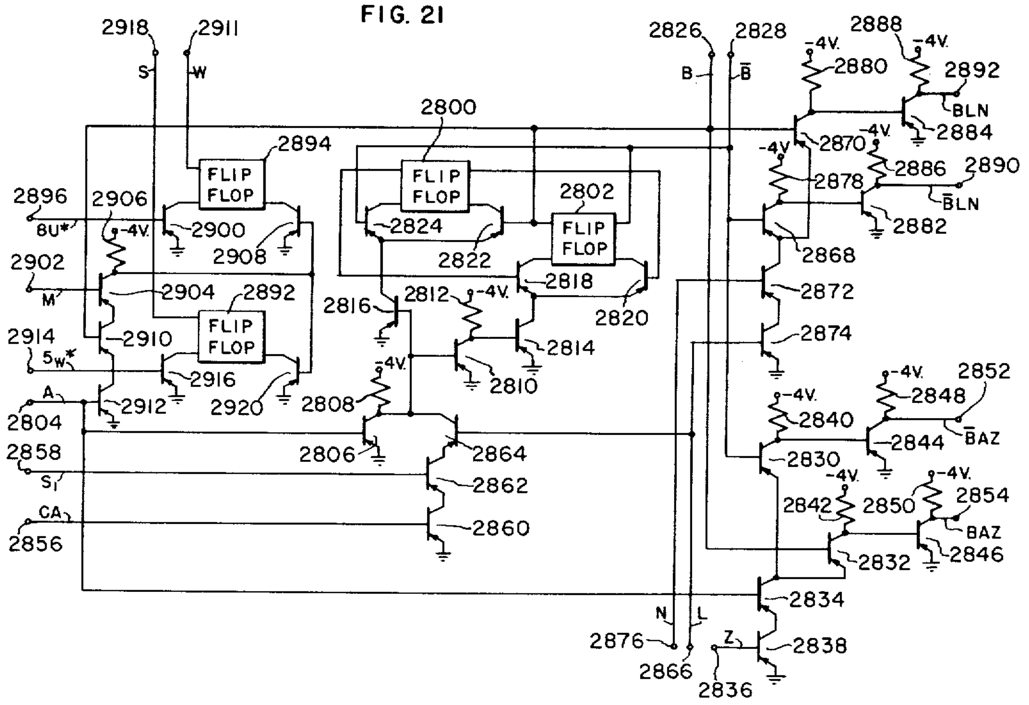
FIGURE 21 is also a control network which includes a plurality of flip-flops and associated circuitry for controlling the operation of the block address register of FIGURE 13.
Figure 20:
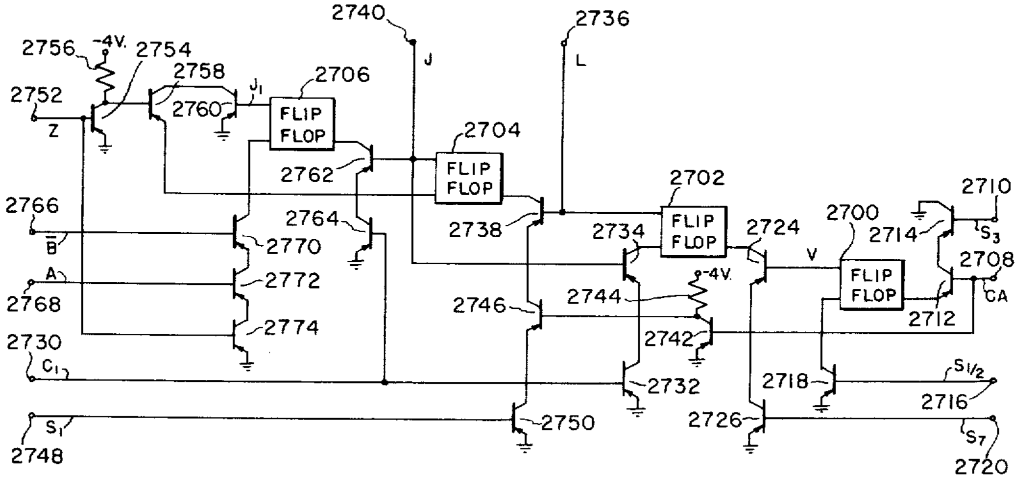
FIGURE 20 is a control network comprising a plurality of flip-flops (which are shown in block form) and associated circuitry for deriving certain control signals used for activating the block address core register of FIGURE 13.

The clock signal "N" from the data processor is impressed on an input terminal 2406 of the circuit of FIGURE 17, and the instruction "3." from the data processor is introduced to an input terminal 2408. The tape clock signal "Z" from the amplifier 26 of FIGURE 4 is applied to the terminal 2410, and the output signal "A" from the amplifier 46 is applied to an input terminal 2412. The signal "M" from the compare network 52 of FIGURE 4 is applied to the terminal 2414, and the signal "W," which is derived from the circuits of FIGURE 21, is applied to the input terminal 2416. Likewise, the signal "S" which is derived in a manner to be described in conjunction with FIGURE 21, is introduced to an input terminal 2418, and the signal "L" which is obtained in a manner to be described in conjunction with FIGURE 20 is introduced to an input terminal 2420.

The input terminal 2400 is connected to the base of a transistor 2422, the emitter of this transistor being grounded, and its collector being connected to the emitter of a transistor 2424. The collector of the transistor 2424 is connected to a resistor 2426, and this resistor is connected to the negative terminal of a 4-volt direct voltage source. The value of the resistor may be of the order of 4.7 kilo-ohms. The collector of the transistor 2424 is connected to the base of a grounded emitter transistor 2428. The collector of the latter transistor is connected to a 1.5 kilo-ohm resistor 2430, which, in turn, is connected to the negative terminal of a 4-volt direct voltage source. The collector of the transistor 2428 is connected to an output terminal 2432 of the network.

The input terminal 2402 is connected to the base of a transistor 2434. The collector of the transistor 2434 is connected to the base of a transistor 2436. The emitter of the latter transistor is grounded and its collector is connected to a 1.5 kilo-ohm resistor 2438. The resistor 2438 is connected to the negative terminal of a 4-volt direct voltage source. The collector of the transistor 2436 is also connected to the base of the transistor 2424. The collector of the transistor 2436 is also connected to an output terminal 2440.

The input terminal 2404 is connected to the base of a grounded emitter transistor 2442. The collector of the transistor 2442 is connected to the emitter of the transistor 2434 and to the emitter of a transistor 2444. The input terminal 2408 is connected to the base of the transistor 2444. The collector of the transistor 2434 is connected to the base of a grounded emitter transistor 2446. The collector of 2434 is connected to a resistor 2434a which is in turn connected to 4-volt direct voltage source. The resistor 2434a may have a value of 4.7 kilo-ohms. The collector of the transistor 2446 is connected to a resistor 2448 and this resistor is connected to the negative terminal of a 4-volt direct voltage source. The resistor 2448 may have a resistance, for example, of 4.7 kilo-ohms. The collector of the transistor 2446 is also connected to an output terminal 2450.

The input terminal 2406 is connected to the base of a grounded emitter transistor 2452. The collector of the transistor 2452 is connected to the emitter of a transistor 2454. The collector of the latter transistor is connected to a resistor 2456. This resistor may have a resistance of 4.7 kilo-ohms, and it is connected to the negative terminal of a 4-volt direct voltage source. The base of the transistor 2454 is connected to the collector of the transistor 2436.

The collector of the transistor 2454 is connected to the base of a transistor 2460 and to the base of a transistor 2462. The emitters of these transistors are both grounded. The collector of the transistor 2460 is connected to a resistor 2464, this resistor having a resistance of 4.7 kilo-ohms and being connected to the negative terminal of a 4-volt direct voltage source. The collector of the transistor 2462 is connected to a resistor 2466, this resistor having a resistance of 1.5 kilo-ohms and being connected to the negative terminal of a 4-volt direct voltage source. The collector of the transistor 2462 is connected to an output terminal 2468.

The output terminal 2410 is connected to the base of a transistor 2470. The collector of the transistor 2470 is connected to the emitter of a transistor 2472. The collector of the transistor 2472 is connected to a resistor 2474, this resistor having a resistance of 4.7 kilo-ohms and being connected to the negative terminal of a 4-volt direct voltage source. The collector of the transistor 2472 is also connected to the base of a grounded emitter transistor 2476.

The collector of the transistor 2476 is connected to a resistor 2478. The resistor 2478 may have a resistance of 1.5 kilo-ohms, and it is connected to the negative terminal of a 4-volt voltage source. The collector of the transistor 2476 is connected to an output terminal 2480 and also to the base of a transistor 2482. The transistor 2482 has a grounded emitter, and its collector is connected to the collector of the transistor 2460 and to the base of a transistor 2484. The transistor 2484 has a grounded emitter and its collector is connected to one terminal of a resistor 2486. The resistor 2486 is connected to the negative terminal of a 4-volt direct voltage source, and it may have a value of 1.5 kilo-ohms. The collector of the transistor 2484 is connected to an output terminal 2488 of the network.

The input terminal 2412 is connected to the base of a grounded emitter transistor 2490. The collector of this transistor is connected to a 1.5 kilo-ohm resistor 2492, and the resistor is connected to the negative terminal of a 4-volt direct voltage source. The collector of the transistor 2490 is connected to the base of a transistor 2494. The collector of the transistor 2494 is connected to the emitter of the transistor 2470 and to the base of a grounded emitter transistor 2496. The collector of the latter transistor is connected to the emitter of a transistor 2498, and the collector of the transistor 2498 is connected to a 4.7 kilo-ohm resistor 2500, this resistor being connected to the negative terminal of a 4-volt direct voltage source. The collector of the transistor 2498 is also connected to the base of a grounded emitter transistor 2502, the collector of the latter resistor being connected to the collector of the transistor 2446.

The input terminal 2414 is also connected to the base of a transistor 2504, the collector of the transistor 2504 being connected to the emitter of the transistor 2494 and the emitter of the transistor 2504 being grounded. The input terminal 2416 is connected to the base of the transistor 2498 and to the base of the transistor 2472.

The input terminal 2418 is connected to the base of a grounded emitter transistor 2506. The collector of the transistor 2506 is connected to the emitter of a transistor 2508, the base of the latter transistor being connected to the collector of the transistor 2494. The collector of the transistor 2508 is connected to a resistor 2510. This resistor may have a resistance of 4.7 kilo-ohms, and it is connected to the negative terminal of a 4-volt direct voltage source.

The input terminal 2418 is also connected to the base of a transistor 2512. The emitter of this transistor is connected to the collector of the transistor 2470, and the collector of the transistor 2512 is connected to a resistor 2514, which in turn is connected to the negative terminal of a 4-volt direct voltage source. The resistor 2514 may, for example, have a resistance of 4.7 kilo-ohms.

The collector of the transistor 2512 is connected to the base of a grounded emitter transistor 2516. The collector of the transistor 2516 is connected to a 1.5 kilo-ohm resistor 2518, and the resistor is connected to the negative terminal of a 4-volt direct voltage source. The collector of the transistor 2516 is further connected to an output terminal 2520 of the network and to the base of a grounded emitter transistor 2522.

The collector of the transistor 2444 is connected to a 1.5 kilo-ohm resistor 2524, this resistor being connected to the negative terminal of a 4-volt voltage source. The collector of the transistor 2444 is also connected to the base of a grounded emitter transistor 2526, the collector of this latter transistor being connected to a 1.5 kilo-ohm resistor 2528, which, in turn, is connected to the negative terminal of a 4-volt direct voltage source.

The collector of the transistor 2526 is connected to an output terminal 2530 of the network and to the base of a transistor 2532. The input terminal 2406 is connected to the base of a transistor 2534, the emitter of the transistor 2534 being grounded and the collector of this transistor being connected to the emitter of the transistor 2532.

The collector of the transistor 2532 is connected to a resistor 2536 and to the base of a grounded emitter transistor 2538. The resistor 2536 may have a resistance of 4.7 kilo-ohms, and this resistor is connected to the negative terminal of a 4-volt voltage source.

The collector of the transistor 2538 is connected to a resistor 2540 having a value of 1.5 kilo-ohms, this resistor being connected to the negative terminal of a 4-volt direct voltage source. The collector of the transistor 2538 is also connected to an output terminal 2541 and to the base of a transistor 2542.

The emitter of the transistor 2542 is grounded, and its collector is connected to the collector of the transistor 2522 and to one terminal of a resistor 2544. The resistor may have a resistance of 4.7 kilo-ohms, and it is connected to the negative terminal of a 4-volt voltage source. The collectors of the transistors 2522 and 2542 are also connected to the base of a transistor 2546. The emitter of the transistor 2546 is grounded, and a resistor 2548 is connected between its collector and the negative terminal of a 4-volt voltage source. The resistor 2548 may, for example, have a resistance of 1.5 kilo-ohms. The collector of the transistor 2546 is also connected to an output terminal 2550 of the network.

The collector of the transistor 2508 is connected to the base of a grounded emitter transistor 2552. The collector of the transistor 2552 is connected to a resistor 2554 having, for example, a resistance of 1.5 kilo-ohms.

The resistor 2554 is connected to the negative terminal of a 4-volt direct voltage source. The collector of the transistor 2552 is connected to the base of a grounded emitter transistor 2556. The collector of the transistor 2526 is also connected to the base of a grounded emitter transistor 2558. The collectors of the transistors 2556 and 2558 are connected in common to one terminal of a resistor 2560. The resistance of this resistor may be of the order of 4.7 kilo-ohms, and it is connected to the negative terminal of a 4-volt direct voltage source.

The collectors of the transistors 2556 and 2558 are connected to the base of a transistor 2562. The emitter of this transistor is grounded and its collector is connected to a resistor 2564. This resistor may have a resistance of 1.5 kilo-ohms, and it is connected to the negative terminal of a 4-volt voltage source. The collector of the transistor 2564 is also connected to an output terminal 2566 of the network.

The input terminal 2404 is also connected to the base of a transistor 2568, and the input terminal 2408 is also connected to the base of a transistor 2570. The emitter of the transistor 2570 is grounded, and its collector is connected to the emitter of the transistor 2568. The collector of the transistor 2568 is connected to a resistor 2572 and this resistor has its other terminal connected to the negative terminal of a 4-volt direct voltage source. The resistor 2572 may have a resistance of 4.7 kilo-ohms. The input terminal 2420 is connected to the base of a transistor 2574. The emitter of the transistor 2574 is grounded and its collector is connected to the collector of the transistor 2568. The collectors of the transistors 2568 and 2574 are connected to the base of a grounded emitter transistor 2576. The collector of the emitter 2576 is connected to a resistor 2578 which is connected to the negative terminal of a 4-volt direct voltage source. This resistor may have a resistance of 1.5 kilo-ohms. The collector of the transistor 2576 is connected to an output terminal 2580 of the network and to the base of a transistor 2582.

The input terminal 2406 is further connected to the base of a grounded emitter transistor 2584. The collector of the transistor 2584 is connected to the emitter of the transistor 2582, and this collector of the latter transistor is connected to a resistor 2586. Resistor 2586 is connected to the negative terminal of a 4-volt direct voltage source, and it may have a resistance of 4.7 kilo-ohms.

The collector of the transistor 2582 is connected to the base of a grounded emitter transistor 2588. The collector of the transistor 2588 is connected to a 1.5 kilo-ohm resistor 2590, this resistor being connected to the negative terminal of a 4-volt direct voltage source. The collector of the transistor 2588 is also connected to an output terminal 2592 of the network.

As indicated above, the network of FIGURE 17 is capable of responding to the various signals introduced to its input terminals and of combining the signals to produce the required wave shapes and signals for controlling the operation of the system of the invention. The various transistor circuits described above will be understood to those skilled in the art as comprising "and" and "or" networks which are used to a large extent in computers, data processors and the like. Any type of transistor suitable for direct coupled logic similar to the jet plated surface carrier NPN type may be used in the network, as also is well understood to those skilled in the art.

The signal "8U*" is introduced to the base of the transistor 2434 and the signal "$\bar{\theta}$" is introduced to the base of the transistor 2442. These transistors form an "and" network, and these signals are combined in this network and inverted in the network of the transistor 2436 to produce the signal "$8U^*\bar{\theta}$" at the output terminal 2440. This latter signal is also introduced to the transistor 2424 and the signal "$P_0$" is introduced to the transistor 2422. The transistors 2424 and 2422 are also connected as an "and" network and these signals are combined and inverted in the circuit of the transistor 2428 to produce the signal "$8U^*\bar{\theta}P_0$" at the output terminal 2432.

The signal "$8U^*\bar{\theta}$" is also introduced to the base of the transistor 2454 and the signal "N" from the input terminal 2406 is introduced to the base of the transistor 2452. These transistors 2454 and 2452 form an "and" network and this network and the inverter network of the transistor 2462 cause the signal "$8U^*\bar{\theta}N$" to be produced at the output terminal 2468.

The signal "Z" from the input terminal 2410 is applied to the base of a transistor 2470, the signal "$\bar{A}$" from the inverter circuit of the transistor 2490 is applied to the base of the transistor 2494, and the signal "M" from the input terminal 2414 is applied to the base of the transistor 2504. Also, the signal "W" is applied to the base of the transistor 2472. The first three transistors operate as an "and" network to produce the signal "$\overline{AMZ}$" at the collector of the transistor 2470. This "and" network also forms an "and" network with the transistor 2472 to produce the signal "$\overline{ZAMW}$" at the collector of the transistor 2472. The signal "$Z\bar{A}MW$," after a proper inversion in the circuit of the transistor 2476, is developed at the output terminal 2480. The signal "$Z\bar{A}M$" at the collector of the transistor 2470 is combined with the signal "S" in the transistor 2512 to provide, with the proper polarity, the output signal "$Z\bar{A}MS$" at the collector of the phase inverter transistor 2516 and at the output terminal 2520.

The signal "3." from the input terminal 2408 is introduced to the base of the transistor 2444 to be combined with the signal "$\theta$" and produce at the collector of the transistor 2526 the signal "$3.\bar{\theta}$." This latter signal is produced at the output terminal 2530 of the network. The signal "$3.\bar{\theta}$" is also applied to the base of the transistor 2532 and the signal "N" from the input terminal 2406 is applied to the base of the transistor 2534. These transistor form an "and" network, so that the signal "$3.\bar{\theta}N$" is produced at the collector of the inverter transistor 2538, which is connected to the output terminal 2541.

The signal "$Z\bar{A}MS$" from the collector of the transistor 2516 is applied to the base of the transistor 2522. In like manner, the signal "$3.\bar{\theta}N$" from the collector of the transistor 2538 is introduced to the base of the transistor 2542. These latter transistors are connected as an "or" network so that the signal "$3.\bar{\theta}N+Z\bar{A}MS$" appears at the output terminal 2550 connected to the collector of the inverter transistor 2546.

Similarly, the signal at the collector of the transistor 2434 is introduced to the base of the transistor 2446, and the signal at the collector of the transistor 2498 is fed to the base of the transistor 2502. The transistor 2446 and the transistor 2502 are connected as an "or" network, so that the signal "$8U^*\bar{\theta}+\bar{A}MW$" appears at the output terminal 2450 which is connected to the collectors of these "or" network transistors.

In like manner, the signal "$8U\bar{\theta}N$" at the collector of the transistor 2454 is applied to the base of the transistor 2460 and the signal "$Z\bar{A}MW$" at the collector of the transistor 2476 is applied to the base of the transistor 2482. The transistors 2460 and 2482 are connected as an "or" network, and after the proper inversion by the circuit of transistor 2484, the signal "$8U\bar{\theta}N+Z\bar{A}MW$" appears at at the output terminal 2488.

The signal "$3.\bar{\theta}$" is also introduced to the base of the transistor 2558, and the signal "$\bar{A}MS$" derived from the collector of the transistor 2552 is applied to the base of the transistor 2556. The transistors 2558 and 2556 are connected as an "or" network, and after a proper inversion in the circuit of the transistor 2562, the signal "$3.\bar{\theta}+\bar{A}MS$" appears at the output terminal 2566 of the network.

The signal "$\bar{\theta}$" is combined with the signal "3." in the "and" network formed by the transistors 2568 and 2570. This "and" network forms an "or" network with the transistor 2574, and the signal "L" is applied to the latter transistor. The inverter transistor 2576, therefore, produces the signal "$3.\theta+L$," and that signal is applied to the output terminal 2580. The signal is also applied to the base of the transistor 2582, and this transistor forms an "and" network with the transistor 2584 to which the signal "N" is applied. Therefore, the inverter transistor 2588 produces the signal "$N3.\bar{\theta}+NL$" at the output terminal 2592.

It will be apparent from the operation of "and" networks and of "or" networks that the representation of any output signal by a plurality of components, such as for example, the signal "$8U^*\bar{\theta}N$," requires that each of these components occurs with a negative polarity before the composite output signal is produced. Also, the designation of an output signal such as, for example, the output signal "$N3.\bar{\theta}+NL$" signifies that a signal appears at the corresponding output terminal when either the component groups on one side of the add logical "or" sign occur with negative polarity, or those on the other side of this sign all occur with negative polarity.

The network of FIGURE 17, therefore, responds to various input signals from the data processor, and to others which are developed in a manner to be described, to provide the wave shapes that are required to properly control the operation of the system of the invention. The particular point in the system to which the output signals of the network of FIGURE 17 are to be applied has been described in conjunction with FIGURE 4 and need not be repeated here.

Figure 18:
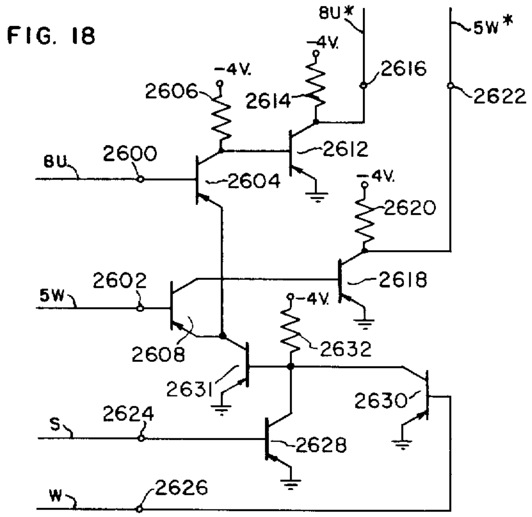
FIGURE 18 is a circuit diagram by means of which a desired interlocking may be obtained to prevent the system from being activated by control signals from other data processors while it is in the process of being controlled by a particular data processor.

The circuit of FIGURE 18 is an interlock circuit for interlocking the instruction 8U from the data processor with the instruction "5W." It will be remembered that the instruction "8U" occurs when it is desired to feed a block from the data processor into the input buffer of the system of the invention. On the other hand, the instruction "5W" occurs when it is desired to set up a desired address in the desired address register 50 and to search the magnetic tape 20 of FIGURE 4 for a block to be fed into the data processor. The purpose of the circuit of FIGURE 18 is to prevent subsequent "8U" and "5W" instructions from activating the system of the invention when it is in the process of acting on a "5W" or "8U" instruction. While this is true for a particular embodiment, simultaneous read and write operations should not be precluded.

The interlock network of FIGURE 18 has a first input terminal 2600 to which the data processor signal "8U" is introduced, and it has a second input terminal 2602 to which the data processor signal "5W" is introduced. The input terminal 2600 is connected to the base of a transistor 2604, and the collector of this transistor is connected to one terminal of a kilo-ohm resistor 2606. The resistor 2606 is connected to the negative terminal of a 4-volt voltage source. The input terminal 2602, on the other hand, is connected to the base of a transistor 2608. The collector of the transistor 2608 is also connected to a 3 kilo-ohm resistor 2610, and that resistor is also returned to the negative terminal of the 4-volt direct voltage source.

The collector of the transistor 2604 is connected to the base of a grounded emitter transistor 2612, and the collector of the latter resistor is connected to a resistor 2614. The resistor 2614 may have a resistance of 1.5 kilo-ohms, and it is connected to the negative terminal of a 4-volt direct voltage source. The collector of the transistor 2612 is connected to an output terminal 2616 at which the signal "8U*" appears, the asterisk (*) indicating the interlocked condition, as explained previously.

The collector of the transistor 2608 is connected to the base of a grounded emitter transistor 2618, and the collector of the transistor 2618 is connected to a resistor 2620. The resistor 2620 may have a resistance of 1.5 kilo-ohms, and it too is connected to the negative terminal of the 4-volt direct voltage source. The collector of the transistor 2618 is connected to an output terminal 2622 at which the signal 5W* appears. As in the previous instance, the asterisk (*) indicates the interlocked condition.

The network of FIGURE 18 has a further pair of input terminals 2624 and 2626. These terminals are connected respectively to the bases of a pair of grounded emitter transistors 2628 and 2630. These transistors are connected as an "or" network and their collectors are connected together and to the base of a transistor 2631. The emitter of the transistor 2631 is grounded and its collector is connected to the emitters of the transistors 2604 and 2608. A common resistor 2632 is connected to the common collectors of the transistors 2628 and 2630. This resistor may have a resistance of 3.3 kilo-ohms, and it is connected to the negative terminal of the 4-volt direct voltage source. The signal "S" is introduced to the input terminal 2624 and the signal "W" is introduced to the input terminal 2626. These latter signals are derived in a manner to be described.

As will be described in conjunction with FIGURE 21, the negative component of the signal "W" is produced when data is in the input core buffer to be fed to the tape. Also, the negative components of the signal "S" is produced when data on the tape is to be fed to the output core buffer. During these intervals, the transistor 2628 is conductive or the transistor 2630 is conductive. This causes the potential on the base of the transistor 2631 to be zero at these intervals so that the emitter circuits of the transistors 2604 and 2608 are effectively broken. The circuit of FIGURE 18, therefore prevents any further "8U" or "5W" instructions from being introduced from other data processors instructions during the intervals (defined by the signals "S" and "W") when a block is being processed in the system of the invention.

Reference is now made to the curves of FIGURE 22. The top curve is the data processor clock signal "N," and as indicated above, this signal goes through one complete cycle for each interval representing a binary bit from the data processor.

The second signal represented is entitled BLK, and this signal goes negative for the first word of each block, from the data processor. The signal "$S_1$" (as noted) goes negative for the first half of the interval representing the first binary bit of each character from the data processor. Likewise, the signal "$S_3$" goes negative for the first half of the interval representing the third bit of each character, the signal "$S_4$" goes negative for the first half of the interval representing the fourth bit of each character and the signal "$S_7$" goes negative for the first half of the interval representing the seventh bit of each character from the data processor.

The signal "S½" corresponds to "$S_7\bar{N}$." Like the signal "$S_7$," the signal "S½" goes negative during the interval of the seventh binary bit of each character from the data processor. However, the signal "S½" goes negative during the last half of that interval instead of during the first half.

The "CA" signal illustrated in FIGURE 22 is derived from a binary counter in the data processor which is activated by the clock signal "N." The signal "CA" provides a count for each character of each block from the data processor. The first four digits of the signal "CA" in any word identify the character in that word, and the last three digits identify the word in the block. The signal "CA" goes negative for each binary "1" and it starts at the beginning of each word representing the binary number 1010, where the least significant digit is at the left. It then counts to binary 0000 at the end of each word, insofar as its four least significant digits are concerned, and starts over (after adding a "1" to the binary digits of the three most significant). The count represented by the signal "CA" proceeds from character to character of the first word in the manner indicated in FIGURE 22.

Figure 19:
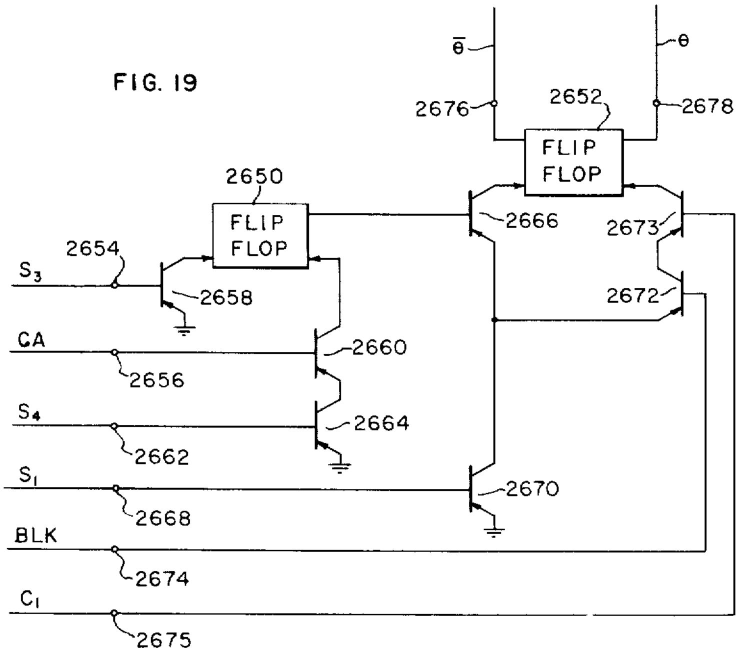
FIGURE 19 is a diagram partly in block form and partly in circuitry to show the control of a pair of flip-flops to derive a timing signal that is used in the system of the invention to differentiate between the address portion and the data portion of each block processed in the system.

The signal "$S_4$*" shown in FIGURE 22 is derived in a manner to be described in conjunction with FIGURE 19, and it corresponds to the signal "$CAS_4$." That is, the signal "$S_4$*" goes negative during the fourth bit of any character of any word in which the signal "CA" represents a "1." As shown in FIGURE 22, this occurs during the fourth character of each word.

The signal "$C_1$" goes negative for the first character of each word, as shown in FIGURE 22. The signal "$C_1'$" is similar to the signal "$C_1$" with the exception that it leads the signal "$C_1$" by four binary bits, as mentioned above. Therefore, "$C_1'$" is negative during the occurrence of "$S_4$" and "$S_7$" in the twelfth character of each word.

As mentioned above, the signal "$\bar{\theta}$" is derived by the circuit of FIGURE 19. This circuit includes a flip-flop 2650 and a flip-flop 2652. The circuit also has an input terminal 2654 to which the signal "$S_3$" of FIGURE 22 is introduced, and the circuit has an input terminal 2656 to which the signal "CA" is introduced. The input terminal 2654 is connected to the base of a grounded emitter transistor 2658, the collector of this tansistor being connected to the left input terminal of the flip-flop 2650. The input terminal 2656, on the other hand, is connected to the base of a transistor 2660, the collector of the transistor 2660 being connected to the right input terminal of the flip-flop 2650. The circuit has an input terminal 2662 to which the signal "$S_4$" is applied, and this latter input terminal is connected to the base of a transistor 2664. The emitter of the transistor 2664 is grounded and its collector is connected to the emitter of the transistor 2660.

The right output terminal of the flip-flop 2650 is connected to the base of a transistor 2666, and the collector of this transistor is connected to the left input terminal of the flip-flop 2652. The circuit has an input terminal 2668 which is connected to the base of a grounded emitter transistor 2670, the collector of the latter transistor being connected to the emitter of the transistor 2666 and to the emitter of a transistor 2672. An input terminal 2674 of the circuit is connected to the base of the transistor 2672. The collector of the transistor 2672 is connected to the emitter of a transistor 2673, and the collector of the transistor 2673 is connected to the right input terminal of the flip-flop 2652. The signal $S_1$ is applied to the input terminal 2668 and the signal BLK is applied to the input terminal 2674. The circuit also has an input terminal 2675 which is connected to the base of the transistor 2673, and to which the signal $C_1$ is applied.

The left output terminal of the flip-flop 2652 is connected to an output terminal 2676 of the network and the right output terminal of the flip-flop 2652 is connected to an output terminal 2678 of the network. The signal "$\bar{\theta}$" is derived at the output terminal 2676, and it will be remembered that this signal is negative for the entire block with the exception of the address portion, that is, the first four characters of the first word during which the signal $\theta$ is negative. The signal "$\theta$," on the other hand, is obtained at the output terminal 2678, and this latter signal is negative for the first four characters of the first word of each block which represent the address portion, and it is zero for the remainder of the block.

As described above, the signal "BLK" goes negative for the first word in each block. This signal is introduced to the base of the transistor 2672, and the signal "$C_1$" is introduced to the base of the transistor 2673, so that the flip-flop 2652 triggered to its true state by the signal $S_1$ at the beginning of the first character of the first word of the block. This causes the signal "$\theta$" to go negative at the beginning of each block. This is desired so that the address portion of the block can be introduced to the desired address register 50 of FIGURE 4.

The flip-flop 2650 is triggered to a false state by the signal $S_3$ so that the flip-flop may be in a false state during each character of each word some time before the occurrence of the signal "$S_4$." So long as the flip-flop 2650 is in a false state, the potential at its right output terminal is zero and the conductivity conditioning of the transistor 2670 has no effect on the flip-flop 2652 because the transistor 2666 is held nonconductive.

However, when the signal "CA" goes negative at the time corresponding to the fourth character of the first word of the block and in coincidence with the signal "$S_4$," both the transistors 2660 and 2664 are rendered conductive so that the flip-flop 2650 is triggered to a true state. This causes the right output terminal of the flip-flop 2650 to go negative and tend to render the transistor 2666 conductive. Then, the next time the signal "$S_1$" goes negative, the transistor 2670 is rendered conductive and the flip-flop 2652 is triggered to its false state. This causes the signal "$\theta$" to go to zero and it causes the signal "$\bar{\theta}$" to go negative. This occurs at the first bit "$S_1$" of the first character after the "$S_4$" goes negative. That is, this occurs at the first bit of the fifth character of the block, this being the first data character following the address portion. Therefore, and as is desired, the signal "$\theta$" is negative for the first four characters of the first word of each block (which constitutes the address portion), and the signal "$\bar{\theta}$" is negative for the remaining portion of the block.

The circuit of FIGURE 20 includes a plurality of flip-flops 2700, 2702, 2704 and 2706. The flip-flops 2700 and 2702 respectively control the signals "V" and "L" of FIGURE 22, and the flip-flops 2704 and 2706 respectively control a pair of signals which will be termed "J" and "$J_1$." The circuit has a first pair of input terminals 2708 and 2710. The signal "CA" of FIGURE 20 is introduced to the input terminal 2708, and the signal "$S_3$" is introduced to the input terminal 2710. The input terminal 2708 is connected to the base of a transistor 2712 and the input terminal 2710 is connected to the base of a transistor 2714. The emitter of the transistor 2714 is grounded and its collector is connected to the emitter of the transistor 2712. The collector of the transistor 2712 is connected to the right input terminal of the flip-flop 2700. The circuit also has an input terminal 2716 which is connected to the base of a transistor 2718. The emitter of the transistor 2718 is grounded and its collector is connected to the left input terminal of the flip-flop 2700. The signal "S½" of FIGURE 22 is applied to the input terminal 2716.

The circuit also has an input terminal 2720, and the signal "$S_7$" is applied to that input terminal. The left output terminal of the flip-flop 2700 is connected to the base of a transistor 2724, and the input terminals 2720 are connected to the base of a transistor 2726. The emitter of the transistor 2721 is grounded and its collector is connected to the emitter of the transistor 2724, the collector of the latter transistor being connected to the right input terminal of the flip-flop 2702.

The circuit of FIGURE 20 has an additional input terminal 2730 which is connected to the base of a transistor 2732 and to which the signal "$C_1$" of FIGURE 22 is introduced. The emitter of the transistor 2732 is grounded and its collector is connected to the emitter of a transistor 2734. The collector of the latter transistor is connected to the left input terminal of the flip-flop 2702.

The left output terminal of the flip-flop 2702 is connected to an output terminal 2736. In a manner to be described, the signal "L" appears at that output terminal. This signal goes negative as an indication to transfer a block address stored in the block address core register 44 of FIGURE 4 into the current address register 48. It will be appreciated that this transfer must occur bit-by-bit at the precise instant that the desired address in the desired address register 50 is in alignment with the current address in the core register 44.

The left output terminal of the flip-flop 2702 is also connected to the base of a transistor 2738, the collector of the transistor 2738 is connected to the right input terminal of the flip-flop 2704. The left output terminal of the latter flip-flop is connected to the base of the transistor 2734 and to an output terminal 2740. The control signal "J" appears at the latter output terminal and the function of this control signal will be described.

The input terminal 2708 is also connected to the base of a transistor 2742. The emitter of the latter transistor is grounded and its collector is connected to a resistor 2744. The resistor is connected to the negative terminal of the 4-volt direct voltage source and it may have a resistance of 3 kilo-ohms. The transistor 2742 serves to invert the signal "CA" and to derive at its output terminal the signal "$\overline{CA}$." The collector of the transistor 2742 is connected to the base of a transistor 2746. The circuit includes an input terminal 2748 to which the signal "$S_1$" is applied. This latter input terminal is connected to the base of a transistor 2750. The emitter of the transistor 2750 is grounded and its collector is connected to the emitted of the transistor 2746. The collector of the transistor 2746 is connected to the emitter of the transistor 2738, and the collector of the latter transistor is connected to the right input terminal of the flip-flop 2704.

The circuit of FIGURE 20 includes an additional input terminal 2752. The clock signal "Z" from the tape clock amplifier 26 of FIGURE 4 is applied to the input terminal 2752. The input terminal is connected to the base of a transistor 2754. The emitter of the latter transistor is grounded and its collector is connected to a 3 kilo-ohm resistor 2756. The resistor 2756 is connected to the negative terminal of a 4-volt direct voltage source.

The collector of the transistor 2754 is connected to the base of a transistor 2758. The circuit of the transistor 2754 serves to invert the tape clock signal "Z," so that the signal "$\overline{Z}$" is applied to the base of the transistor 2758. The collector of the transistor 2758 is connected to the left input terminal of the flip-flop 2704, and its emitter is connected to the collector of a transistor 2760. The emitter of the transistor 2760 is grounded, and its base is connected to the left output terminal of the flip-flop 2706.

The left output terminal of the flip-flop 2704 is connected to the base of a transistor 2762. Also, the input terminal 2730 is connected to the base of a transistor 2764. The emitter of the transistor 2764 is grounded, and its collector is connected to the emitter of the transistor 2762. The collector of the transistor 2762 is connected to the right input terminal of the flip-flop 2706.

The circuit of FIGURE 20 has a further pair of input terminals 2766 and 2768. The signal "$\overline{B}$" (which is derived in a manner to be described) is introduced to the terminal 2766, and the signal "A" from the address control amplifier 46 of FIGURE 4 is applied to the input terminal 2768. As described above, and as shown in FIGURE 23, the signal "A" goes negative for the first character pair of the first word of each block on the tape, and again for the third and fourth characters of the first word. Also, the signal "$\overline{B}$" is derived in a manner to be described (and as shown in FIGURE 23), so that it goes negative after the first and second character of the first word of each block which enables the block address core register 44 to select, in the manner described, the first two characters of each block in response the signal "B" in conjunction with the signal "A" for storage in its first column, and to select the second two characters in response to the signal "$\overline{B}$," and in conjunction with the signal "A" for storage in its second column.

The input terminal 2766 is connected to the base of a transistor 2770 and the input terminal 2768 is connected to the base of a transistor 2772. The input terminal 2752 is connected to the base of a transistor 2774 so that the clock signal "Z" from the tape clock amplifier 26 of FIGURE 4 may be introduced to the latter transistor. The emitter of the transistor 2774 is grounded and its collector is connected to the emitter of the transistor 2772. The collector of the transistor 2772 is connected to the emitter of the transistor 2770 and the collector of the latter transistor is connected to the left input terminal of the flip-flop 2706.

As noted above, it is desirable for the signal "L" to go negative after each block address has been stored in the block address core register 44 and at a time corresponding to the occurrence of the first bit of the desired address stored in the desired address register 50. At all other times, the signal "L" at the output terminal 2736 is zero.

To prevent the block address from being fed from the core register 44 the zero portion of the signal "L" is controlled by the triggering of the flip-flop 2702 to its false state, and the negative portion of the signal "L" is controlled by triggering the flip-flop 2702 to its true state.

The triggering of the flip-flop 2702 to its false state is controlled in part by the flip-flop 2700. The flip-flop 2700 is triggered to its false state when the signal "CA" goes negative together with the signal "$S_3$." This occurs for the third bit of the first three characters of each word, as shown in FIGURE 22, but not for the fourth bit. The flip-flop 2700 is triggered to its true state by the signal "S½," when the latter signal goes negative at the end of each character, as shown in FIGURE 22. Therefore, the flip-flop 2700 is triggered in the manner represented by the curve "V" of FIGURE 22. That is, the signal of curve "V" is zero when the "$S_7$" signal occurs during the first three characters of each word, but the signal "V" is negative, or true, during the negative component of the "$S_7$" signal for the fourth character of each word.

The flip-flop 2702 is triggered to a true state at the beginning of each word by the signal "$C_1$" which is introduced to the transistor 2732, assuming that the signal "J" introduced to the transistor 2734 is negative, or true. As shown in FIGURE 22, and as discussed above, the signal "$C_1$" goes negative for the first character of each word. Then the flip-flop 2702 is triggered to a false state by the signal "$S_7$" introduced to the transistor 2726, assuming that the signal "V" (which is introduced to the transistor 2724) is negative. The latter condition occurs, as noted above, at the end of the fourth character of each word. It will be remembered that the first column of the block address core register is loaded by the control signal "BAZ," and that the second column is loaded by the control signal "$\overline{B}$AZ." Upon the occurrence of the latter signal it is clear that the block address core register is loaded and ready to feed its address into the current address register when the proper time arises.

Therefore, the signal "$\overline{B}$AZ" is applied to the transistors 2770, 2772 and 2774 in FIGURE 20 to trigger the flip-flop 2706 true when the block address core register is loaded. This causes the signal "$J_1$" to go negative to render the transistor 2758 conductive. The trailing portion of the same tape clock pulse "Z" is translated by the transistor 2758 to trigger the flip-flop 2704 true.

Therefore, whenever the block address core register 44 has an address stored in it, the flip-flop 2704 is triggered to a true state to render the 2734 conductive. Then when "$C_1$" goes negative, which corresponds in time to the beginning of the address in the desired address register, the flip-flop 2702 is triggered true so that the signal "L" goes negative, as shown in FIGURE 22 at the proper time to permit the contents of the block address core register 44 to be fed into the current address register 48.

At the end of the first four characters, which may constitute the entire address in the block address core register, the signals "V" and "$S_7$" trigger the flip-flop 2702 false so that "L" returns to zero, as shown in FIGURE 7. The same signal "$C_1$" referred to in the preceding paragraph returns the flip-flop 2706 to a false state through the transistor 2764. Also, the occurrence of negative components of "$S_1$" and "$\overline{CA}$" together in the second charcater of FIGURE 22 returns the flip-flop 2704 to a false state after the flip-flop 2702 has been triggered true. Now that the flip-flop 2704 and 2706 are both false, the flip-flop 2702 cannot be returned to a true state until the block address core register is again loaded and when the signal "$\overline{B}$AZ" re-initiates the operations described above.

The "J" signal is also introduced, by way of the output terminal 2740 to the input terminal 1764 of the network of FIGURE 14. As noted previously, this signal determines the time at which the flip-flop 1760 is triggered to a true state when an unequality between the addresses in the current address register and in the desired address register occurs, and at which this flip-flop is triggered to a false state for an equality in these addresses. The memory transfer signal "M" is controlled by the flip-flop 1760, as explained. Therefore, this signal does not go negative to cause a memory transfer until the next following address is stored in the block address core register. This assures that the data fed in or out of the tape is that related to the address exhibiting the equality.

The control circuit of FIGURE 21 includes a pair of flip-flops 2800 and 2802. These flip-flops control respectively a control signal "B," and the control signal "B" which was discussed above. A portion of the signal "B" is shown in FIGURE 23. The circuit also has an input terminal 2804 to which the signal "A" from the address control amplifier 46 of FIGURE 4 is introduced. This signal also is shown in the curves of FIGURE 23. The input terminal 2804 is connected to the base of a transistor 2806. The emitter of the transistor 2806 is grounded and its collector is connected to a resistor 2808. The other terminal of the resistor 2808 is connected to the negative terminal of a 4-volt direct voltage source. This resistor may have a resistance, for example, of 3 kilo-ohms. The collector of the transsistor 2806 is connected to the base of a transistor 2810. The emitter of the transitsor 2810 is grounded, and its collector is connected to one terminal of a 3 kilo-ohm resistor 2812. The other terminal of this resistor is connected to the negative terminal of the 4-volt direct voltage source.

The collector of the transistor 2810 is also connected to the base of a transistor 2814, and the collector of the transistor 2806 is also connected to the base of a transistor 2816. The emitter of the transistor 2814 is grounded as is the emitter of the transistor 2816.

The collector of the transistor 2814 is connected to the emitter of a transistor 2818 and to the emitter of a transistor 2820. The collector of the transistor 2816, on the other hand, is connected to the emitter of a transistor 2822 and to the emitter of a transistor 2824. The collector of the transistor 2824 is connected to the left input terminal of the flip-flop 2800, and the collector of the transistor 2822 is connected to the right input terminal of that flip-flop. Likewise, the collector of the transistor 2818 is connected to the left input terminal of the flip-flop 2802, and the collector of the transistor 2820 is connected to the right input terminal of that flip-flop. The right output terminal of the flip-flop 2802 is connected to the base of the transistor 2824, and the left output terminal of that flip-flop is connected to the base of the transistor 2822. Likewise, the left output terminal of the flip-flop 2800 is connected to the base of the transistor 2818, and the right output terminal of he flip-flop 2800 is connected to the base of the transistor 2820.

The network of FIGURE 21 includes a first output terminal 2826 which is connected to the left output terminal of the flip-flop 2802, and it includes an output terminal 2828 which is connected to the right output terminal of that flip-flop. The signal "B" of FIGURE 23 is developed at the output terminal 2826, and its inverse signal "$\overline{B}$" of FIGURE 23 is developed at the output terminal 2628.

It may be remembered that the signal "B" performs the function of permitting first one column of the block address core register to be loaded or unloaded and then "$\overline{B}$" controls the second column. This signal, as noted above, is produced by the flip-flop 2802. This flip-flop is controlled in a manner to be described subsequently to produce the signal "B" in the form shown in FIGURE 22 so that the block address core register can be unloaded in a column-by-column manner. For loading the block address core register, the flip-flop 2802 is controlled by the signal "A" to have the composition shown in FIGURE 23. The latter control will now be described.

The flip-flop 2800 and 2802 are connected as a binary connected flip-flop so that one output pulse is produced for two into it. Before the beginning of each block at which the negative components of the "A" signal occur with the timing explained above, the flip-flop 2802 is false and the flip-flop 2800 is true. This means that the transistors 2818 and 2824 are conditioned for conduction and the transistors 2820 and 2822 are not. Now, when the signal "A" of FIGURE 23 first goes negative, the signal translated by the transistors 2806, 2812, 2814 and 2818 will trigger the flip-flop 2802 true, but the flip-flop 2800 will be unaffected. This causes the signal "B" at the output terminal 2826 to go negative in coincidence with the leading edge of the first negative component of the signal "A," as shown in FIGURE 23. The same time, the signal "B" goes to zero.

The triggering of the flip-flop 2802 to a true state causes the transistor 2822 now to be conditioned for conduction, rather than the transistor 2824. Now, when the signal "A" first returns to zero, its inverted signal "$\overline{A}$" developed by the transistor 2806 will be translated by the transistor 2816 to trigger the flip-flop 2800 false. This will cause the transistor 2820 to be conditioned for conduction, rather than the transistor 2818. Then the next time the signal "A" goes negative, the transistor 2818 will cause the flip-flop 2802 to be returned to a false state. This causes the signal "B" to return to zero, as shown in FIGURE 23, and it causes the signal "$\overline{B}$" to go negative, as also shown in FIGURE 23.

Now the next time the signal "A" returns to zero, the transistor 2824 (which is now conditioned for conduction rather than the transistor 2822) will cause the flip-flop 2800 to be returned to a true state. Therefore, after the termination of the two negative components of the signal "A" of FIGURE 23, the flip-flops 2800 and 2802 are returned to their original respective true and false states completing one cycle of operation for the two "A" cycles.

The control of the flip-flops 2800 and 2802, as described above, is such that the signal "B" goes negative for the first two characters of the first word in a block to control the block address core register 44 in the described manner, so that these two characters may (constituting the first portions of the address) be stored in the first column of the block address core register. Then, the signal "B" goes to zero and the signal "$\overline{B}$" goes negative for the next two characters of the first word of the block to enable the remaining portion of the address to be stored in the second column of the block address core register 44 in the described manner.

To constitute the control signals "$\overline{B}$AZ" and "BAZ" for the control referred to in the preceding paragraph, the signal "$\overline{B}$" is applied to the base of a transistor 2830 and the signal "B" is applied to the base of a transistor 2832. The input terminal 2804 of the system (to which the signal "A" of FIGURE 23 is applied) is connected to the base of a transistor 2834, and the network includes an input terminal 2836 which is connected to the base of a transistor 2838. The tape clock signal "Z" from the amplifier 26 of FIGURE 4 is applied to the input terminal 2836. The emitter of the transistor 2838 is grounded and its collector is connected to the emitter of the transistor 2834. The collector of the transistor 2834, on the other hand, is connected to the emitters of the transistors 2830 and 2832.

The collector of the transistor 2830 is connected to a 3 kilo-ohm resistor 2840 and this resistor is connected to the negative terminal of a 4-volt voltage source. In like manner, the collector of the transistor 2832 is connected to a 3 kilo-ohm resistor 2842, and this latter resistor is also connected to the negative terminal of the 4-volt voltage source. The collector of the transistor 2830 is connected to the base of a transistor 2844 and the collector of the transistor 2832 is connected to the base of a transistor 2846. The circuits of the two latter transistors are for phase inverting purposes, and the emitters of these transistors are grounded. The collector of the transistor 2844 is connected to one terminal of a resistor 2848, and the collector of the transistor 2846 is connected to one terminal of a resistor 2850. The resistors 2848 and 2850 each have a value of 1.5 kilo-ohms, and each may be connected to the negative terminal of a 4-volt voltage source. The collector of the transistor 2844 is connected to an output terminal 2852, and the collector of the transistor 2846 is connected to an output terminal 2854.

It is evident that when the signal "A" goes negative to render the transistor 2834 conductive and when the signal "Z" goes negative to render the transistor 2838 conductive, then the signal "$\overline{B}$" and "B" are capable of rendering either the transistor 2830 conductive or the transistor 2832 conductive.

Therefore, the transistors 2830, 2834 and 2838 in effect form a first "and" network whose output terminal is connected to the output terminal 2852 through the phase inverter circuit of the transistor 2844. Likewise, the transistors 2832, 2834 and 2838 form a second "and" network whose output terminal is connected through the inverter circuit of the transistor 2846 to the output terminal 2854. Therefore, the signal "$\overline{B}$AZ" is produced at the output terminal 2852, and the signal "BAZ" is produced at the output terminal 2854. These signals are used in the described manner to control the loading of the block address core register 44.

The signal "B," as shown in FIGURE 22, and as noted above, is also under the control of the signal "L" and other timing signals so that the block address core register 44 may be unloaded into the current address register 48 in timed alignment with the desired address set up in the register 50. For this purpose, the signal "B" goes negative at the beginning of the first character in FIGURE 22 and stays negative for the first two characters to enable them to be read out of the block address core register 44 into the current address register 48. Then the "B" returns to zero and the signal "$\overline{B}$" goes negative for the interval of the second two characters in FIGURE 22 to enable the second two characters in the block address core register to be read into the current address register at the proper time. To effect the latter control, network of FIGURE 21 includes an input terminal 2856 to which the signal "CA" of FIGURE 22 is introduced, and it also includes an input terminal 2858 which the signal "$S_1$" of FIGURE 22 is applied. The input terminal 2856 is connected to the base of a transistor 2860, and the input terminal 2858 is connected to the base of a transistor 2862. The emitter of the transistor 2860 is grounded, and its collector is connected to the emitter of the transistor 2862. The collector of the transistor 2862 is connected to the emitter of a transistor 2864, and the collector of the latter transistor is connected to the base of the transistor 2810. The base of the transistor 2864 is connected to an input terminal 8266 to which the signal "L" is introduced. Now, at the beginning of the block in FIGURE 22, the signal "L," "$S_1$" and "CA" all go negative together. This causes the transistors 8260, 2862 and 2864 to become conductive and, in the same manner, as described above, the flip-flop 2802 is triggered true and the "B" signal goes negative as shown in FIGURE 23, with the "$\overline{B}$" signal going to zero. When "$S_1$" goes to zero, the circuit through the transistors 2860, 2862 and 2864 is broken and the flip-flop 2800 is triggered false in a manner similar to that described as the base of the transistor 2816 goes negative and that transistor becomes conductive. Then, at the beginning of the third character in FIGURE 22 and when "$S_1$," "CA" and "L" are again all negative, the flip-flop 2802 is again triggered false. This, as shown in FIGURE 23, causes the signal "B" to return to zero and the signal "$\overline{B}$" to go negative. The return of the signal "$S_1$" to zero resets the flip-flop 2800 to its original true condition. The signals "B" and "$\overline{B}$" now remain zero and negative respectively until the signal "A" of FIGURE 23 acts on these signals in the manner described above.

Therefore, the signals "B" and "$\overline{B}$" are used under the control of clock pulses "N" from the data processor, and in conjunction with the signal "L" to unload the block address core register 44 at the proper time so that the address fed into the current address register 48 will be aligned with the address in the desired address register 50. To effect this, the signal "$\overline{B}$" is introduced to the base of a transistor 2868 and the signal "B" is introduced to the base of a transistor 2870. The emitters of these transistors are connected to the collector of a transistor 2872, and the emitter of the latter transistor is connected to the collector of a transistor 2874. The emitter of the transistor 2874 is grounded, and its base is connected to the input terminal 2866. The base of the transistor 2872 is connected to an input terminal 2876 to which the clock signal "N" from the data processor is introduced. The collector of the transistor 2868 is connected to a 3 kilo-ohm resistor 2878, and the collector of the transistor 2870 is connected to a 3 kilo-ohm resistor 2880. The resistors 2878 and 2880 are each connected to the negative terminal of a 4-volt direct voltage source.

The collector of the transistor 2868 is connected to the base of a transistor 2882, and the collector of the transistor 2870 is connected to the base of a transistor 2884. The circuits of the two latter transistors serve as inverters. The emitter of the transistor 2882 is grounded, as is the emitter of the transistor 2884. The collector of the transistor 2882 is connected to one terminal of a 1.5 kilo-ohm resistor 2886, and the collector of the transistor 2884 is connected to one terminal of a 1.5 kilo-ohm resistor 2888. Both the resistors 2886 and 2888 are connected to the negative of a 4-volt voltagee source. The collector of the transistor 2882 is connected to an output terminal 2890 and the collector of the transistor 2884 is connected to an output terminal 2892.

The transistors 2868, 2872 and 2874 are connected, therefore, as an "and" network so that the signal "$\overline{B}$LN" appears at the output terminal 2890 when the signals "$\overline{B}$," "N" and "L" are respectively introduced to these transistors. Likewise, the transistors 2870, 2872 and 2874 constitute an "and" network to produce the signal BLN at the output terminal 2892 when the signals B, N and L are respectively introduced to these transistors.

As shown in FIGURE 23, the signal "B" goes negative at the proper time to enable the first character from the block address core register 44 to be fed into the current address register 48, and the signal "$\overline{B}$" goes negative at the proper time to permit the second two characters of the address from the block address core register to be fed to the current address core register. The "L"

signal component of the output signals "BLN and "$\overline{B}$LN" at the teerminals 2890 and 2892 assure that the controlled feed of the data from the block address core register to the current address register will occur only at the proper time when the signal "L" goes negative, and the "N" component of these composite signals are merely for synchronizing purposes.

The control circuit of FIGURE 21 includees two additional flip-flops 2894 and 2892. The flip-flop 2894 controls the production of the signal "W," which signal goes negative upon the receipt of an "8U*" instruction indicating that data is to be fed into the input core buffer 22 from the data processor. In like manner, the flip-flop 2892 controls the signal "S," which signal goes negative upon the receipt of thee "5W*" instruction indicating that data is to be fed from the tape to the output core buffer. The signals "W" and "S" serve to cause the transfer signal "M" to cause the column magnetic switch associated with the input buffer to feed data to the tape at the correct time for the "8U*" condition, and to cause the column magnetic switch associated with the output core buffer to cause that buffer to be loaded at the proper time for the "5W*" condition.

The network includes an input terminal 2896 to which the interlocked data processor instruction "8U*" is introduced. This input terminal is connected to the base of a transistor 2900, the emitter of that transistor being grounded and its collector being connected to the left input terminal of the flip-flop 2894. This connection assures that the flip-flop 2894 will be triggered to its true state when an "8U*" instruction is received from the data processor. This causes the "M" transfer signal to control the timing of the input core buffer to read data into the magnetic tape which is desired for this condition.

The network also includes an input terminal 2902 to which the "M" transfer signal from the compare network 52 of FIGURE 4 is introduced. The input terminal 2902 is connected to the base of a transistor 2904, the collector of this transistor being connected to one terminal of a resistor 2906. The other terminal of the resistor 2906 is connected to the negative terminal of a 4-volt direct voltage source, and this resistor may have a resistance of 3.3 kilo-ohms. The collector of the transistor 2904 is also connected to the base of a transistor 2908, the emitter of the latter transistor being grounded and its collector being connected to the right input terminal of the flip-flop 2894. The emitter of the transistor 2904 is connected to the collector of a transistor 2910, and the emitter of the latter transistor is connected to the collector of a transistor 2912. The emitter of the transistor 2912 is grounded and its base is connected to the input terminal 2804.

Therefore, the signal "A" (FIGURE 23) from the address control amplifier 46 of FIGURE 4 is applied to the base of the transistor 2912. The base of the transistor 2910 is connected to the left output terminal of the flip-flop 2802 so that the signal "B" of FIGURE 23 is introduced to the base of the transistor 2910. The transistors 2904, 2910 and 2912, therefore, form an "and" network. Then, at the beginning of the block on the tape succeeding a processed block, when "A" goes negative and when "B" goes negative, and when the signal "M" is negative, the flip-flop 2894 is returned to a false state so that the signal "W" goes to zero. The signal "W" appears at the output terminal 2911 which is connected to the left output terminal of the flip-flop 2894. This signal goes negative upon the receipt of an "8U*" instruction to permit the contents of the input core buffer 22 to be fed at a time determined by the signal "M" into the magnetic storage tape 20 at the proper position on that tape corresponding to the block following the one immediately after the equality address. The read-out of the input core buffer then proceeds under the control of the signal "Z$\overline{\text{A}}$MW" applied to the driver circuit 38, and in the manner described previously. At the end of the processing the flip-flop 2894 is returned to its false state by the signal "MBA," as noted above.

The system also includes an input terminal 2914 to which the interlocked signal "5W*" from the data processor is introduced. The terminal 2914 is connected to the base of a transistor 2916. The emitter of the transistor 2916 is grounded and its collector is connected to the left input terminal of the flip-flop 2892. Therefore, when a desired address is read into the desired address register 50 from the data processor in response to the signal "5W*," the flip-flop 2892 is triggered to a true state so that the signal "S" from the left output terminal of flip-flop 2892 goes negative. This output terminal is connected to output terminal 2918. When the flip-flop 2892 is true, rather than the flip-flop 2894, the transfer signal "M" will activate the output core buffer, rather than the input core buffer, this being desired for a "5W*" instruction from the data processor.

The collector of the transistor 2904 is further connected to the base of a transistor 2920, the emitter of the latter transistor being grounded and its collector being connected to the right input terminal of the flip-flop 2892.

Again when the equality signal "M" is negative after the processing of a particular block, and at the beginning of the next block, the flip-flop 2892 is returned to its false state so that the signal "S" at the output terminal 2918 returns to zero. This control, therefore, enables the data portion of a selected block to be read into the output core buffer 54 under the control of the signal "Z$\overline{\text{A}}$MS" introduced to the driver circuit 60.

It will be remembered that the address portion of any block on the tape refers to the next succeeding block on the tape and not to the block with which it is immediately associated. Therefore, when a particular address portion causes the compare network 52 to cause the transfer signal "M" to go negative, that signal "M" in conjunction with the "$\overline{\text{A}}$" signal of the next succeeding block enables the data portion of the proper block to be read into the output core buffer. This, of course, applies for an "8U" instruction or for a "5W" instruction, with the control of the proper buffer being established by the "S" and "W" signals.

The invention provides, therefore, a memory system in which data is stored in the form of separate blocks on a suitable medium, such, as for example, a magnetic tape. The system is so devised and constituted that any block of data may be quickly selected from the tape and fed into an associated data processor. Then, after appropriate processing, the selected data may be returned to its proper position on the magnetic tape or similar medium.

I claim:

1. In a memory system for storing data for use in data processing and which includes storage means for the data and having a plurality of positions and movable to present successive positions for the recording and reading of data, input buffer means for receiving data to be stored in the storage means, said input buffer means including a plurality of magnetic cores constructed to exhibit first and second magnetic polarities and arranged in a plurality of rows and columns and further including a plurality of windings interlinking the cores, the combination of: a first magnetic switch connected to a first group of the windings in the plurality for activating successive rows of the cores, a second magnetic switch connected to a second group of the windings in the plurality for activating successive columns of the cores, control circuitry coupled to the first and second magnetic switches for driving the first and second magnetic switches, a loading circuit for the input buffer and operative to complete the control circuitry to the windings of the first and second groups to enable the first magnetic switch to introduce a first current to successive ones of the windings in the first group and to enable the second magnetic switch to introduce a second current to successive ones of the windings in the second group for a serial activation of the different cores in the input buffer means, means coupled to the first and second magnetic switches to control the production of flux in the different cores upon the activation of the cores and in representation of particular data, and an unloading circuit for the input buffer and operative upon the introduction of data to the cores as represented by the flux in the cores to complete the control circuitry to the second group of windings for the introduction by the second magnetic switch of a third current to successive ones of the windings of the second group for the production of flux in the cores in accordance with the flux previously in the cores and for the transfer of data from the input buffer to the storage means in a column-by-column sequence in accordance with such flux production.

2. In a memory system for storing data for use in data processing and which includes a buffer including a plurality of magnetic cores constructed to exhibit a first magnetic polarity and a second magnetic polarity and electrically coupled to one another in a plurality of rows and columns in which the cores in each column are common to the cores in the different rows, the combination of: a first plurality of windings respectively interlinking cores in the successive columns, a second plurality of windings respectively interlinking cores in the successive rows, a third plurality of windings also respectively interlinking cores in the successive rows, and a fourth winding interlinking all of the cores of the buffer, means including a first magnetic switch connected to the windings of the first plurality to control the flow of current through these windings, means including a second magnetic switch connected to the windings of the second plurality and of the third plurality to control the flow of current through these windings, an inhibit input amplifier connected to the fourth winding for introducing data into the buffer in a serial manner, means including a loading circuit connected to the windings in the first plurality and in the second plurality and operative on the first and second magnetic switches to produce a sequential magnetic activation of the different cores in the buffer to cause the buffer to receive and store data from the input means in accordance with the energizing or lack of energizing of the inhibit amplifier, and means including an unloading circuit connected to the windings of the third plurality and operative upon the second magnetic switch to produce a sequential magnetic activation of the cores in each column for a parallel reading out of the data in the cores of each column.

3. In a memory system for storing data for use in data processing, the combination of storage means having a plurality of blocks for the storage of data and movable to different positions to provide a recording of information in the different blocks of the storage means and a reading of information from the different blocks of the storage means, input buffer means constructed to provide a static memory of a plurality of bits of information in a selected number of rows and a selected number of columns, means including electrical switching circuitry coupled to the input buffer means first control circuitry coupled to said input buffer means for enabling said electrical switching circuitry selectively to activate different combinations of rows and columns in the buffer means to obtain the serial introduction of information to the buffer means for the storage of data in the storage means, and means including second electrical control circuitry coupled to the input buffer means and coupled to the storage means upon the presentation of a particular block in the storage means for enabling said electrical switching circuitry to selectively activate successive columns in the input buffer means to obtain the transfer of information to the storage means upon such activation.

4. In a memory system as set forth in claim 3, output buffer means constructed to provide a static memory of a plurality of bits of information in a selected number of blocks and a selected number of columns, means including further electrical switching circuitry coupled to said output buffer means, first further electrical control circuitry coupled to the storage means and coupled to the output buffer means for enabling said further switching circuitry upon the presentation of a second particular block to selectively activate successive columns in the storage means to obtain the transfer of such information to corresponding columns in the output buffer means upon such activation, and means including second further electrical control circuitry responsive to the signal indications in the output buffer means upon the transfer of such information to the output buffer means to enable said further switching circuitry to selectively activate different combinations of rows and columns of said output buffer means for a serial transfer of information from the output buffer means.

5. In a memory system for storing data for use in data processing, the combination of an input buffer formed from a plurality of magnetic storage elements disposed electrically in a matrix relationship defined by a plurality of rows and columns with the storage elements in each column being common to the storage elements in the different rows, each of the storage elements being provided with characteristics to retain magnetic fluxes of first and second polarities, a first plurality of windings each disposed on the storage elements of a different row, a second plurality of windings each disposed on the storage elements of a different column switching circuit means coupled to said windings of said first and second plurality, input circuit means coupled to said input buffer for introducing data into said input buffer, first control circuit, means including the windings in the first and second pluralities coupled to the storage elements in the plurality for enabling said switching circuit means in conjunction with said input circuit means sequentially to produce magnetic fluxes of the first and second polarities in the different storage elements in the plurality to represent particular data from said input circuit means in accordance with the energizing of the windings in the first and second pluralities common to the storage elements, a third plurality of windings each disposed on the storage elements of a different column and provided with a number of turns on each storage element to obtain a change in the flux polarities of the coupled cores, and second control circuit means coupled to the windings in the third plurality for enabling said switching circuit means sequentially to energize the different windings in the third plurality to obtain a transfer of the data in the storage elements in each column in a parallel relationship in accordance with the polarities of the fluxes in the storage elements of the column.

6. In a memory system for storing data for use in data processing, the combination of a buffer including a plurality of cores arranged electrically in a matrix relationship defined by a plurality of rows and a plurality of columns with each column including individual cores in the different rows, each of the cores being provided with characteristics to retain magnetic fluxes of first and second polarities, a first plurality of windings each disposed on a different one of the cores and connected to the other windings on the cores of a different one of the rows, a second plurality of windings each disposed on a different one of the cores and connected to the other windings on the cores of a different one of the columns, a third plurality of windings each disposed on a different one of the cores and connected to the windings on the cores of a different one of the columns, means including a first magnetic switch formed from a plurality of magnetic elements connected to one another in a particular relationship and coupled to the windings in the different rows in the first plurality to control the energizing of these rows in accordance with the sequential magnetic activation of the different magnetic elements in the switch, means including a second magnetic switch formed from a plurality of magnetic elements connected to one another in a particular relationship and coupled to the different windings in the columns in the second and third plurality to control the energizing of these columns in accordance with the sequential magnetic activation of the different magnetic elements in the switch, means including a load circuit coupled to the first and second magnetic switches for energizing the windings in the first and second pluralities in a particular pattern to obtain the sequential production of fluxes of the first and second polarities in the different cores in representation of particular data, and means including an unload circuit coupled to the second magnetic switch for sequentially energizing the windings in the different columns of the third plurality to obtain the parallel production of a plurality of signals from the different cores in each column in accordance with the polarities of the fluxes in the cores of that column.

7. In a memory system for storing data for use in data processing, the combination of an output buffer formed from a plurality of magnetic storage elements disposed electrically in a matrix relationship defined by a plurality of rows and columns with the storage elements in each column being common to the storage elements in the different rows, each of the storage elements being provided with characteristics to retain magnetic fluxes of first and second polarities, a first plurality of windings each disposed on the storage elements of a different row, a second plurality of windings each disposed on the storage elements of a different column, a third plurality of windings each disposed on the storage elements of a different column and provided with a number of turns on each storage element to obtain a change in the flux polarities of the coupled cores, switching means coupled to the windings in the first and second and third plurality, first control circuit means coupled to the windings of said third plurality to enable said switching means sequentially to energize the different windings in the third plurality to obtain a transfer of data in a parallel relationship to the storage elements in each column, and second control circuit means coupled to the windings in the first and second pluralities for enabling said switching circuitry sequentially to produce magnetic fluxes of the first and second polarities in the different storage elements upon the energizing of the windings in the first and second pluralities common to the storage elements and in accordance with the flux transferred to the storage elements.

8. In a memory system for storing data for use in data processing, the combination of a buffer including a plurality of magnetic cores constructed to retain fluxes of first and second polarities and further including a first plurality of windings respectively interlinking selected groups of the cores to obtain the storage of data in rows of the cores, a second plurality of windings respectively interlinking second selected groups of the cores forming columns of the cores in which the cores in each of second selected groups have a common relationship to the cores in the different ones of the first selected groups, a third plurality of windings respectively interlinking the second selected groups of the cores, first switching means connected to the windings of the first plurality to control the flow of current through these windings, second switching means connected to the windings of the second and third pluralities to control the flow of current through these windings, input means coupled to the buffer for introducing data into the buffer for successive columns of cores in the buffer, a loading circuit connected to the windings of the second plurality and operative upon the second switching means for a sequential flow of current through the second windings of successive columns of cores in the plurality and for a successive activation of these columns of cores in accordance with the introduction of data from the input means to the buffer, and an unloading circuit connected to the windings of the first and third pluralities and operative upon the first and second switching means in a particular pattern for a sequential activation of the different cores and for a sequential production of output pulses in accordance with the prior production of fluxes of the first and second polarities in the cores in representation of the data from the input means.

9. In a memory system for storing data for use in data processing, the combination of a buffer including a plurality of cores arranged electrically in a matrix relationship defined by a plurality of rows and a plurality of columns with each column including individual cores in the different rows, each of the cores being provided with characteristics to retain magnetic fluxes of first and second polarities, a first plurality of windings each disposed on a different one of the cores and connected to the other windings on the cores of a different one of the rows, a second plurality of windings each disposed on a different one of the cores and connected to the other windings on the cores of a different one of the columns, a third plurality of windings each disposed on a different one of the cores and connected to the windings on the cores of a different one of the columns, means including a first magnetic switch formed from a plurality of magnetic elements connected to one another in a particular relationship and coupled to the windings in different rows in the first plurality to control the energizing of these rows in accordance with the sequential magnetic activation of the different magnetic elements in the first magnetic switch, means including a second magnetic switch formed from a plurality of magnetic elements connected to one another in a particular relationship and coupled to the different windings in the columns in the second and third pluralities to control the energizing of these columns in accordance with the sequential magnetic activation of the different magnetic elements in the second magnetic switch, means including a load circuit coupled to the second magnetic switch for energizing the windings in the second plurality in a particular pattern to obtain the parallel production of fluxes of the first and second polarities in the different cores of successive columns in representation of particular data, and means including an unload circuit coupled to the first and second magnetic switches for sequentially energizing the windings in the different rows and columns of the first and third pluralities to obtain the sequential production of a plurality of signals from the different cores in accordance with the polarities of the fluxes in the different cores.

10. In a memory system for storing data for use in data processing, the combination of storage means for the data and movable in a closed loop to present successive positions in a repetitive pattern for the recording of data and having a plurality of channels for the parallel presentation of data, output buffer means for receiving data stored in the storage means, said output buffer means including a plurality of magnetic cores constructed to exhibit first and second magnetic polarities and arranged in a plurality of rows and columns, said output buffer means further including a first group of windings respectively interlinking successive rows of the cores, a second group of windings respectively interlinking successive columns of the cores, and a third group of windings also respectively interlinking the successive columns of the cores, a first magnetic switch connected to the first group of windings for activating successive rows of the cores, a second magnetic switch connected to the second and third groups of windings for activating successive columns of the cores, control circuitry for driving the first and second magnetic switches, a loading circuit for the output buffer and operative to complete the control circuits for the windings of the second group for the production of flux in the successive columns of the cores in accordance with the parallel occurrence of flux in the different channels of the storage means to obtain the introduction of data to the output buffer from the storage means in a column-by-column sequence, and an unloading circuit for the output buffer and operative upon the loading of data into the storage elements of the buffer to complete the control circuitry for the windings of the first and third groups for the introduction by the first magnetic switch of a first current to successive ones of the windings of the first group and for the introduction by the second magnetic switch of a second current to successive ones of the windings of the third group in a particular relationship to obtain a serial activation of the different cores in the output buffer means and a serial production of voltage pulses in accordance with the fluxes stored in the different storage elements.

11. In an input buffer for receiving data to be stored in a storage means and which includes a plurality of magnetic cores arranged in a plurality of rows and columns and a plurality of windings inter-linking the cores, the combination of: switching means coupled to a first group of said windings in the plurality for successively activating successive rows of the magnetic cores and coupled to a second group of said windings in the plurality for successively activating successive columns of the cores, first control circuitry coupled to said windings of said first group and of said second group for enabling said switching means successively to activate successive ones of the cores in said input buffer for the serial introduction of data thereto, and second control circuitry coupled to said windings of said second group for enabling said switching means to activate the cores in a manner for the parallel introduction of data from said input buffer to said storage means.

12. In an input buffer for receiving data to be stored in a storage means and which includes a plurality of magnetic cores arranged in a plurality of rows and columns and a plurality of windings inter-linking the cores, the combination of: switching means coupled to a first group of said windings in the plurality for successively activating successive rows of the magnetic cores and coupled to a second group of said windings in the plurality for successively activating successive columns of the cores, input circuit means coupled to at least one of said windings in the plurality for serially introducing data to successive ones of said cores, output circuit means coupled to a third group of said windings of said plurality for receiving data from said cores and for introducing the same to the storage means, first control circuitry coupled to said windings of said first group and of said second group for enabling said switching means successively to activate successive ones of the cores in said input buffer for the serial introduction of data thereto from said input circuit means, and second control circuitry coupled to said windings of said second group for enabling said switching means to activate the cores in successive ones of said columns for the column-by-column parallel introduction of data by said output circuit means from said input buffer to said storage means.

13. In an input buffer for receiving data to be stored in a storage member and which includes a plurality of magnetic cores arranged in a plurality of rows and columns, and a first winding inter-linking the cores, and pluralities of windings respectively inter-linking rows and columns of the cores, the combination of: first switching means coupled to a first of said pluralities of windings respectively inter-linking different rows of said magnetic cores for successively activating the rows of said cores, second switching means coupled to a second and a third of said pluralities of windings respectively inter-linking different columns of said magnetic cores for successively activating the columns of said cores, input circuit means coupled to said first winding for serially introducing data to successive ones of the cores, output circuit means coupled to a fourth of said pluralities of windings respectively inter-linking different rows of said cores for receiving data from said cores and for introducing the same to said storage means, first control circuitry coupled to said first and second of said pluralities of windings for enabling said first and second switching means successively to activate successive ones of the cores in said input buffer for the serial introduction of data thereto from said input circuit means, and second control circuitry coupled to said third plurality of windings for enabling said second switching means to activate the cores in successive ones of said columns for the column-by-column parallel introduction of data by said output circuit means from said input buffer to said storage member.

14. In an input buffer for receiving data to be stored in a storage member and which includes a plurality of magnetic cores adapted to exhibit a first and a second magnetic polarity and arranged in a plurality of rows and columns, and a first winding inter-linking the cores, and pluralities of windings respectively inter-linking rows and columns of said cores, the combination of: first switching means coupled to a first of said pluralities of windings respectively inter-linking different rows of said magnetic cores for successively activating the rows of the cores, second switching means coupled to a second and to a third of said pluralities of windings respectively inter-linking different columns of said magnetic cores for successively activating the columns of the cores, drive circuit means coupled to said first and second switching means for causing the same to introduce a first current to successive ones of the windings of the first plurality and to introduce a second current to successive ones of the windings of the second plurality for the production of a combined flux in successive ones of the rows so as to produce a second magnetic polarity therein and for causing said second switching means to introduce a current to successive ones of the windings of the third plurality for the sequential production of fluxes in the columns of the cores to produce a first magnetic polarity therein, input circuit means coupled to said first winding to control the effectiveness of the first and second currents in producing said second magnetic polarity in selected ones of the cores as determined by the serial introduction of data into the buffer, output circuit means coupled to a fourth of said pluralities of windings respectively inter-linking different rows of said cores for receiving data from said cores and for introducing the same to said storage means, first control circuitry coupled to said first and second of said pluralities of windings for enabling said first and second switching means successively to activate successive ones of said cores in said input buffer for the serial introduction of data thereto from said input circuit means, and a second control circuitry coupled to said third plurality of windings for enabling said second switching means to activate the cores in successive ones of said columns for the colmun-by-column parallel introduction of data by said output circuit means from said input buffer to said storage member.

15. A buffer assembly for receiving data including: a plurality of magnetic cores adapted to exhibiting a first and a second magnetic polarity and arranged in a plurality of rows and columns, a first winding inter-linking the rows, first and second pluralities of windings respectively inter-linking respective ones of the columns of cores, third and fourth pluralities of windings respectively inter-linking respective ones of the rows of cores, switching means coupled to said first and second and third plurality of windings for successively activating the rows of the cores and for successively activating the columns of the cores, drive circuit means coupled to said switching means for causing the same to introduce a first current to successive ones of the windings of the first plurality and to introduce a second current to successive ones of the windings of the third plurality for the production of a combined flux strength in successive ones of the cores so as to produce said second polarity therein and for causing said switching means to introduce a current to successive ones of the winding of the second plurality for the sequential production of fluxes in the columns of cores to produce said first magnetic polarity therein, circuit means coupled to said first winding, further circuit means coupled to said fourth plurality of windings, first control circuitry coupled to said windings of said first and third pluralities for enabling said switching means successively to activate successive ones of said columns and rows of cores, and second control circuitry coupled to said windings of said second plurality for enabling said switching means successively to activate successive ones of said columns of cores.

16. An input buffer assembly for receiving data including: a plurality of magnetic cores adapted to exhibit a first and a second magnetic polarity and arranged in a plurality of rows and columns, a first winding inter-linking the cores, first and second and third pluralities of windings respectively inter-linking respective ones of the columns of cores, fourth and fifth pluralities of windings respectively inter-linking respective ones of the rows of cores, a first switching means coupled to said fourth plurality of windings for successively activating the rows of cores, second switching means coupled to said first and second and third pluralities of windings for successively activating the columns of the cores, drive circuit means coupled to said first and second switching means for causing the same to introduce a first current to successive ones of the windings of the first plurality and to introduce a second current to successive ones of the windings of the fourth plurality for the production of a combining flux strength in successive ones of the cores so as to produce said second magnetic polarity therein and for causing said second switching means to introduce a current to successive ones of the windings of the second and third pluralities for the sequential production of fluxes in the columns of cores to produce said first magnetic polarity therein, input circuit means coupled to said first winding to control the effectiveness of the first and second currents in producing said magnetic polarity in selected ones of the cores as determined by the serial introduction of data into the buffer, output circuit means coupled to said fifth plurality of windings for receiving data from the cores, first control circuitry coupled to said windings of said first and fourth pluralities for enabling said first and second switching means successively to activate successive cores of said columns and rows of the cores, and second control circuitry coupled to said windings of said second and third pluralities for enabling said second switching means successively to activate successive ones of said columns of cores for the column-by-column parallel introduction of data to said output circuit means.

References Cited in the file of this patent

UNITED STATES PATENTS

| | | |
|---|---|---|
| 2,702,380 | Brustman | Feb. 15, 1955 |
| 2,708,267 | Weidenhammer | May 10, 1955 |
| 2,734,187 | Rajchman | Feb. 7, 1956 |
| 2,782,398 | West | Feb. 19, 1957 |
| 2,798,554 | Smith | July 9, 1957 |
| 2,801,334 | Clapper | July 30, 1957 |
| 2,802,203 | Stuart-Williams | Aug. 6, 1957 |
| 2,817,073 | Sorrells | Dec. 17, 1957 |
| 2,856,595 | Selmer | Oct. 14, 1958 |
| 2,858,526 | Deutsch | Oct. 28, 1958 |
| 2,872,666 | Greenhalgh | Feb. 3, 1959 |
| 2,931,014 | Buchholz et al. | Mar. 29, 1960 |
| 2,931,022 | Triest | Mar. 29, 1960 |
| 2,951,240 | Bobeck | Aug. 30, 1960 |
| 2,954,546 | Burns et al. | Sept. 27, 1960 |
| 2,958,856 | Bird et al. | Nov. 1, 1960 |

OTHER REFERENCES

Publication: EDVAC Progress Report No. 2, June 30, 1946, pp. 4—22, 4—23, PY-O-164, PY-O-165.